(12) United States Patent
Green

(10) Patent No.: US 10,763,740 B2
(45) Date of Patent: Sep. 1, 2020

(54) SWITCH OFF TIME CONTROL SYSTEMS AND METHODS

(71) Applicant: Emerson Climate Technologies, Inc., Sidney, OH (US)

(72) Inventor: Charles E. Green, Fenton, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 198 days.

(21) Appl. No.: 15/419,423

(22) Filed: Jan. 30, 2017

(65) Prior Publication Data

US 2017/0302158 A1  Oct. 19, 2017

Related U.S. Application Data

(60) Provisional application No. 62/323,538, filed on Apr. 15, 2016.

(51) Int. Cl.
*H02M 1/44* (2007.01)
*H02M 1/12* (2006.01)
(Continued)

(52) U.S. Cl.
CPC .............. *H02M 1/12* (2013.01); *H02M 1/32* (2013.01); *H02M 1/4225* (2013.01); *H02M 1/44* (2013.01);
(Continued)

(58) Field of Classification Search
CPC . H02M 2003/1552; H02M 2001/4283; H02M 2001/4291; H02M 1/12; H02M 1/42; H02M 1/4225; H02M 1/4233; H02M 1/4241; H02M 1/4258; H02M 1/425; H02M 1/4208; H02J 3/16; G05F 1/70
See application file for complete search history.

(56) References Cited

U.S. PATENT DOCUMENTS 4,388,578 A  6/1983  Green et al.
4,437,146 A  3/1984  Carpenter
(Continued)

FOREIGN PATENT DOCUMENTS

CN  1051787 A  5/1991
CN  102364814 A  2/2012
(Continued)

OTHER PUBLICATIONS

Applicant-Initiated Interview Summary regarding U.S. Appl. No. 15/419,394, dated Oct. 30, 2017.
(Continued)

*Primary Examiner* — Bryan R Perez
(74) *Attorney, Agent, or Firm* — Harness, Dickey & Pierce, P.L.C.

(57) ABSTRACT

A power factor correction (PFC) system includes a desired OFF period module that determines a desired OFF period for a switch of a PFC circuit based on an input voltage to the PFC circuit and an output voltage of the PFC circuit. A switching control module transitions the switch from an ON state to an OFF state when a measured current through an inductor of the PFC circuit is greater than a demanded current through the inductor and maintains the switch in the OFF state for the desired OFF period after the transition from the ON state to the OFF state.

20 Claims, 38 Drawing Sheets

(51) Int. Cl.
*H02M 1/32* (2007.01)
*H02M 1/42* (2007.01)
*H02M 1/00* (2006.01)

(52) U.S. Cl.
CPC .............. *H02M 2001/0032* (2013.01); *H02M 2001/327* (2013.01); *Y02B 70/126* (2013.01); *Y02B 70/16* (2013.01)

(56) References Cited

U.S. PATENT DOCUMENTS

| | | |
|---|---|---|
| 4,504,922 A | 3/1985 | Johnson et al. |
| 4,939,473 A | 7/1990 | Eno |
| 5,367,617 A | 11/1994 | Goossen et al. |
| 5,410,360 A | 4/1995 | Montgomery |
| 5,493,101 A | 2/1996 | Innes |
| 5,506,484 A | 4/1996 | Munro et al. |
| 5,583,420 A | 12/1996 | Rice et al. |
| 5,594,635 A | 1/1997 | Gegner |
| 5,600,233 A | 2/1997 | Warren et al. |
| 5,754,036 A | 5/1998 | Walker |
| 5,801,516 A | 9/1998 | Rice et al. |
| 5,823,004 A | 10/1998 | Polley et al. |
| 5,903,130 A | 5/1999 | Rice et al. |
| 6,018,200 A | 1/2000 | Anderson et al. |
| 6,031,749 A | 2/2000 | Covington et al. |
| 6,115,051 A | 9/2000 | Simons et al. |
| 6,137,253 A | 10/2000 | Galbiati et al. |
| 6,158,887 A | 12/2000 | Simpson |
| 6,169,670 B1 | 1/2001 | Okubo et al. |
| 6,181,587 B1 | 1/2001 | Kuramoto et al. |
| 6,188,203 B1 | 2/2001 | Rice et al. |
| 6,215,287 B1 | 4/2001 | Matsushiro et al. |
| 6,239,523 B1 | 5/2001 | Janicek et al. |
| 6,249,104 B1 | 6/2001 | Janicek |
| 6,281,658 B1 | 8/2001 | Han et al. |
| 6,282,910 B1 | 9/2001 | Helt |
| 6,295,215 B1 | 9/2001 | Faria et al. |
| 6,307,759 B1 | 10/2001 | Inarida et al. |
| 6,309,385 B1 | 10/2001 | Simpson |
| 6,313,602 B1 | 11/2001 | Arefeen et al. |
| 6,384,579 B2 | 5/2002 | Watanabe |
| 6,433,504 B1 | 8/2002 | Branecky |
| 6,437,997 B1 | 8/2002 | Inarida et al. |
| 6,476,663 B1 | 11/2002 | Gauthier et al. |
| 6,483,265 B1 | 11/2002 | Hollenbeck et al. |
| 6,498,451 B1 | 12/2002 | Boules et al. |
| 6,515,437 B1 | 2/2003 | Zinkler et al. |
| 6,556,462 B1 | 4/2003 | Steigerwald et al. |
| 6,586,904 B2 | 7/2003 | McClelland et al. |
| 6,593,881 B2 | 7/2003 | Vail et al. |
| 6,629,776 B2 | 10/2003 | Bell et al. |
| 6,693,407 B2 | 2/2004 | Atmur |
| 6,693,409 B2 | 2/2004 | Lynch et al. |
| 6,710,573 B2 | 3/2004 | Kadah |
| 6,717,457 B2 | 4/2004 | Nanba et al. |
| 6,737,833 B2 | 5/2004 | Kalman et al. |
| 6,781,802 B2 | 8/2004 | Kato et al. |
| 6,801,028 B2 | 10/2004 | Kernahan et al. |
| 6,806,676 B2 | 10/2004 | Papiernik et al. |
| 6,810,292 B1 | 10/2004 | Rappenecker et al. |
| 6,859,008 B1 | 2/2005 | Seibel |
| 6,885,161 B2 | 4/2005 | de Nanclares et al. |
| 6,885,568 B2 | 4/2005 | Kernahan et al. |
| 6,900,607 B2 | 5/2005 | Kleinau et al. |
| 6,902,117 B1 | 6/2005 | Rosen |
| 6,906,500 B2 | 6/2005 | Kernahan |
| 6,906,933 B2 | 6/2005 | Taimela |
| 6,909,266 B2 | 6/2005 | Kernahan et al. |
| 6,930,459 B2 | 8/2005 | Fritsch et al. |
| 6,949,915 B2 | 9/2005 | Stanley |
| 6,952,089 B2 | 10/2005 | Matsuo |
| 6,961,015 B2 | 11/2005 | Kernahan et al. |
| 6,979,967 B2 | 12/2005 | Ho |
| 6,979,987 B2 | 12/2005 | Kernahan et al. |
| 6,984,948 B2 | 1/2006 | Nakata et al. |
| 7,015,679 B2 | 3/2006 | Ryba et al. |
| 7,053,569 B2 | 5/2006 | Takahashi et al. |
| 7,061,195 B2 | 6/2006 | Ho et al. |
| 7,068,016 B2 | 6/2006 | Athari |
| 7,068,191 B2 | 6/2006 | Kuner et al. |
| 7,071,641 B2 | 7/2006 | Arai et al. |
| 7,081,733 B2 | 7/2006 | Han et al. |
| 7,112,940 B2 | 9/2006 | Shimozono et al. |
| 7,135,830 B2 | 11/2006 | El-Ibiary |
| 7,148,664 B2 | 12/2006 | Takahashi et al. |
| 7,149,644 B2 | 12/2006 | Kobayashi et al. |
| 7,154,238 B2 | 12/2006 | Kinukawa et al. |
| 7,164,590 B2 | 1/2007 | Li et al. |
| 7,176,644 B2 | 2/2007 | Ueda et al. |
| 7,180,273 B2 | 2/2007 | Bocchiola et al. |
| 7,181,923 B2 | 2/2007 | Kurita et al. |
| 7,193,383 B2 | 3/2007 | Sarlioglu et al. |
| 7,202,626 B2 | 4/2007 | Jadric et al. |
| 7,208,891 B2 | 4/2007 | Jadric et al. |
| 7,221,121 B2 | 5/2007 | Skaug et al. |
| 7,239,257 B1 | 7/2007 | Alexander et al. |
| 7,256,564 B2 | 8/2007 | MacKay |
| 7,274,241 B2 | 9/2007 | Ho et al. |
| 7,309,977 B2 | 12/2007 | Gray et al. |
| 7,330,011 B2 | 2/2008 | Ueda et al. |
| 7,336,514 B2 | 2/2008 | Amarillas et al. |
| 7,339,346 B2 | 3/2008 | Ta et al. |
| 7,358,706 B2 | 4/2008 | Lys |
| 7,359,224 B2 | 4/2008 | Li |
| 7,425,806 B2 | 9/2008 | Schnetzka et al. |
| 7,459,864 B2 | 12/2008 | Lys |
| 7,463,006 B2 | 12/2008 | Ta et al. |
| 7,495,404 B2 | 2/2009 | Sarlioglu et al. |
| 7,508,688 B2 | 3/2009 | Virolainen |
| 7,532,491 B2 | 5/2009 | Lim et al. |
| 7,573,275 B2 | 8/2009 | Inagaki et al. |
| 7,592,820 B2 | 9/2009 | Laakso et al. |
| 7,598,698 B2 | 10/2009 | Hashimoto et al. |
| 7,612,522 B2 | 11/2009 | Williams et al. |
| 7,613,018 B2 | 11/2009 | Lim et al. |
| 7,616,466 B2 | 11/2009 | Chakrabarti et al. |
| 7,633,249 B2 | 12/2009 | Sekimoto et al. |
| 7,650,760 B2 | 1/2010 | Nakata et al. |
| 7,659,678 B2 | 2/2010 | Maiocchi |
| 7,667,986 B2 | 2/2010 | Artusi et al. |
| 7,671,557 B2 | 3/2010 | Maeda et al. |
| 7,675,759 B2 | 3/2010 | Artusi et al. |
| 7,723,964 B2 | 5/2010 | Taguchi |
| 7,750,595 B2 | 7/2010 | Yamada et al. |
| 7,771,115 B2 | 8/2010 | Pan |
| 7,847,507 B2 | 12/2010 | Wagoner |
| 7,880,430 B2 | 2/2011 | Gale et al. |
| 7,888,922 B2 | 2/2011 | Melanson |
| 7,903,441 B2 | 3/2011 | Chen et al. |
| 7,952,293 B2 | 5/2011 | Kelly |
| 7,966,079 B2 | 6/2011 | Graves |
| 7,966,081 B2 | 6/2011 | Graves |
| 8,032,323 B2 | 10/2011 | Taylor |
| 8,040,703 B2 | 10/2011 | Melanson |
| 8,044,623 B2 | 10/2011 | Takeuchi et al. |
| 8,050,063 B2 | 11/2011 | Wagoner et al. |
| 8,054,033 B2 | 11/2011 | Kern et al. |
| 8,065,023 B2 | 11/2011 | Graves |
| 8,072,170 B2 | 12/2011 | Hwang et al. |
| 8,092,084 B2 | 1/2012 | Riddle et al. |
| 8,096,139 B2 | 1/2012 | Taras et al. |
| 8,120,299 B2 | 2/2012 | Hwang et al. |
| 8,130,522 B2 | 3/2012 | Maksimovic |
| 8,154,230 B2 | 4/2012 | Kimura |
| 8,164,292 B2 | 4/2012 | Park |
| 8,169,180 B2 | 5/2012 | Hwang et al. |
| 8,174,853 B2 | 5/2012 | Kane et al. |
| 8,182,245 B2 | 5/2012 | Maeda et al. |
| 8,193,756 B2 | 6/2012 | Jadric et al. |
| 8,223,508 B2 | 7/2012 | Baarman et al. |
| 8,228,700 B2 | 7/2012 | Yahata et al. |
| 8,264,192 B2 | 9/2012 | Green et al. |
| 8,264,860 B2 | 9/2012 | Green |

(56) References Cited

U.S. PATENT DOCUMENTS

| | | |
|---|---|---|
| 8,269,370 B2 | 9/2012 | Haga |
| 8,278,778 B2 | 10/2012 | Rockenfeller et al. |
| 8,288,985 B2 | 10/2012 | Takahashi |
| 8,292,503 B2 | 10/2012 | Pan |
| 8,299,653 B2 | 10/2012 | Rockenfeller et al. |
| 8,305,780 B2 | 11/2012 | Saruwatari et al. |
| 8,320,145 B2 | 11/2012 | Horii |
| 8,321,039 B2 | 11/2012 | Graves |
| 8,335,095 B2 | 12/2012 | Mi et al. |
| 8,344,638 B2 | 1/2013 | Shteynberg et al. |
| 8,345,454 B1 | 1/2013 | Krolak et al. |
| 8,358,098 B2 | 1/2013 | Skinner et al. |
| 8,395,874 B2 | 3/2013 | Yamai et al. |
| 8,400,089 B2 | 3/2013 | Bonner et al. |
| 8,406,021 B2 | 3/2013 | Green |
| 8,432,108 B2 | 4/2013 | Kelly et al. |
| 8,432,713 B2 | 4/2013 | Popescu et al. |
| 8,467,197 B2 | 6/2013 | Perisic et al. |
| 8,477,514 B2 | 7/2013 | Artusi et al. |
| 8,477,517 B2 | 7/2013 | Joshi |
| 8,487,601 B2 | 7/2013 | Saint-Pierre |
| 8,493,014 B2 | 7/2013 | Henderson et al. |
| 8,508,165 B2 | 8/2013 | Shinomoto et al. |
| 8,508,166 B2 | 8/2013 | Marcinkiewicz et al. |
| 8,520,415 B1 | 8/2013 | Krishnamoorthy et al. |
| 8,520,420 B2 | 8/2013 | Jungreis et al. |
| 8,547,024 B2 | 10/2013 | Grotkowski et al. |
| 8,547,713 B2 | 10/2013 | Kono et al. |
| 8,564,982 B2 | 10/2013 | Song et al. |
| 8,582,263 B2 | 11/2013 | Butler |
| 8,587,962 B2 | 11/2013 | Perisic et al. |
| 8,599,577 B2 | 12/2013 | Kajouke et al. |
| 8,614,562 B2 | 12/2013 | Bouchez et al. |
| 8,633,668 B2 | 1/2014 | Marcoccia |
| 8,638,074 B2 | 1/2014 | Babcock et al. |
| 8,648,558 B2 | 2/2014 | Clothier et al. |
| 8,657,585 B2 | 2/2014 | Hong et al. |
| 8,669,805 B2 | 3/2014 | Serventi et al. |
| 8,693,228 B2 | 4/2014 | Matan et al. |
| 8,698,433 B2 | 4/2014 | Green |
| 8,704,409 B2 | 4/2014 | Owens |
| 8,736,207 B2 | 5/2014 | Ritter et al. |
| 8,749,222 B2 | 6/2014 | Williams |
| 8,751,374 B2 | 6/2014 | Graves |
| 8,760,089 B2 | 6/2014 | Smith |
| 8,760,096 B2 | 6/2014 | Inamura et al. |
| 8,767,418 B2 | 7/2014 | Jungreis et al. |
| 8,773,052 B2 | 7/2014 | Clothier et al. |
| 8,796,967 B2 | 8/2014 | Sato |
| 8,817,506 B2 | 8/2014 | Shimomugi et al. |
| 8,823,292 B2 | 9/2014 | Sumi et al. |
| 8,829,976 B2 | 9/2014 | Kuwabara et al. |
| 8,836,253 B2 | 9/2014 | Kato et al. |
| 8,847,503 B2 | 9/2014 | Chang et al. |
| 8,866,459 B2 | 10/2014 | Zilberberg |
| 8,884,560 B2 | 11/2014 | Ito |
| 8,896,248 B2 | 11/2014 | Becerra et al. |
| 8,928,262 B2 | 1/2015 | Chretien |
| 8,933,654 B2 | 1/2015 | Chen et al. |
| 8,937,821 B2 | 1/2015 | Amano et al. |
| 8,941,347 B2 | 1/2015 | Otorii et al. |
| 8,941,365 B2 | 1/2015 | Murdock et al. |
| 8,976,551 B2 | 3/2015 | Igarashi et al. |
| 9,020,731 B2 | 4/2015 | Yamada |
| 9,030,143 B2 | 5/2015 | Guzelgunler |
| 9,065,365 B2 | 6/2015 | Omata et al. |
| 9,065,367 B2 | 6/2015 | Greetham |
| 9,070,224 B1 | 6/2015 | Esfahbod MirHosseinZadeh Sarabi et al. |
| 9,071,186 B2 | 6/2015 | Wu et al. |
| 9,088,232 B2 | 7/2015 | Marcinkiewicz et al. |
| 9,088,237 B2 | 7/2015 | Sanchez et al. |
| 9,093,941 B2 | 7/2015 | Lawrence et al. |
| 9,100,019 B2 | 8/2015 | Akiyama |
| 9,109,959 B2 | 8/2015 | Nieddu et al. |
| 9,118,260 B2 | 8/2015 | Gautier et al. |
| 9,124,095 B1 | 9/2015 | Barron et al. |
| 9,124,200 B2 | 9/2015 | Dai |
| 9,130,493 B2 | 9/2015 | Chen et al. |
| 9,134,183 B2 | 9/2015 | Jeong et al. |
| 9,136,757 B2 | 9/2015 | Arisawa et al. |
| 9,136,790 B2 | 9/2015 | Park et al. |
| 9,154,061 B2 | 10/2015 | Green et al. |
| 9,185,768 B2 | 11/2015 | Navabi-Shirazi et al. |
| 9,188,491 B2 | 11/2015 | Pan |
| 9,190,926 B2 | 11/2015 | Taguchi |
| 9,197,132 B2 | 11/2015 | Artusi et al. |
| 9,214,881 B2 | 12/2015 | Sekimoto et al. |
| 9,225,258 B2 | 12/2015 | Shimomugi et al. |
| 9,225,284 B2 | 12/2015 | Ried |
| 9,240,739 B2 | 1/2016 | Fukuta et al. |
| 9,246,398 B2 | 1/2016 | Sakakibara et al. |
| 9,246,418 B2 | 1/2016 | Becker et al. |
| 9,247,608 B2 | 1/2016 | Chitta et al. |
| 9,250,299 B1 | 2/2016 | Yarlagadda et al. |
| 9,257,931 B2 | 2/2016 | Tooyama et al. |
| 9,300,241 B2 | 3/2016 | Becerra et al. |
| 9,312,780 B2 | 4/2016 | Taguchi |
| 9,322,717 B1 | 4/2016 | Dhaliwal et al. |
| 9,322,867 B2 | 4/2016 | Chatroux et al. |
| 9,325,517 B2 | 4/2016 | Grohman |
| 9,331,598 B2 | 5/2016 | Jeong et al. |
| 9,331,614 B2 | 5/2016 | Becerra et al. |
| 9,387,800 B2 | 7/2016 | Tran |
| 9,407,093 B2 | 8/2016 | Cummings |
| 9,407,135 B2 | 8/2016 | Kinomura et al. |
| 9,419,513 B2 | 8/2016 | Mao et al. |
| 9,425,610 B2 | 8/2016 | Nakashita et al. |
| 9,431,915 B2 | 8/2016 | Arisawa et al. |
| 9,431,923 B2 | 8/2016 | Harada et al. |
| 9,438,029 B2 | 9/2016 | Cameron |
| 9,444,331 B2 | 9/2016 | Carletti et al. |
| 9,461,577 B2 | 10/2016 | Ried |
| 9,479,070 B2 | 10/2016 | van der Merwe |
| 9,502,981 B2 | 11/2016 | Schaemann et al. |
| 9,504,105 B2 | 11/2016 | Ekbote et al. |
| 9,560,718 B2 | 1/2017 | Sadwick |
| 9,564,846 B2 | 2/2017 | Marcinkiewicz et al. |
| 9,564,848 B2 | 2/2017 | Ishizeki et al. |
| 9,565,731 B2 | 2/2017 | DeJonge |
| 9,577,534 B2 | 2/2017 | Ishizeki et al. |
| 9,580,858 B2 | 2/2017 | Maekawa et al. |
| 9,581,626 B2 | 2/2017 | Schwind |
| 9,595,889 B2 | 3/2017 | Li et al. |
| 9,618,249 B2 | 4/2017 | Hatakeyama et al. |
| 9,621,101 B2 | 4/2017 | Kane |
| 9,625,190 B2 | 4/2017 | Lee et al. |
| 9,634,602 B2 | 4/2017 | Hou et al. |
| 9,640,617 B2 | 5/2017 | Das et al. |
| 9,641,063 B2 | 5/2017 | Ramabhadran et al. |
| 9,641,115 B2 | 5/2017 | Chretien |
| 9,654,048 B2 | 5/2017 | West et al. |
| 9,667,169 B2 | 5/2017 | Nawa et al. |
| 9,683,904 B2 | 6/2017 | Matsumoto et al. |
| 9,692,312 B2 | 6/2017 | Yuasa et al. |
| 9,692,332 B2 | 6/2017 | Taoka et al. |
| 9,696,693 B2 | 7/2017 | Element |
| 9,698,768 B2 | 7/2017 | Leong et al. |
| 9,712,071 B2 | 7/2017 | Yuasa et al. |
| 9,715,913 B1 | 7/2017 | Yin et al. |
| 9,722,488 B2 | 8/2017 | Ishizeki et al. |
| 9,732,991 B2 | 8/2017 | An et al. |
| 9,741,182 B2 | 8/2017 | Zhu |
| 9,742,319 B2 | 8/2017 | Marvelly et al. |
| 9,742,346 B2 | 8/2017 | Esnault |
| 9,746,812 B2 | 8/2017 | Kosaka |
| 9,762,119 B2 | 9/2017 | Kim et al. |
| 9,772,131 B2 | 9/2017 | Hatakeyama et al. |
| 9,772,381 B2 | 9/2017 | Bock et al. |
| 9,780,683 B2 | 10/2017 | Sakakibara et al. |
| 9,787,175 B2 | 10/2017 | Phadke |
| 9,787,246 B2 | 10/2017 | Tsumura et al. |
| 9,791,327 B2 | 10/2017 | Rhee et al. |
| 9,800,138 B2 | 10/2017 | Katsumata |

(56) References Cited

U.S. PATENT DOCUMENTS

| | | |
|---|---|---|
| 9,813,000 B2 | 11/2017 | Jabusch et al. |
| 9,816,743 B2 | 11/2017 | Nakase et al. |
| 9,819,294 B2 | 11/2017 | Park et al. |
| 9,823,105 B2 | 11/2017 | Lehmkuhl et al. |
| 9,829,226 B2 | 11/2017 | Hatakeyama et al. |
| 9,829,234 B2 | 11/2017 | Hatakeyama et al. |
| 9,837,952 B1 | 12/2017 | Carcia et al. |
| 9,839,103 B2 | 12/2017 | Avrahamy |
| 9,852,559 B2 | 12/2017 | Rettig et al. |
| 9,853,559 B2 | 12/2017 | Taniguchi et al. |
| 9,867,263 B2 | 1/2018 | Avrahamy |
| 9,870,009 B2 | 1/2018 | Erwin et al. |
| 9,882,466 B2 | 1/2018 | Kondo et al. |
| 9,888,535 B2 | 2/2018 | Chitta et al. |
| 9,888,540 B2 | 2/2018 | DeJonge |
| 9,893,522 B2 | 2/2018 | Wallace et al. |
| 9,893,603 B2 | 2/2018 | Nishizawa et al. |
| 9,893,668 B2 | 2/2018 | Hart et al. |
| 9,899,916 B2 | 2/2018 | Okamura et al. |
| 9,929,636 B2 | 3/2018 | Shinomoto et al. |
| 9,935,569 B2 | 4/2018 | Tsumura et al. |
| 9,935,571 B2 | 4/2018 | Frampton et al. |
| 9,941,834 B2 | 4/2018 | Tsukano et al. |
| 9,954,473 B2 | 4/2018 | Je et al. |
| 9,954,475 B2 | 4/2018 | Cho et al. |
| 9,965,928 B2 | 5/2018 | Green |
| 9,973,129 B2 | 5/2018 | Schuster et al. |
| 9,998,049 B2 | 6/2018 | Kashima et al. |
| 10,003,277 B2 | 6/2018 | Taguchi et al. |
| 10,014,858 B2 | 7/2018 | Flynn et al. |
| 2002/0085468 A1 | 7/2002 | Kobayashi |
| 2003/0021127 A1 | 1/2003 | Loef et al. |
| 2003/0117818 A1 | 6/2003 | Ota |
| 2003/0218448 A1 | 11/2003 | Lidak et al. |
| 2004/0136208 A1 | 7/2004 | Agarwal et al. |
| 2004/0183513 A1 | 9/2004 | Vinciarelli |
| 2005/0017695 A1 | 1/2005 | Stanley |
| 2005/0017699 A1 | 1/2005 | Stanley |
| 2005/0028539 A1 | 2/2005 | Singh et al. |
| 2005/0068337 A1 | 3/2005 | Duarte et al. |
| 2005/0076659 A1 | 4/2005 | Wallace et al. |
| 2005/0109047 A1 | 5/2005 | Park et al. |
| 2005/0122082 A1 | 6/2005 | Eckardt |
| 2006/0022648 A1 | 2/2006 | Ben-Yaakov et al. |
| 2006/0245219 A1 | 11/2006 | Li |
| 2007/0012052 A1 | 1/2007 | Butler et al. |
| 2007/0036212 A1 | 2/2007 | Leung et al. |
| 2007/0217233 A1 | 9/2007 | Lim et al. |
| 2008/0000246 A1 | 1/2008 | Ha et al. |
| 2008/0104983 A1 | 5/2008 | Yamai et al. |
| 2008/0115512 A1 | 5/2008 | Rizzo |
| 2008/0122418 A1 | 5/2008 | Briere et al. |
| 2008/0272748 A1* | 11/2008 | Melanson ............ H02M 1/4225 323/207 |
| 2008/0310201 A1 | 12/2008 | Maksimovic |
| 2009/0085625 A1 | 4/2009 | Melanson |
| 2009/0178424 A1 | 7/2009 | Hwang et al. |
| 2009/0251198 A1 | 10/2009 | Rudolph |
| 2009/0273297 A1 | 11/2009 | Kelly |
| 2010/0067270 A1* | 3/2010 | Odell ..................... H02M 1/12 363/89 |
| 2010/0117545 A1 | 5/2010 | Kelly et al. |
| 2010/0207536 A1 | 8/2010 | Burdalski et al. |
| 2010/0253295 A1 | 10/2010 | Tan et al. |
| 2010/0309700 A1 | 12/2010 | Maeda et al. |
| 2011/0012526 A1 | 1/2011 | Kelly |
| 2011/0015788 A1 | 1/2011 | Celik et al. |
| 2011/0030396 A1 | 2/2011 | Marcinkiewicz et al. |
| 2011/0030398 A1 | 2/2011 | Marcinkiewicz et al. |
| 2011/0031911 A1 | 2/2011 | Marcinkiewicz et al. |
| 2011/0031920 A1 | 2/2011 | Henderson et al. |
| 2011/0031942 A1 | 2/2011 | Green |
| 2011/0031943 A1 | 2/2011 | Green |
| 2011/0034176 A1 | 2/2011 | Lord et al. |
| 2011/0141774 A1 | 6/2011 | Kane et al. |
| 2011/0164339 A1 | 7/2011 | Schmid et al. |
| 2011/0170324 A1 | 7/2011 | Hsieh et al. |
| 2011/0204820 A1 | 8/2011 | Tikkanen et al. |
| 2011/0205161 A1 | 8/2011 | Myers et al. |
| 2011/0304279 A1 | 12/2011 | Felty |
| 2012/0013282 A1 | 1/2012 | Introwicz |
| 2012/0075310 A1 | 3/2012 | Michail et al. |
| 2012/0153396 A1 | 6/2012 | Sugiura et al. |
| 2012/0153916 A1* | 6/2012 | Weinstein ............... H02M 3/07 323/283 |
| 2012/0179299 A1 | 7/2012 | Gyota et al. |
| 2012/0280637 A1 | 11/2012 | Tikkanen et al. |
| 2012/0313646 A1* | 12/2012 | Nishikawa .......... H02M 1/4225 324/415 |
| 2013/0010508 A1 | 1/2013 | Courtel |
| 2013/0020310 A1 | 1/2013 | Hacham |
| 2013/0147269 A1 | 6/2013 | Zimmermann et al. |
| 2013/0170260 A1 | 7/2013 | Kitamura et al. |
| 2013/0182470 A1 | 7/2013 | Chen et al. |
| 2014/0001993 A1 | 1/2014 | Iwata et al. |
| 2014/0015463 A1 | 1/2014 | Merkel et al. |
| 2014/0077770 A1 | 3/2014 | Omoto et al. |
| 2014/0091622 A1 | 4/2014 | Lucas et al. |
| 2014/0169046 A1 | 6/2014 | Chen |
| 2014/0285163 A1* | 9/2014 | Lin ........................ H02M 1/42 323/205 |
| 2014/0292212 A1 | 10/2014 | Gray et al. |
| 2015/0043252 A1* | 2/2015 | Kuang ............... H02M 3/33507 363/21.16 |
| 2015/0084563 A1 | 3/2015 | Lucas et al. |
| 2015/0109077 A1 | 4/2015 | Tomimbang et al. |
| 2015/0191133 A1 | 7/2015 | Okamura et al. |
| 2015/0214833 A1 | 7/2015 | Ramabhadran et al. |
| 2015/0219503 A1 | 8/2015 | Yoshida |
| 2015/0229204 A1 | 8/2015 | Mao et al. |
| 2015/0236581 A1 | 8/2015 | Chen et al. |
| 2015/0285691 A1 | 10/2015 | Caffee et al. |
| 2015/0326107 A1 | 11/2015 | Hsiao et al. |
| 2015/0333633 A1 | 11/2015 | Chen et al. |
| 2015/0354870 A1 | 12/2015 | Lee et al. |
| 2015/0365034 A1* | 12/2015 | Marcinkiewicz ... H02M 1/4225 318/400.3 |
| 2016/0013740 A1 | 1/2016 | Skinner et al. |
| 2016/0043632 A1 | 2/2016 | Tomioka |
| 2016/0043633 A1 | 2/2016 | Phadke |
| 2016/0094039 A1 | 3/2016 | Winstanley et al. |
| 2016/0133411 A1 | 5/2016 | Bock et al. |
| 2016/0218624 A1 | 7/2016 | Ishieki et al. |
| 2016/0248365 A1 | 8/2016 | Ishizeki et al. |
| 2016/0261217 A1 | 9/2016 | Tang |
| 2016/0263331 A1 | 9/2016 | Nessel et al. |
| 2016/0268839 A1 | 9/2016 | Mouridsen |
| 2016/0268949 A1 | 9/2016 | Benn |
| 2016/0268951 A1 | 9/2016 | Cho et al. |
| 2016/0320249 A1 | 11/2016 | Reiman et al. |
| 2016/0329716 A1 | 11/2016 | Inoue |
| 2017/0141709 A1 | 5/2017 | Fukuda et al. |
| 2017/0141717 A1 | 5/2017 | Winstanley et al. |
| 2017/0155347 A1 | 6/2017 | Park et al. |
| 2017/0190530 A1 | 7/2017 | Seki et al. |
| 2017/0201201 A1 | 7/2017 | Aoki et al. |
| 2017/0205103 A1 | 7/2017 | Newcomb |
| 2017/0214341 A1 | 7/2017 | Matthews et al. |
| 2017/0244325 A1 | 8/2017 | Carralero et al. |
| 2017/0264223 A1 | 9/2017 | Kitano et al. |
| 2017/0287721 A1 | 10/2017 | Wood |
| 2017/0288561 A1 | 10/2017 | Lemberg et al. |
| 2017/0299444 A1 | 10/2017 | Green |
| 2017/0300107 A1 | 10/2017 | Green et al. |
| 2017/0301192 A1 | 10/2017 | Green |
| 2017/0302159 A1 | 10/2017 | Green et al. |
| 2017/0302160 A1 | 10/2017 | Marcinkiewicz et al. |
| 2017/0302161 A1 | 10/2017 | Green |
| 2017/0302162 A1 | 10/2017 | Green |
| 2017/0302165 A1 | 10/2017 | Marcinkiewicz et al. |
| 2017/0302200 A1 | 10/2017 | Marcinkiewicz |
| 2017/0302212 A1 | 10/2017 | Marcinkiewicz et al. |
| 2017/0302214 A1 | 10/2017 | Marcinkiewicz et al. |
| 2017/0317623 A1 | 11/2017 | Taniguchi et al. |

(56) References Cited

U.S. PATENT DOCUMENTS

| | | | |
|---|---|---|---|
| 2017/0317637 | A1 | 11/2017 | VanEyll et al. |
| 2017/0324362 | A1 | 11/2017 | Colangelo et al. |
| 2017/0328786 | A1 | 11/2017 | Takechi |
| 2017/0373629 | A1 | 12/2017 | Shin et al. |
| 2018/0026544 | A1 | 1/2018 | Baumann et al. |
| 2018/0034403 | A1 | 2/2018 | Kim et al. |
| 2018/0062551 | A1 | 3/2018 | Moon et al. |
| 2018/0073934 | A1 | 3/2018 | Horng et al. |
| 2018/0076748 | A1 | 3/2018 | Yamasaki et al. |
| 2018/0082991 | A1 | 3/2018 | Toyoda et al. |
| 2018/0091075 | A1 | 3/2018 | Musil |
| 2018/0094512 | A1 | 4/2018 | Sadilek et al. |
| 2018/0175752 | A1 | 6/2018 | Takeoka et al. |
| 2018/0180490 | A1 | 6/2018 | Barbier et al. |
| 2018/0191261 | A1 | 7/2018 | Chung et al. |
| 2018/0191288 | A1 | 7/2018 | Li et al. |

FOREIGN PATENT DOCUMENTS

| | | |
|---|---|---|
| CN | 102412712 A | 4/2012 |
| CN | 103001463 A | 3/2013 |
| CN | 103078475 A | 5/2013 |
| CN | 103822334 A | 5/2014 |
| CN | 203775025 | 8/2014 |
| CN | 105078416 A | 11/2015 |
| CN | 105207652 A | 12/2015 |
| EP | 0377538 A2 | 7/1990 |
| EP | 0744816 A2 | 11/1996 |
| EP | 1271067 A1 | 1/2003 |
| EP | 1641113 A1 | 3/2006 |
| EP | 1689069 A2 | 8/2006 |
| EP | 2237402 A1 | 10/2010 |
| EP | 2403120 A2 | 1/2012 |
| EP | 2983283 A1 | 2/2016 |
| JP | H11237427 A | 8/1999 |
| JP | 2001289549 A | 10/2001 |
| JP | 2006134607 A | 5/2006 |
| JP | 2010541256 A | 12/2010 |
| JP | 2011160508 A | 8/2011 |
| JP | 2011193647 A | 9/2011 |
| JP | 2015080316 A | 4/2015 |
| KR | 20040025420 A | 3/2004 |
| KR | 20110092055 A | 8/2011 |
| KR | 20130067440 A | 6/2013 |
| WO | WO-2007035407 A1 | 3/2007 |
| WO | WO-2010143239 A1 | 12/2010 |
| WO | WO-2011074972 A1 | 6/2011 |

OTHER PUBLICATIONS

U.S. Appl. No. 15/430,978, filed Feb. 13, 2017, Charles E. Green.
U.S. Appl. No. 15/487,201, filed Apr. 13, 2017, Joseph G. Marcinkiewicz.
U.S. Appl. No. 15/487,426, filed Apr. 13, 2017, Charles E. Green.
International Search Report regarding International Application No. PCT/US2017/027726, dated Sep. 12, 2017.
Written Opinion of the International Searching Authority regarding International Application No. PCT/US2017/027726, dated Sep. 12, 2017.
International Search Report regarding International Application No. PCT/US2017/027729, dated Sep. 13, 2017.
Written Opinion of the International Searching Authority regarding International Application No. PCT/US2017/027729, dated Sep. 13, 2017.
International Search Report regarding International Application No. PCT/US2017/027691, dated Aug. 18, 2017.
Written Opinion of the International Searching Authority regarding International Application No. PCT/US2017/027691, dated Aug. 18, 2017.
International Search Report regarding International Application No. PCT/US2017/027744, dated Aug. 18, 2017.
Written Opinion of the International Searching Authority regarding International Application No. PCT/US2017/027744, dated Aug. 18, 2017.
International Search Report regarding International Application No. PCT/US2017/027738, dated Aug. 18, 2017.
Written Opinion of the International Searching Authority regarding International Application No. PCT/US2017/027738, dated Aug. 18, 2017.
Office Action regarding U.S. Appl. No. 15/419,394, dated Sep. 11, 2017.
International Search Report regarding International Application No. PCT/US2017/027710, dated Sep. 20, 2017.
Written Opinion of the International Searching Authority regarding International Application No. PCT/US2017/027710, dated Sep. 20, 2017.
Amit Kumar Sinha et al. "SEPIC Based PFC Converter for PMBLDCM Drive in Air Conditioning System." International Journal of Advanced Computer Research, vol. 3, No. 1, Issue 8. Mar. 2013.
International Search Report regarding International Application No. PCT/US2017/027721, dated Sep. 20, 2017.
Written Opinion of the International Searching Authority regarding International Application No. PCT/US2017/027721, dated Sep. 20, 2017.
International Search Report regarding International Application No. PCT/US2017/027699, dated Sep. 20, 2017.
Written Opinion of the International Searching Authority regarding International Application No. PCT/US2017/027699, dated Sep. 20, 2017.
Advisory Action regarding U.S. Appl. No. 15/419,394 dated Mar. 12, 2018.
Applicant-Initiated Interview Summary regarding U.S. Appl. No. 15/487,201 dated Mar. 5, 2018.
Final Office Action regarding U.S. Appl. No. 15/487,201 dated Apr. 19, 2018.
Non-Final Office Action regarding U.S. Appl. No. 15/487,101 dated Apr. 9, 2018.
Notice of Allowance regarding U.S. Appl. No. 15/430,978 dated Feb. 22, 2018.
Restriction Requirement regarding U.S. Appl. No. 15/487,151 dated Apr. 5, 2018.
Restriction Requirement regarding U.S. Appl. No. 15/487,226 dated Mar. 12, 2018.
Notice of Allowance regarding U.S. Appl. No. 15/419,394 dated May 11, 2018.
Notice of Allowance regarding U.S. Appl. No. 15/419,464 dated May 11, 2018.
Applicant-Initiated Interview Summary regarding U.S. Appl. No. 15/487,027 dated Jun. 21, 2018.
Applicant-Initiated Interview Summary regarding U.S. Appl. No. 15/487,101 dated Jun. 21, 2018.
Applicant-Initiated Interview Summary regarding U.S. Appl. No. 15/487,201 dated May 30, 2018.
Non-Final Office Action regarding U.S. Appl. No. 15/487,226 dated May 16, 2018.
Notice of Allowance regarding U.S. Appl. No. 15/419,394 dated Jul. 20, 2018.
Notice of Allowance regarding U.S. Appl. No. 15/487,201 dated Jul. 20, 2018.
Restriction Requirement regarding U.S. Appl. No. 15/487,175 dated May 16, 2018.
Corrected Notice of Allowability regarding U.S. Appl. No. 15/419,394 dated Sep. 10, 2018.
Final Office Action regarding U.S. Appl. No. 15/487,101 dated Nov. 14, 2018.
Non-Final Office Action regarding U.S. Appl. No. 15/419,349 dated Oct. 18, 2018.
Notice of Allowance regarding U.S. Appl. No. 15/419,394 dated Aug. 27, 2018.
Notice of Allowance regarding U.S. Appl. No. 15/419,464 dated Sep. 24, 2018.
Notice of Allowance regarding U.S. Appl. No. 15/487,027 dated Oct. 2, 2018.
Notice of Allowance regarding U.S. Appl. No. 15/487,151 dated Oct. 25, 2018.

(56) References Cited

OTHER PUBLICATIONS

Notice of Allowance regarding U.S. Appl. No. 15/487,175 dated Oct. 3, 2018.
U.S. Appl. No. 15/419,394, filed Jan. 30, 2017, Charles E. Green.
U.S. Appl. No. 15/419,464, filed Jan. 30, 2017, Charles E. Green.
U.S. Appl. No. 15/487,027, filed Apr. 13, 2017, Joseph G. Marcinkiewicz.
U.S. Appl. No. 15/487,101, filed Apr. 13, 2017, Joseph G. Marcinkiewicz.
Applicant-Initiated Interview Summary regarding U.S. Appl. No. 15/487,101 dated Jan. 13, 2019.
EPO Communication regarding Rules 161/162 for related PCT Application No. US2017027691 dated Nov. 23, 2018.
Non-Final Office Action regarding U.S. Appl. No. 15/487,175 dated Jan. 10, 2019.
Non-Final Office Action regarding U.S. Appl. No. 15/487,226 dated Jan. 7, 2019.
Notice of Allowance regarding U.S. Appl. No. 15/943,660 dated Jan. 25, 2019.
Notice of Allowance regarding U.S. Appl. No. 15/419,464 dated Jan. 25, 2019.
Notice of Allowance regarding U.S. Appl. No. 15/487,027 dated Jan. 25, 2019.
Notice of Allowance regarding U.S. Appl. No. 15/419,394 dated Jan. 11, 2019.
Notice of Allowance regarding U.S. Appl. No. 15/487,101 dated Feb. 1, 2019.
Notice of Allowance regarding U.S. Appl. No. 15/487,151 dated Jan. 9, 2019.
Non-Final Office Action regarding U.S. Appl. No. 15/419,349 dated Apr. 18, 2019.
Notice of Allowance regarding U.S. Appl. No. 15/943,660 dated May 22, 2019.
Final Office Action regarding U.S. Appl. No. 15/487,226 dated Jul. 9, 2019.
U.S. Appl. No. 15/487,151, filed Apr. 13, 2017, Charles E. Green.
U.S. Appl. No. 15/943,660, filed Apr. 2, 2018, Charles E. Green.
Advisory Action regarding U.S. Appl. No. 15/487,175 dated Oct. 24, 2019.
Applicant-Initiated Interview Summary regarding U.S. Appl. No. 16/433,548 dated Dec. 11, 2019.
Choi Bo H et al: "A Novel Single-SiC-Switch-Based ZVZCS Tapped Boost Converter", IEEE Tranactions on Power Electronics, Institute of Electrical and Electronics Engineers, USA vol. 29, No. 10, Oct. 1, 2014, (Oct. 1, 2014) pp. 5181-5194, XP011549983, ISSN: 0885-8993, DOI: 10.1109/TPEL.2013.2293813 [retrieved on Jun. 2, 2014].
European Search Report on Euripean Patent Application No. EP 17 78 3275 dated Nov. 13, 2019.
Final Office Action regarding U.S. Appl. No. 16/433,548 dated Mar. 30, 2020.
Final Office Action regarding U.S. Appl. No. 15/487,175 dated Jul. 29, 2019.
First Office Action for Chinese Application No. CN201780029917.6 dated Jan. 20, 2020. Translation provided.
Non-Final Office Action regarding U.S. Appl. No. 15/419,349 dated Oct. 4, 2019.
Non-Final Office Action regarding U.S. Appl. No. 16/43,548 dated Sep. 30, 2019.
Notice of Allowance regarding U.S. Appl. No. 15/419,349 dated Jan. 10, 2020.
Supplementary Search Report for EP 17783287 dated Nov. 22, 2019; 8 pages.
U.S. Appl. No. 15/419,349, filed Jan. 30, 2017, Charles E. Green.
U.S. Appl. No. 15/487,175, filed Apr. 13, 2017, Joseph G. Marcinkiewicz.
U.S. Appl. No. 15/487,226, filed Apr. 13, 2017, Joseph G. Marcinkiewicz.
U.S. Appl. No. 16/433,548, filed Jun. 6, 2019, Joseph G. Marcinkiewicz.
U.S. Appl. No. 16/595,277, filed Oct. 7, 2019, Charles E. Green.
Interview Summary regarding U.S. Appl. No. 15/419,394 dated Jan. 29, 2018.
Office Action regarding U.S. Appl. No. 15/419,464 dated Dec. 29, 2017.
Office Action regarding U.S. Appl. No. 15/419,394, dated Dec. 7, 2017.
Office Action regarding U.S. Appl. No. 15/487,201 dated Jan. 9, 2018.
First Office Action for Chinese Application No. CN201780035647.X dated Mar. 26, 2020. Translation provided.

* cited by examiner

SWITCH OFF TIME CONTROL SYSTEMS AND METHODS

CROSS-REFERENCE TO RELATED APPLICATIONS

This application claims the benefit of U.S. Provisional Application No. 62/323,538, filed on Apr. 15, 2016. The entire disclosure of the application referenced above is incorporated herein by reference.

FIELD

The present disclosure relates to a voltage converters and, more particularly, to circuits for filtering systems and methods controlling switching of voltage converters.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

SUMMARY

In a feature, a power factor correction (PFC) system is described. A desired OFF period module determines a desired OFF period for a switch of a PFC circuit based on an input voltage to the PFC circuit and an output voltage of the PFC circuit. A switching control module transitions the switch from an ON state to an OFF state when a measured current through an inductor of the PFC circuit is greater than a demanded current through the inductor and maintains the switch in the OFF state for the desired OFF period after the transition from the ON state to the OFF state.

In further features, the desired OFF period module sets the desired OFF period using one of: (i) an equation that relates input voltages and output voltages to desired OFF periods; and (ii) a look-up table that relates input voltages and output voltages to desired OFF periods.

In further features, the desired OFF period module sets the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage.

In further features, the switching control module: in response to a determination that a period between (i) a time of the transition from the ON state to the OFF state and (ii) a present time is greater than the desired OFF period, transitions the switch from the OFF state to the ON state; and maintains the switch in the ON state until the measured current through the inductor of the PFC circuit is greater than the demanded current through the inductor.

In further features, a current demand module determines the demanded current through the inductor based on a difference between the output voltage and a desired value of the output voltage.

In further features, the desired OFF period module determines the desired OFF period further based on a switching period of the switch.

In further features, a desired ON period module that determines a desired ON period for the switch, the desired ON period is variable, and the desired OFF period module sets the desired OFF period based on the switching period minus the desired ON period.

In further features, a desired ON period module sets a desired ON period for the switch based on a maximum current through the inductor, the demanded current through the inductor, and the input voltage, and the desired OFF period module sets the desired OFF period based on the switching period minus the desired ON period.

In further features, a desired ON period module sets a desired ON period for the switch based on a maximum current through the inductor, the demanded current through the inductor, the input voltage, and the output voltage. The desired OFF period module sets the desired OFF period based on the switching period minus the desired ON period.

In further features: a discontinuous mode ON period module determines a first expected ON period for discontinuous mode operation based on a maximum current through the inductor, the demanded current through the inductor, and the input voltage; a continuous mode ON period module determines a second expected ON period for continuous mode operation based on the maximum current through the inductor, the demanded current through the inductor, the input voltage, and the output voltage; and an expected ON period module sets a third expected ON period for the switch to one of the first expected ON period and the second expected ON period. The desired OFF period module sets the desired OFF period based on the switching period minus the third expected ON period.

In a feature, a power factor correction (PFC) method includes: determining a desired OFF period for a switch of a PFC circuit based on an input voltage to the PFC circuit and an output voltage of the PFC circuit; transitioning the switch from an ON state to an OFF state when a measured current through an inductor of the PFC circuit is greater than a demanded current through the inductor; and maintaining the switch in the OFF state for the desired OFF period after the transition from the ON state to the OFF state.

In further features, determining the desired OFF period includes setting the desired OFF period using one of: (i) an equation that relates input voltages and output voltages to desired OFF periods; and (ii) a look-up table that relates input voltages and output voltages to desired OFF periods.

In further features, determining the desired OFF period includes setting the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage.

In further features, the PFC method further includes: in response to a determination that a period between (i) a time of the transition from the ON state to the OFF state and (ii) a present time is greater than the desired OFF period, transitioning the switch from the OFF state to the ON state; and maintaining the switch in the ON state until the measured current through the inductor of the PFC circuit is greater than the demanded current through the inductor.

In further features, the PFC method further includes determining the demanded current through the inductor based on a difference between the output voltage and a desired value of the output voltage.

In further features, determining the desired OFF period includes determining the desired OFF period further based on a switching period of the switch.

In further features, the PFC method further includes determining a desired ON period for the switch, wherein the desired ON period is variable. Determining the desired OFF period includes setting the desired OFF period based on the switching period minus the desired ON period.

In further features, determining the desired ON period includes setting a desired ON period for the switch based on a maximum current through the inductor, the demanded current through the inductor, and the input voltage. The desired OFF period module sets the desired OFF period based on the switching period minus the desired ON period.

In further features, the PFC method further includes setting a desired ON period for the switch based on a maximum current through the inductor, the demanded current through the inductor, the input voltage, and the output voltage. Determining the desired OFF period includes setting the desired OFF period based on the switching period minus the desired ON period.

In further features, the PFC method further includes: determining a first expected ON period for discontinuous mode operation based on a maximum current through the inductor, the demanded current through the inductor, and the input voltage; determining a second expected ON period for continuous mode operation based on the maximum current through the inductor, the demanded current through the inductor, the input voltage, and the output voltage; and setting a third expected ON period for the switch to one of the first expected ON period and the second expected ON period. Determining the desired OFF period includes setting the desired OFF period based on the switching period minus the third expected ON period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Refrigeration System

Figure 1:
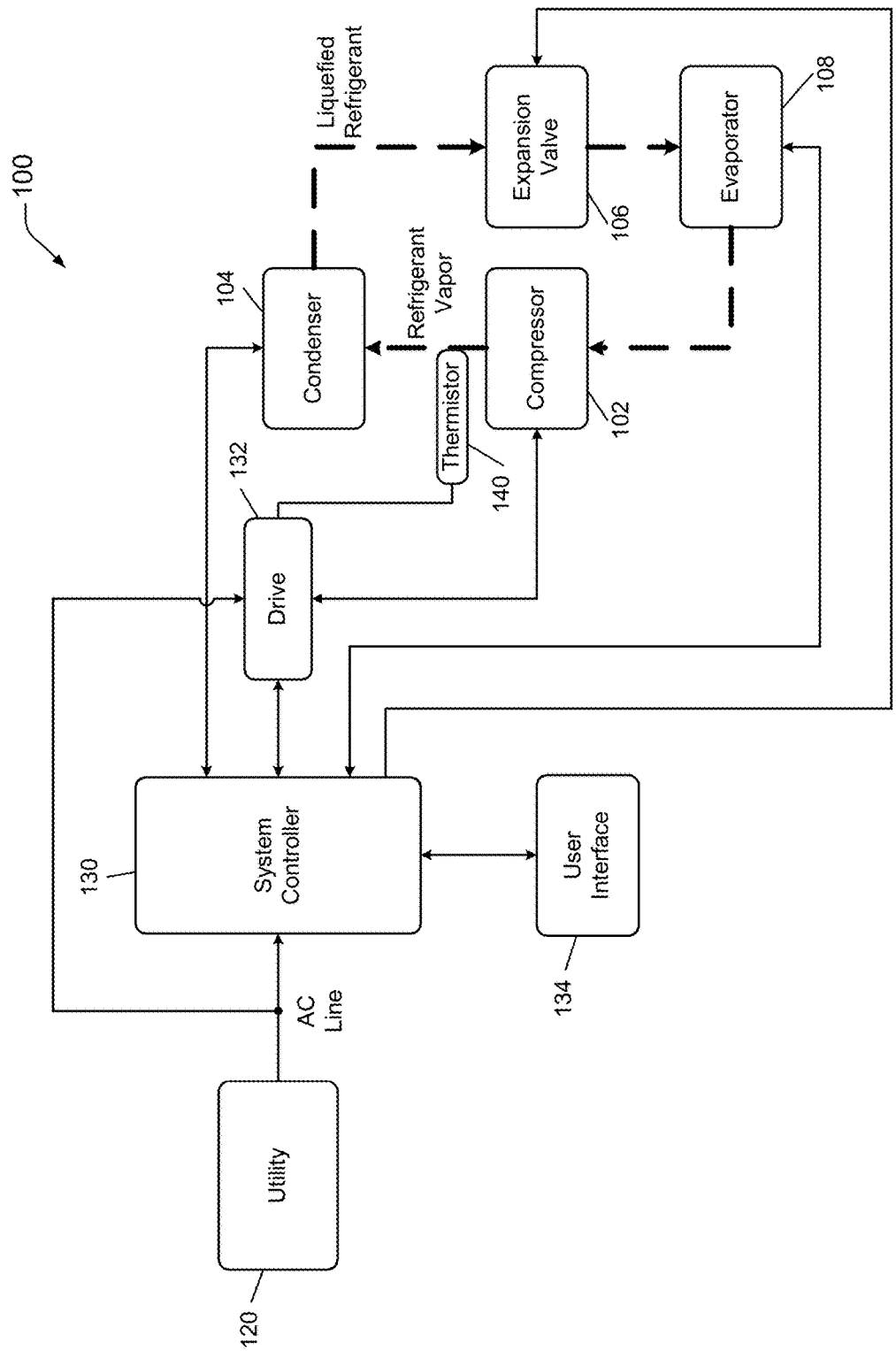
FIG. 1 is a functional block diagram of an example refrigeration system.

FIG. 1 is a functional block diagram of an example refrigeration system 100 including a compressor 102, a condenser 104, an expansion valve 106, and an evaporator 108. According to the principles of the present disclosure, the refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the system controller 130 via an AC line, which includes two or more conductors. The AC power may also be provided to a drive 132 via the AC line. The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the system controller (including, for example, actuating a heat source) may be incorporated into the thermostat.

The system controller 130 may control operation of the fan of the condenser 104, the fan of the evaporator 108, and the expansion valve 106. The drive 132 may control the compressor 102 based on commands from the system controller 130. For example only, the system controller 130 may instruct the drive 132 to operate the motor of the compressor 102 at a certain speed or to operate the compressor 102 at a certain capacity. In various implementations, the drive 132 may also control the condenser fan.

A thermistor 140 is thermally coupled to the refrigerant line exiting the compressor 102 that conveys refrigerant vapor to the condenser 104. The variable resistance of the thermistor 140 therefore varies with the discharge line temperature (DLT) of the compressor 102. As described in more detail, the drive 132 monitors the resistance of the thermistor 140 to determine the temperature of the refrigerant exiting the compressor 102.

The DLT may be used to control the compressor 102, such as by varying capacity of the compressor 102, and may also be used to detect a fault. For example, if the DLT exceeds the threshold, the drive 132 may power down the compressor 102 to prevent damage to the compressor 102.

Drive

Figure 2:
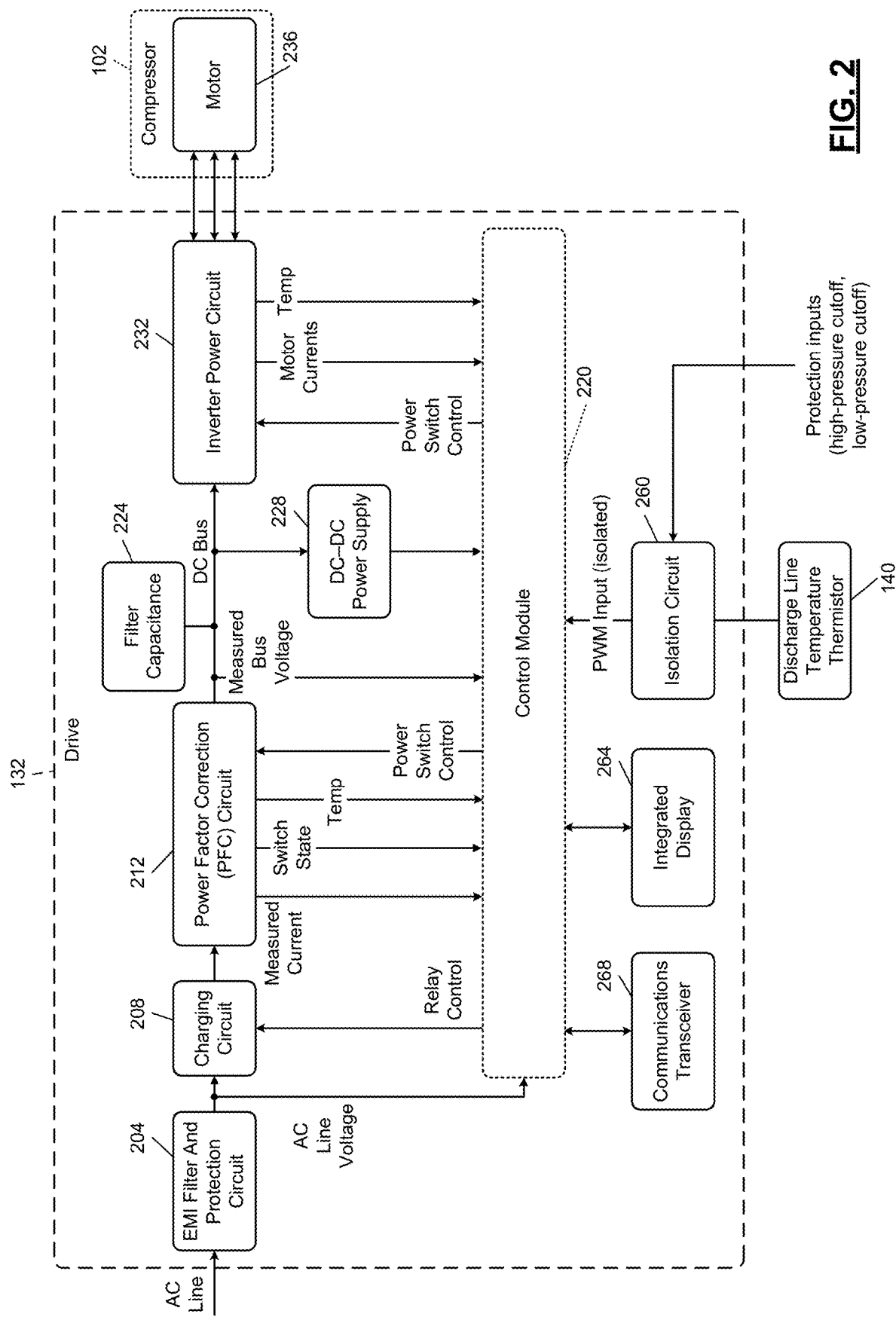
FIG. 2 is a block diagram of an example implementation of the compressor motor drive of FIG. 1.

In FIG. 2, an example implementation of the drive 132 includes an electromagnetic interference (EMI) filter and protection circuit 204, which receives power from an AC line. The EMI filter and protection circuit 204 reduces EMI that might otherwise be injected back onto the AC line from the drive 132. The EMI filter and protection circuit 204 may also remove or reduce EMI arriving from the AC line. Further, the EMI filter and protection circuit 204 protects against power surges, such as may be caused by lightening, and/or other types of power surges and sags.

A charging circuit 208 controls power supplied from the EMI filter and protection circuit 204 to a power factor correction (PFC) circuit 212. For example, when the drive 132 initially powers up, the charging circuit 208 may place a resistance in series between the EMI filter and protection circuit 204 and the PFC circuit 212 to reduce the amount of current inrush. These current or power spikes may cause various components to prematurely fail.

After initial charging is completed, the charging circuit 208 may close a relay that bypasses the current-limiting resistor. For example, a control module 220 may provide a relay control signal to the relay within the charging circuit 208. In various implementations, the control module 220 may assert the relay control signal to bypass the current-limiting resistor after a predetermined period of time following start up, or based on closed loop feedback indicating that charging is near completion.

The PFC circuit 212 converts incoming AC power to DC power. The PFC circuit 212 may not be limited to PFC functionality—for example, the PFC circuit 212 may also perform voltage conversion functions, such as acting as a boost circuit and/or a buck circuit. In some implementations, the PFC circuit 212 may be replaced by a non-PFC voltage converter. The DC power may have voltage ripples, which are reduced by filter capacitance 224. Filter capacitance 224 may include one or more capacitors arranged in parallel and connected to the DC bus. The PFC circuit 212 may attempt to draw current from the AC line in a sinusoidal pattern that matches the sinusoidal pattern of the incoming voltage. As the sinusoids align, the power factor approaches one, which represents the greatest efficiency and the least demanding load on the AC line.

The PFC circuit 212 includes one or more switches that are controlled by the control module 220 using one or more signals labeled as power switch control. The control module 220 determines the power switch control signals based on a measured voltage of the DC bus, measured current in the PFC circuit 212, AC line voltages, temperature or temperatures of the PFC circuit 212, and the measured state of a power switch in the PFC circuit 212. While the example of use of measured values is provided, the control module 220 may determine the power switch control signals based on an estimated voltage of the DC bus, estimated current in the PFC circuit 212, estimated AC line voltages, estimated temperature or temperatures of the PFC circuit 212, and/or the estimated or expected state of a power switch in the PFC circuit 212. In various implementations, the AC line voltages are measured or estimated subsequent to the EMI filter and protection circuit 204 but prior to the charging circuit 208.

The control module 220 is powered by a DC-DC power supply 228, which provides a voltage suitable for logic of the control module 220, such as 3.3 Volts, 2.5 Volts, etc. The DC-DC power supply 228 may also provide DC power for operating switches of the PFC circuit 212 and an inverter power circuit 232. For example only, this voltage may be a higher voltage than for digital logic, with 15 Volts being one example.

The inverter power circuit 232 also receives power switch control signals from the control module 220. In response to the power switch control signals, switches within the inverter power circuit 232 cause current to flow in respective windings of a motor 236 of the compressor 102. The control module 220 may receive a measurement or estimate of motor current for each winding of the motor 236 or each leg of the inverter power circuit 232. The control module 220 may also receive a temperature indication from the inverter power circuit 232.

For example only, the temperature received from the inverter power circuit 232 and the temperature received from the PFC circuit 212 are used only for fault purposes. In other words, once the temperature exceeds a predetermined threshold, a fault is declared and the drive 132 is either powered down or operated at a reduced capacity. For example, the drive 132 may be operated at a reduced capacity and if the temperature does not decrease at a predetermined rate, the drive 132 transitions to a shutdown state.

The control module 220 may also receive an indication of the discharge line temperature from the compressor 102 using the thermistor 140. An isolation circuit 260 may provide a pulse-width-modulated representation of the resistance of the thermistor 140 to the control module 220. The isolation circuit 260 may include galvanic isolation so that there is no electrical connection between the thermistor 140 and the control module 220.

The isolation circuit 260 may further receive protection inputs indicating faults, such as a high-pressure cutoff or a low-pressure cutoff, where pressure refers to refrigerant pressure. If any of the protection inputs indicate a fault and, in some implementations, if any of the protection inputs become disconnected from the isolation circuit 260, the isolation circuit 260 ceases sending the PWM temperature signal to the control module 220. Therefore, the control module 220 may infer that a protection input has been received from an absence of the PWM signal. The control module 220 may, in response, shut down the drive 132.

The control module 220 controls an integrated display 264, which may include a grid of LEDs and/or a single LED package, which may be a tri-color LED. The control module 220 can provide status information, such as firmware versions, as well as error information using the integrated display 264. The control module 220 communicates with external devices, such as the system controller 130 in FIG. 1, using a communications transceiver 268. For example only, the communications transceiver 268 may conform to the RS-485 or RS-232 serial bus standards or to the Controller Area Network (CAN) bus standard.

PFC Circuits

Figure 3A:
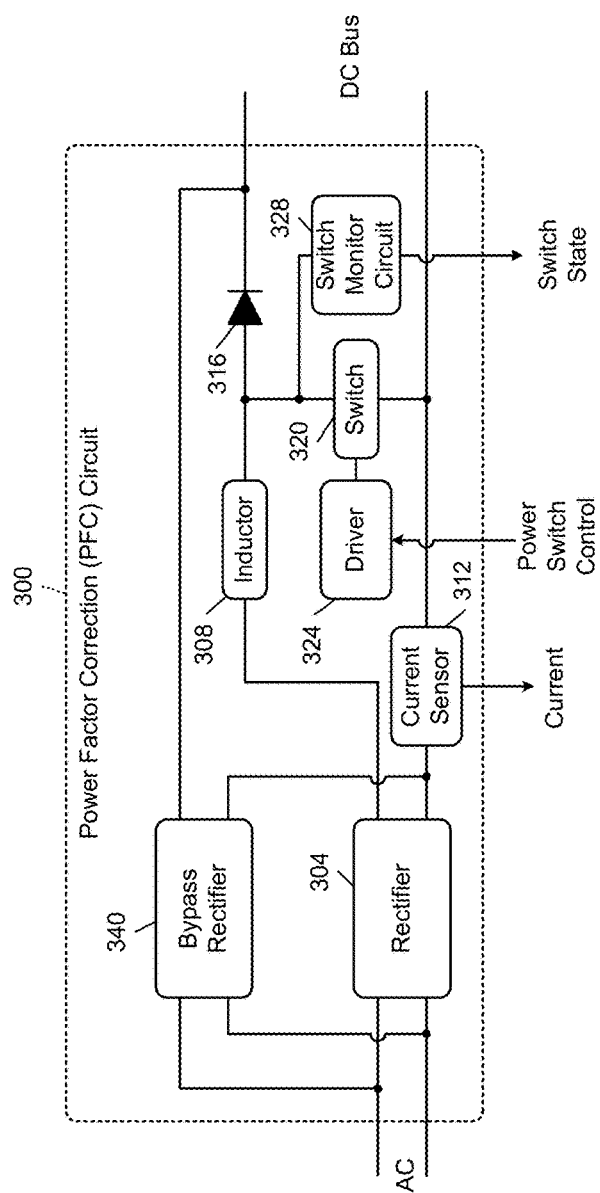
FIG. 3A is a block diagram of an example implementation of the power factor correction (PFC) circuit of FIG. 2.

In FIG. 3A, a PFC circuit 300 is one implementation of the PFC circuit 212 of FIG. 2. The PFC circuit 300 includes a rectifier 304 that converts incoming AC into pulsating DC. In various implementations, the rectifier 304 includes a full-wave diode bridge. The DC output of the rectifier 304 is across first and second terminals. The first terminal is connected to an inductor 308, while the second terminal is connected to a current sensor 312. An opposite end of the inductor 308 is connected to a node that is common to the inductor 308, an anode of a diode 316, and a first terminal of a switch 320.

The PFC circuit 300 generates a DC bus, where a first terminal of the DC bus is connected to a cathode of the diode 316 while a second terminal of the DC bus is connected to the second output terminal of the rectifier 304 via the current sensor 312. The current sensor 312 can, therefore, sense the current within the switch 320 as well as the current in the DC bus and current in the inductor 308. The second terminal of the DC bus is also connected to a second terminal of the switch 320.

A driver 324 receives the power switch control signal from the control module 220 of FIG. 2 and rapidly charges or discharges a control terminal of the switch 320. For example, the switch 320 may be a field effect transistor with a gate terminal as the control terminal. More specifically, the switch 320 may be a power metal-oxide-semiconductor field-effect transistor (MOSFET), such as the STW38N65M5 power MOSFET from STMicroelectronics. The driver 324, in response to the power switch control signal, charges or discharges the capacitance at the gate of the field effect transistor.

A switch monitor circuit 328 measures whether the switch is on or off. This closed loop control enables the control module 220 to determine whether the switch 320 has reacted to a command provided by the power switch control signal and may also be used to determine how long it takes the switch 320 to respond to that control signal. The measured switch state is output from the switch monitor circuit 328 back to the control module 220. The control module 220 may update its control of the power switch control signal to compensate for delays in turning on and/or turning off the switch 320.

In FIG. 3A, the inductor, the switch 320, and the diode 316 are arranged in a boost configuration. In brief, the switch 320 closes, causing current through the inductor 308 to increase. Then the switch 320 is opened, but the current through the inductor 308 cannot change instantaneously because the voltage across an inductor is proportional to the derivative of the current. The voltage across the inductor 308 becomes negative, meaning that the end of the inductor 308 connected to the anode of the diode 316 experiences a voltage increase above the voltage output from the rectifier 304.

Once the voltage at the anode of the diode 316 increases above the turn-on voltage of the diode 316, the current through the inductor 308 can be fed through the diode 316 to the DC bus. The current through the inductor 308 decreases and then the switch 320 is closed once more, causing the current and the inductor 308 to increase.

In various implementations, the switch 320 may be turned on until the current sensor 312 determines that a predetermined threshold of current has been exceeded. At that time, the switch 320 is turned off for a specified period of time. This specified period may be adaptive, changing along with the voltage of the DC bus as well as the voltage of the AC input change. However, the off time (when the switch 320 is open) is a specified value. Once a time equal to the specified value has elapsed, the switch 320 is turned back on again and the process repeats. The off time can be fixed or variable. In the case of the off time being variable, the off time can be limited to at least a predetermined minimum off time.

To reduce the physical size and parts cost of the PFC circuit 300, the inductance of the inductor 308 (which may be the largest contributor to the physical size of the PFC circuit 300) may be lowered. However, with a lower inductance, the inductor 308 will saturate more quickly. Therefore, the switch 320 will have to operate more quickly. While more quickly and smaller are relative terms, present power switching control operates in the range of 10 kilohertz to 20 kilohertz switching frequencies. In the present application, the switching frequency of the switch 320 may be increased to more than 50 kilohertz, more than 100 kilohertz, or more than 200 kilohertz. For example, the switching frequency of the switch may be controlled to be approximately 200 kilohertz.

The switch 320 is therefore chosen to allow for faster switching as well as to have low switching losses. With faster switching, the inductance of the inductor 308 can be smaller. In addition, the diode 316 may need to be faster. Silicon carbide diodes may have fast response times. For example, the diode 316 may be an STPSC2006CW Silicon Carbide dual diode package from STMicroelectronics.

In order to accurately drive the switch 320 when operating at higher speeds, the control strategy must similarly be accelerated. For example only, the control module 220 may include multiple devices, such as a microcontroller configured to perform more involved calculations and an FPGA (field programmable gate array) or PLD (programmable logic device) configured to monitor and respond to inputs in near real time. In this context, near real time means that the time resolution of measurement and time delay in responding to inputs of the FPGA or PLD is negligible compared to the physical time scale of interest. For faster switching speeds, the near real time response of the FPGA/PLD may introduce non-negligible delays. In such cases, the delay of the FPGA/PLD and driving circuitry may be measured and compensated for. For example, if the turn-off of a switch occurs later than needed because of a delay, the turn-off can be instructed earlier to compensate for the delay.

A bypass rectifier 340 is connected in parallel with the rectifier 304 at the AC line input. A second output terminal of the bypass rectifier 340 is connected to the second terminal rectifier 304. However, a first output terminal of the bypass rectifier 340 is connected to the cathode of the diode 316.

As a result, when the PFC circuit 300 is not operating to boost the DC bus voltage, the bypass rectifier 340 will be active when the line-to-line voltage of the AC input exceeds the voltage across the DC bus. The bypass rectifier 340, in these situations, diverts current from passing through the diode 316. Because the inductor 308 is small, and the switch 320 switches rapidly, the diode 316 is also selected to exhibit fast switching times. The diode 316 may, therefore, be less tolerant to high currents, and so current is selectively shunted around the diode 316 by the bypass rectifier 340.

In addition, the current path through the rectifier 304 and the diode 316 experiences three diode voltage drops or two diode voltage drops and the switch voltage drop, while the path through the bypass rectifier 340 experiences only two diode voltage drops. While the single phase AC input in FIG. 3A is associated with a boost converter topology, the present disclosure also encompasses a buck converter topology or a buck-boost converter topology.

Figure 3B:
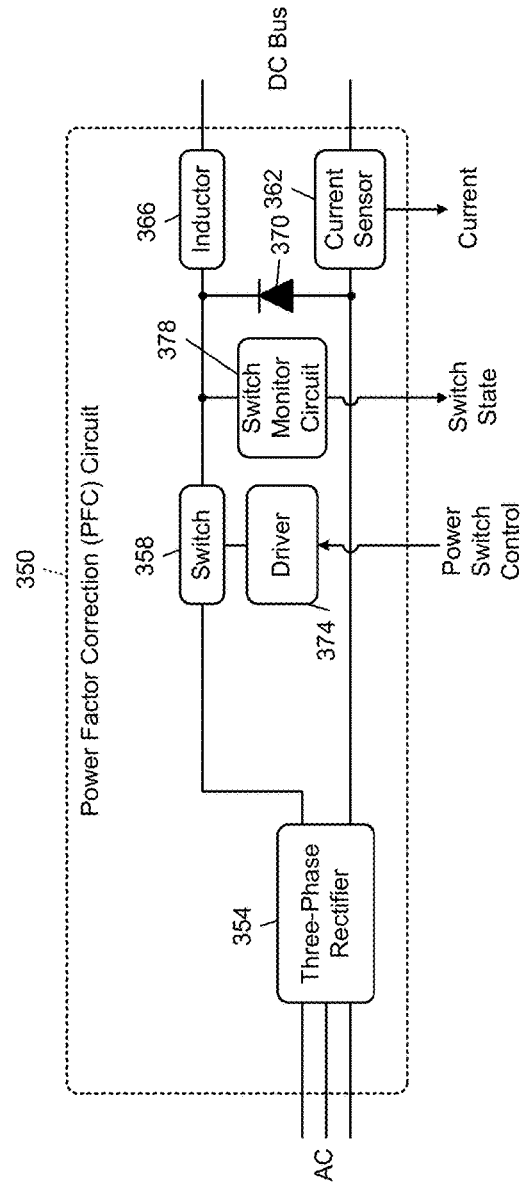
FIG. 3B is a block diagram of another example implementation of the PFC circuit of FIG. 2.

In FIG. 3B, a buck converter topology is shown with a three-phase AC input signal. Note that the principles of the present disclosure also apply to a boost converter or buck-boost converter topology used with a three-phase AC input. A PFC circuit 350 represents another implementation of the PFC circuit 212 of FIG. 2.

A three-phase rectifier 354 receives three-phase AC and generates pulsating DC across first and second terminals. A switch 358 is connected between the first terminal of the three-phase rectifier 354 and a common node. The common node is connected to an inductor 366 and a cathode of a power diode 370.

An anode of the power diode 370 is connected to a second terminal of the three-phase rectifier 354. An opposite terminal of the inductor 366 establishes one terminal of the DC bus, while the second output of the three-phase rectifier 354 establishes the other terminal of the DC bus. In the configuration shown in FIG. 3B, the switch 358, the inductor 366, and the diode 370 are configured in a buck topology.

A current sensor 362 is connected in series between the anode of the diode 370 and the DC bus. In other implementations, the current sensor 362 may be located in series with the inductor 366. In other implementations, the current sensor 362 may be located in series with the switch 358. In other implementations, the current sensor 362 may be located in series between the anode of the diode 370 and the second output of the three-phase rectifier 354. The current sensor 362 measures current through the inductor 366 as well as current through the DC bus and provides a current signal indicative of the amount of the current.

A driver 374 drives a control terminal of the switch 358 based on a power switch control signal from the control module 220 in FIG. 2. A switch monitor circuit 378 detects whether the switch 358 has opened or closed and reports the switch state to the control module 220. With the location of the current sensor 362, the current sensor 362 will measure approximately zero current when the switch 358 is open.

Figure 4A:
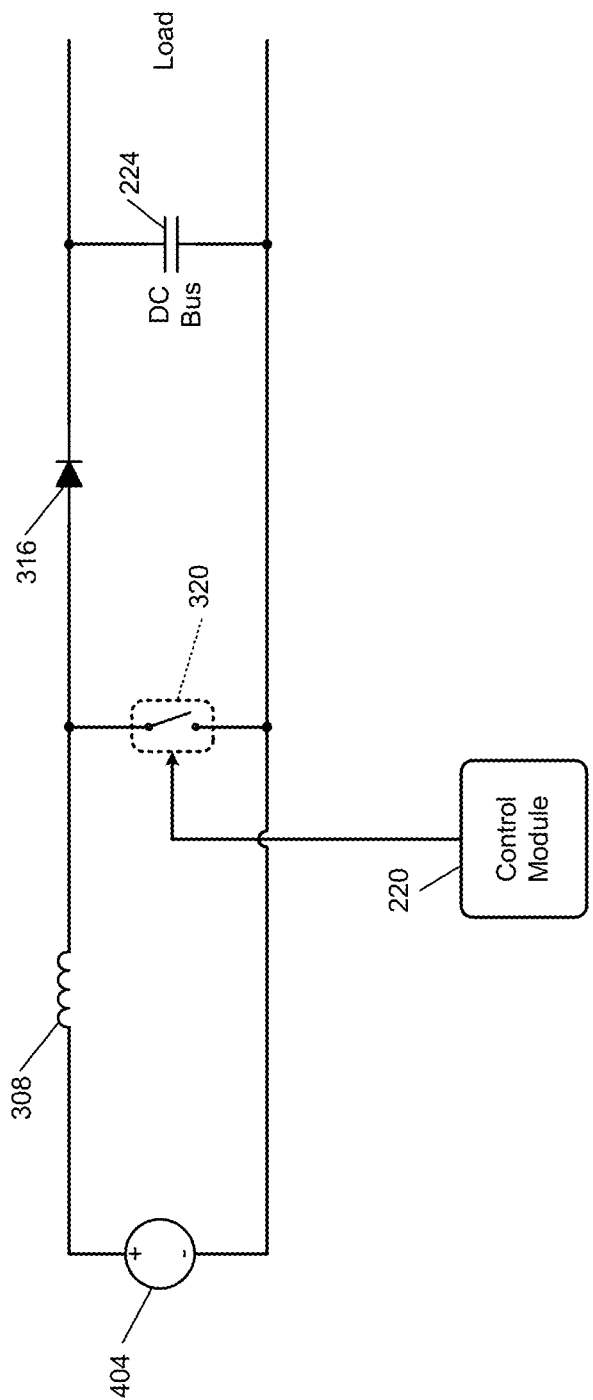
FIG. 4A is a functional block diagram of an example implementation of the PFC circuit of FIG. 3A.

FIG. 4A is a simplified functional block diagram of the PFC circuit 300 of FIG. 3A and the control module 220. The rectifier 304 rectifies the AC input voltage to produce a DC voltage. This DC voltage is illustrated by DC voltage 404 in FIG. 4. The control module 220 controls switching of the switch 320 to convert the DC voltage 404 into a DC bus voltage that is greater than the DC voltage 404. The PFC circuit 300 therefore includes a boost converter in the examples of FIGS. 3A and 4. Boost converters convert an input voltage (e.g., DC voltage 404) into a higher output voltage (e.g., DC bus voltage). The present application is applicable to single phase boost converters and three-phase boost converters.

Figure 4B:
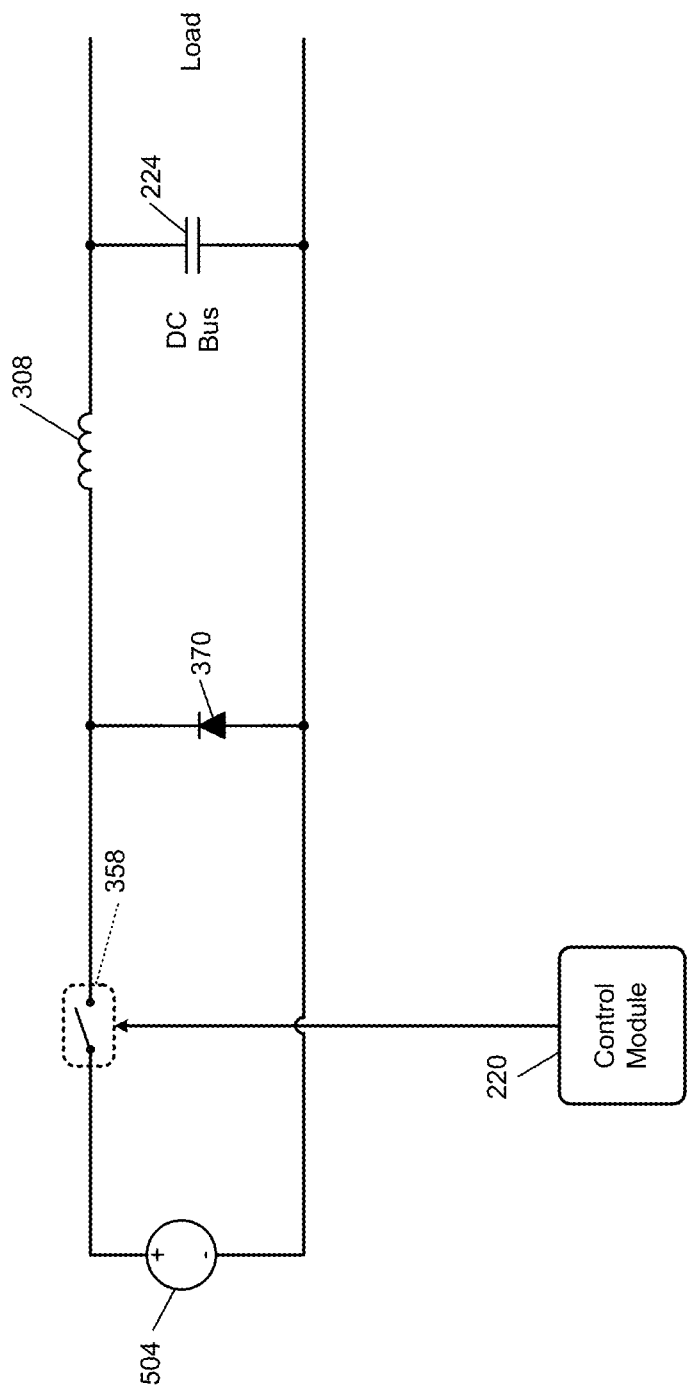
FIG. 4B is a functional block diagram of an example implementation of the PFC circuit of FIG. 3B.

FIG. 4B is a simplified functional block diagram of one phase of the PFC circuit 350 of FIG. 3B and the control module 220. The three-phase rectifier 354 rectifies the three-phase AC input voltage to produce three-phase DC voltage. The DC voltage of the one of the three phases is illustrated by DC voltage 504 in FIG. 4B. The control module 220 controls switching of the switches of the phases to convert the DC voltages input to the three phases into a DC bus voltage that is less than the input voltage. The PFC circuit 350 therefore includes a buck converter in the examples of FIGS. 3B and 4B. Buck converters convert an input voltage into a lower output voltage. The present application is applicable to single phase buck converters and three-phase buck converters. Some converters may operate as combination boost/buck converters.

Figure 5:
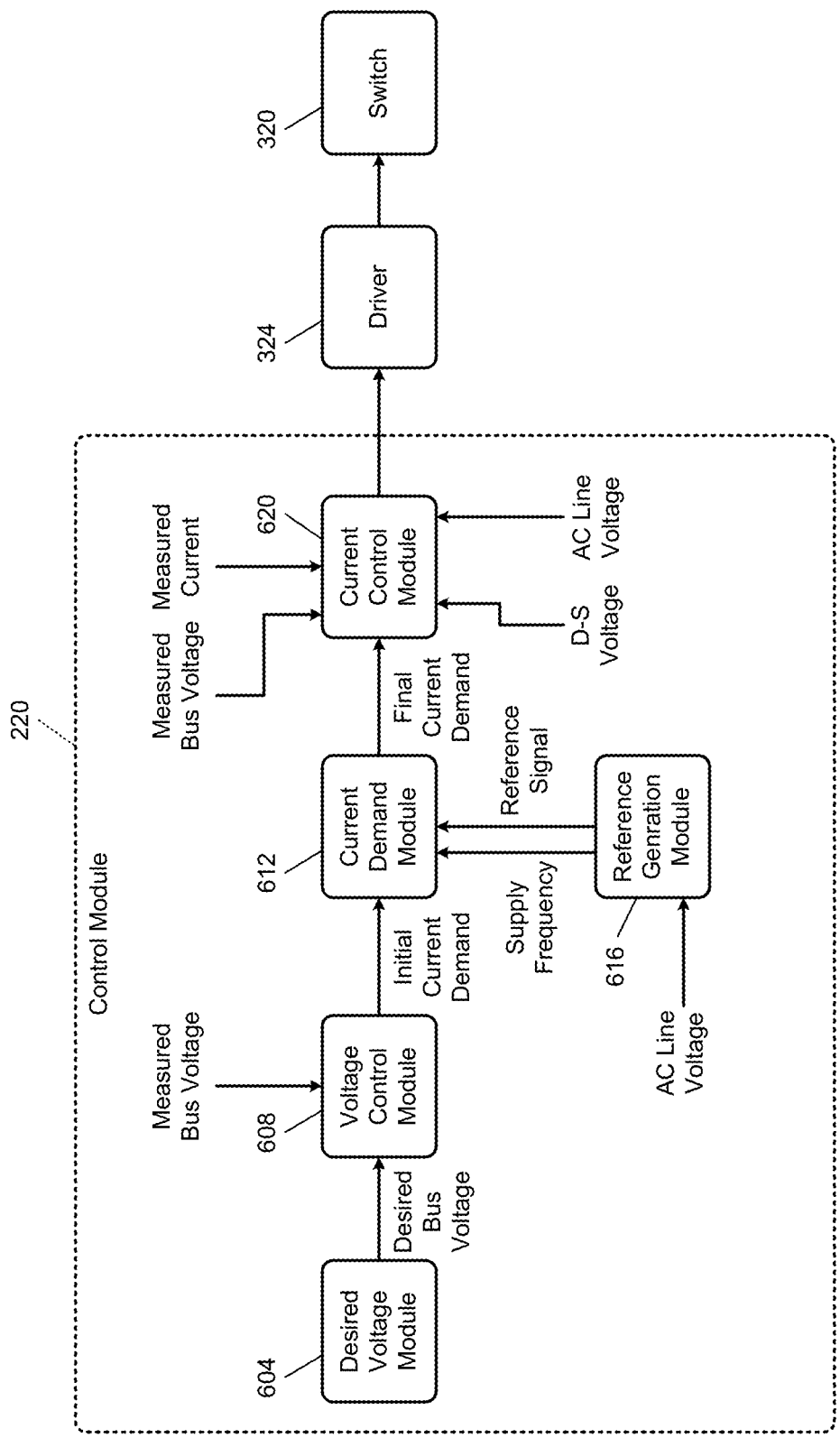
FIG. 5 is a functional block diagram of an example implementation of the control module.

FIG. 5 is a functional block diagram of an example implementation of the control module 220. The concepts described below are applicable to boost converters, such as the examples of FIGS. 3A and 4A. The concepts described below are also applicable to buck converters, such as the examples of FIGS. 3B and 4B.

A desired voltage module 604 determines a desired DC bus voltage. The desired DC bus voltage may be a fixed predetermined value or may be variable. The desired voltage module 604 may determine the desired DC bus voltage, for example, based on a peak voltage of the AC line ($V_{PEAK}$) and/or at least one of a plurality of system parameters.

For example only, the plurality of system parameters may include, but are not limited to, actual and commanded compressor speed, actual and estimated inverter output power, actual and estimated drive output power, input and output current, drive input voltage, inverter output voltage, estimated motor torque, various temperatures, and a demand from the condenser 104. The various temperatures may include, for example, temperatures of the PFC circuit 212, the inverter power circuit 232, circuit boards, the compressor scroll, and the motor 236. By way of example, a look-up table may include a desired DC bus voltage $V_{DES}$ corresponding to possible AC peak voltages $V_{PEAK}$ and each of the different combinations of the plurality of system parameters. The desired voltage module 604 may determine the desired DC bus voltage using the look-up table. For values between entries of the look-up table, the desired voltage module 604 may determine the desired DC bus voltage using interpolation. Further example discussion regarding setting the desired DC bus voltage is provided in the U.S. Prov. App. titled "Power Factor Correction Circuits and Methods Including Partial Power Factor Correction Operation for Boost and Buck Power Converters," U.S. Prov. App. No. 62,323,498 filed on Apr. 15, 2016, which is incorporated herein in its entirety.

A voltage control module 608 (see also FIG. 6) determines a difference between the desired DC bus voltage and the measured DC bus voltage and determines a first current demand based on the difference. The voltage control module 608 applies a filter to the first current demand and determines an initial current demand based on the first and filtered current demands.

The voltage control module 608 weights the contributions of the first and filtered current demands to the initial current demand based on the magnitude of the difference between the measured and desired DC bus voltages. More specifically, the voltage control module 608 applies a greater weight to the filtered current demand when the magnitude of the difference is low. The voltage control module 608 increases the weighting of the first current demand and decreases the weighting of the filtered current demand as the difference increases.

A current demand module 612 (see e.g., FIG. 9) may apply a filter to the initial current demand, such as a notch filter. The current demand module 612 may also perform one or more signal processing functions to reduce noise in the initial current demand. The current demand module 612 multiplies the (filtered) initial current demand with a reference signal to produce a final current demand. While the example of the current demand module 612 filtering the initial current demand is provided, the current demand module 612 may not filter the initial current demand in other examples. In such a case, the initial current demand may be multiplied with the reference signal to produce the final current demand.

A reference generation module 616 (see e.g., FIGS. 27A and 27B) determines zero crossings of the AC line and the reference signal. Based on the zero crossings, the reference generation module 616 generates the reference signal to track the AC input voltage in phase and frequency. In this way, the final current demand follows the AC input voltage, for example, to maximize power factor.

A current control module 620 (see e.g., FIGS. 18 and 19) controls switching of the switch 320. More specifically, the current control module 620 transitions the switch 320 OFF when the measured current is greater than the current demand. The current control module 620 then maintains the switch 320 OFF for a desired OFF period. The desired OFF period is variable, and the current control module 620 determines the desired OFF period, for example, based on the AC input voltage and/or the measured DC bus voltage.

Figure 6:
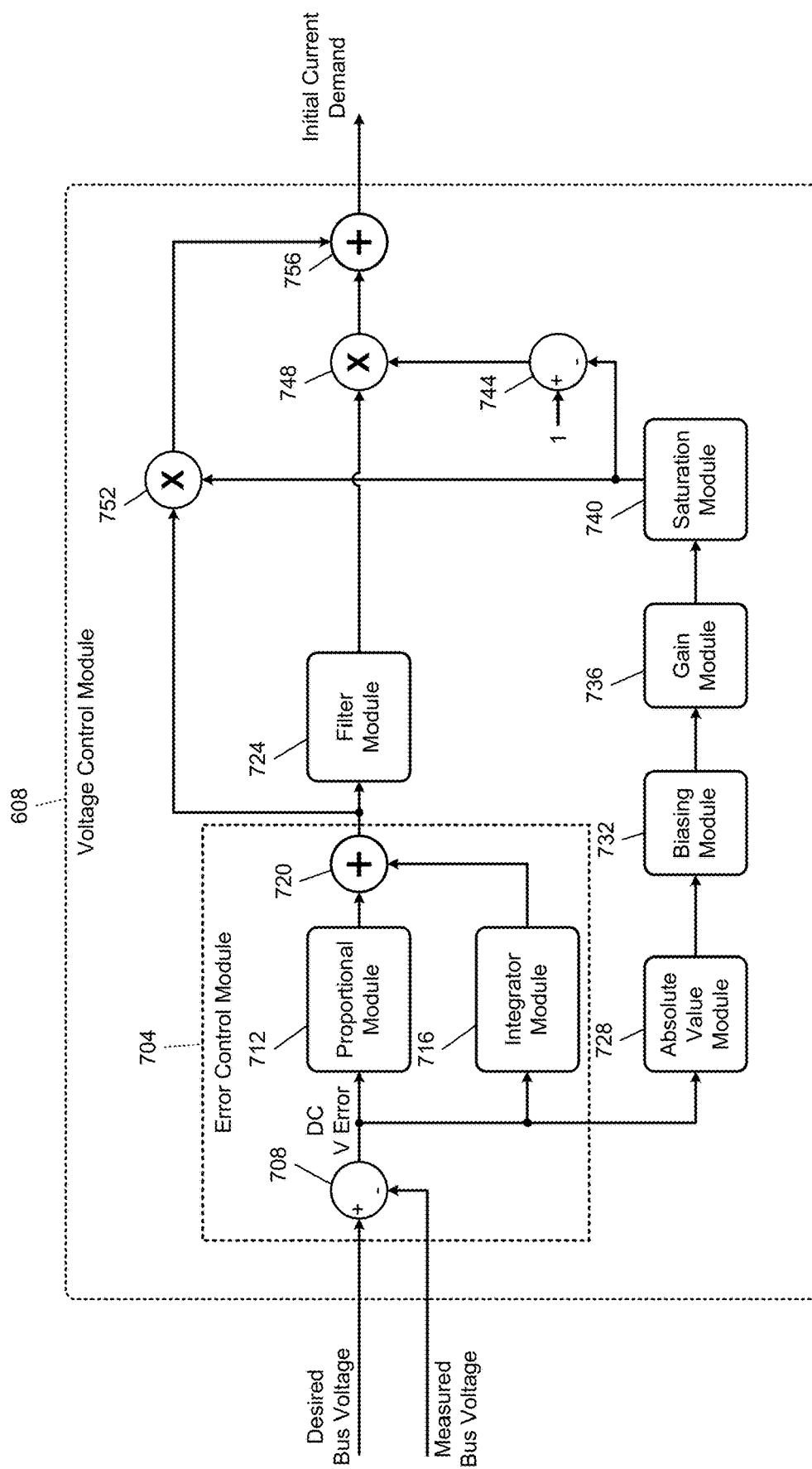
FIG. 6 is a functional block diagram of an example implementation of a voltage control module.

FIG. 6 is a functional block diagram of an example implementation of the voltage control module 608. As stated above, the voltage control module 608 generates an initial current demand based on the desired DC bus voltage and the measured DC bus voltage. The initial current demand corresponds to a target value for the measured current. The measured DC bus voltage is measured using a voltage sensor. The desired DC bus voltage is determined by the desired voltage module 604.

The voltage control module 608 includes an error control module 704 that receives the desired DC bus voltage and the measured DC bus voltage. The error control module 704 generates a first current demand to minimize the difference between the desired DC bus voltage and the measured DC bus voltage.

For example, a subtraction module 708 subtracts the measured DC bus voltage from the desired DC bus voltage to determine a DC voltage error. A proportional module 712 multiplies the DC voltage error by a proportional constant. An integrator module 716 combines the DC voltage error with a previous output of the integrator module 716. The integrator module 716 may first multiply the DC voltage error by an integral constant. The integrator module 716 may also apply upper and/or lower limits to its output. In various implementations, the integrator module 716 may bias its output to adjust toward a tracking input (e.g., the second current demand).

A summation module 720 adds the output of the proportional module 712 with the output of the integrator module 716. The sum from the summation module 720 is output from the error control module 704 as the first current demand. Although the error control module 704 is shown for purposes of illustration as a Proportional-Integral (PI) controller, another suitable type of closed-loop controller may be used. Additionally, a feed-forward component may also be implemented which may be summed with a feedback component (e.g., the sum) to generate the first current demand.

Figure 7:
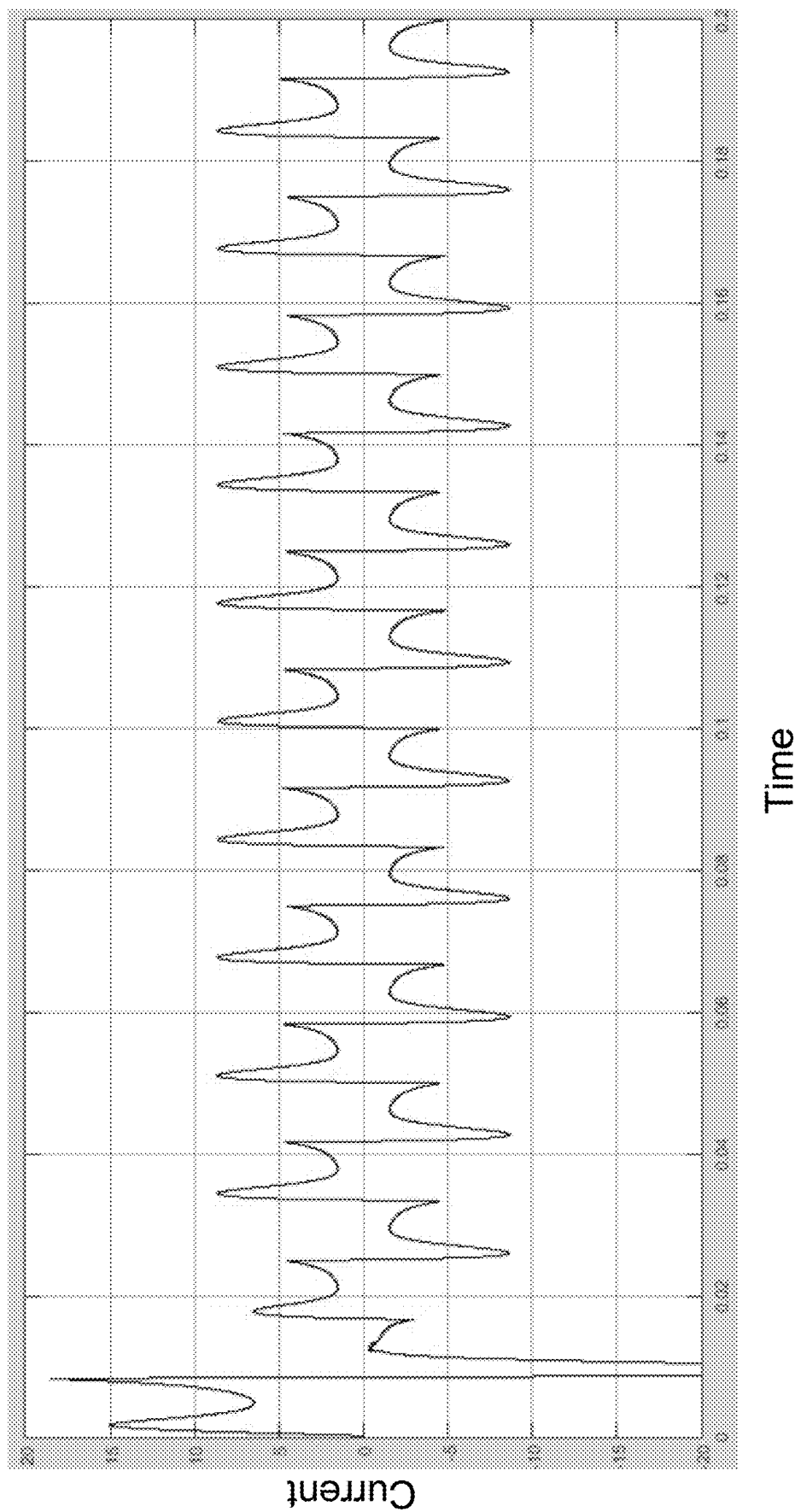
FIGS. 7-8 are example graphs of current versus time.
Figure 8:
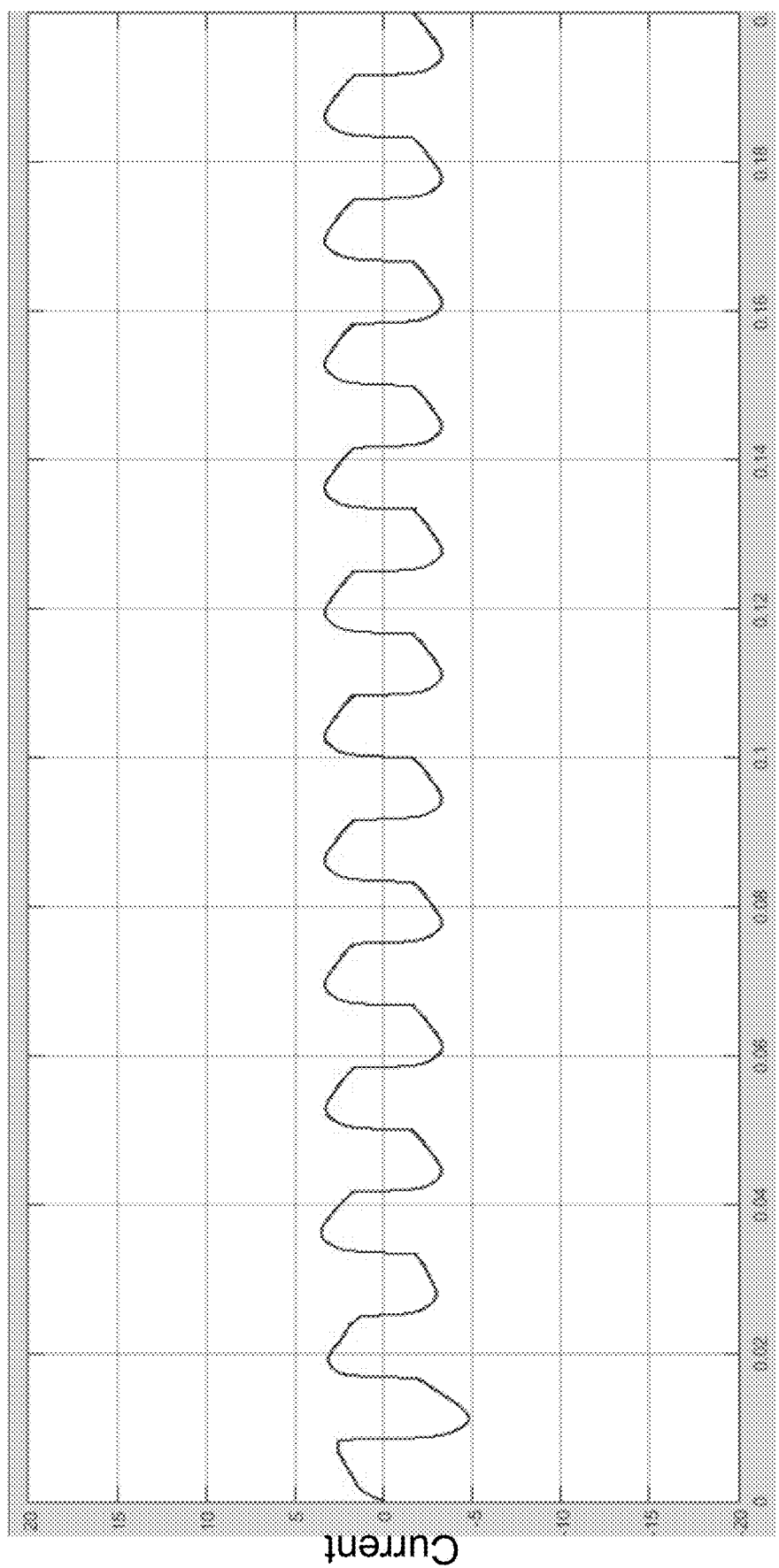

A filter module 724 applies a filter to the first current demand to produce a second current demand. The filter may be, for example, a low-pass filter (LPF) or another suitable type of filter. A cutoff frequency of the filter may be calibrated, for example, to smooth cycle-to-cycle ripple that may be attributable to the error control module 704. The filter module 724 may lower bandwidth and may smooth/attenuate the cycle-to-cycle ripple created by the error control module 704 attempting to adjust the measured DC bus voltage toward the desired DC bus voltage. For example only, FIG. 7 includes an example graph of current produced using a PI controller based on a sinusoidal input voltage. FIG. 8 includes an example graph of current produced using low pass filtering of the output of a PI controller.

Referring back to FIG. 6, the voltage control module 608 also includes a weighting module that weights the contributions of the first and second current demands to the initial current demand. The weighting module reduces of use of the second current demand and increases the use of the first current demand as the DC voltage error increases. This may minimize harmonics and minimize response time to load changes.

An absolute value module 728 determines and outputs an absolute value (i.e., magnitude) of the DC voltage error. A biasing module 732 applies a bias to the absolute value of the DC voltage error to require that the DC voltage error be larger than a predetermined biasing value before decreasing the contribution of the second current demand and including a contribution of the first current demand. For example, the biasing module 732 may set its output based on or equal to the predetermined biasing value (e.g., 10 V) subtracted from the absolute value of the DC voltage error. When the absolute value of the DC voltage error is less than the predetermined biasing value, the initial current demand may be set equal to the second current demand due to the biasing. The biasing is associated with the saturation module (740) discussed further below.

A gain module 736 applies a predetermined gain value to the output of the biasing module 732. For example, the gain module 736 set its output based on or equal to the output of the biasing module 732 multiplied by the predetermined gain value. The predetermined gain value may be, for example, approximately 0.2 or another suitable value.

A saturation module 740 may apply limits to the output of the gain module 736. As used herein, saturation modules may enforce a lower limit, an upper limit, both upper and lower limits, or neither limit. The upper and lower limits may be predetermined and/or may be updated based upon various parameters. In the case of the saturation module 740, the lower limit may be, for example, zero to re-enforce the biasing applied by the biasing module 732. The upper limit of the saturation module 740 may be 1 to limit weighting values to between 0 and 1, inclusive. The output of the saturation module 740 is a first weighting value for weighting the contribution of the first current demand.

A subtraction module 744 subtracts the output of the saturation module 740 from a predetermined value, such as 1. The output of the subtraction module 744 is a second weighting value for weighting the contribution of the second current demand. A multiplication module 748 multiplies the second current demand output by the filter module 724 with the second weighting value output by the subtraction module 744 to produce a third demanded current. A multiplication module 752 multiplies the first current demand output by the error control module 704 with the first weighting value output by the saturation module 740 to produce a fourth current demand. The modules 728, 732, 736, 740, 744, 748, and 752 can collectively be referred to as the weighting module. A summation module 756 adds the third current demand with the fourth current demand to produce the initial current demand.

As discussed further below, the initial current demand is multiplied with a sinusoidal reference signal that is generated to be synchronized with the AC input voltage. This may provide a better power factor and minimize harmonics of the AC input current as the load may draw more sinusoidal current and power. Generation of the reference signal is also discussed below.

Figure 9:
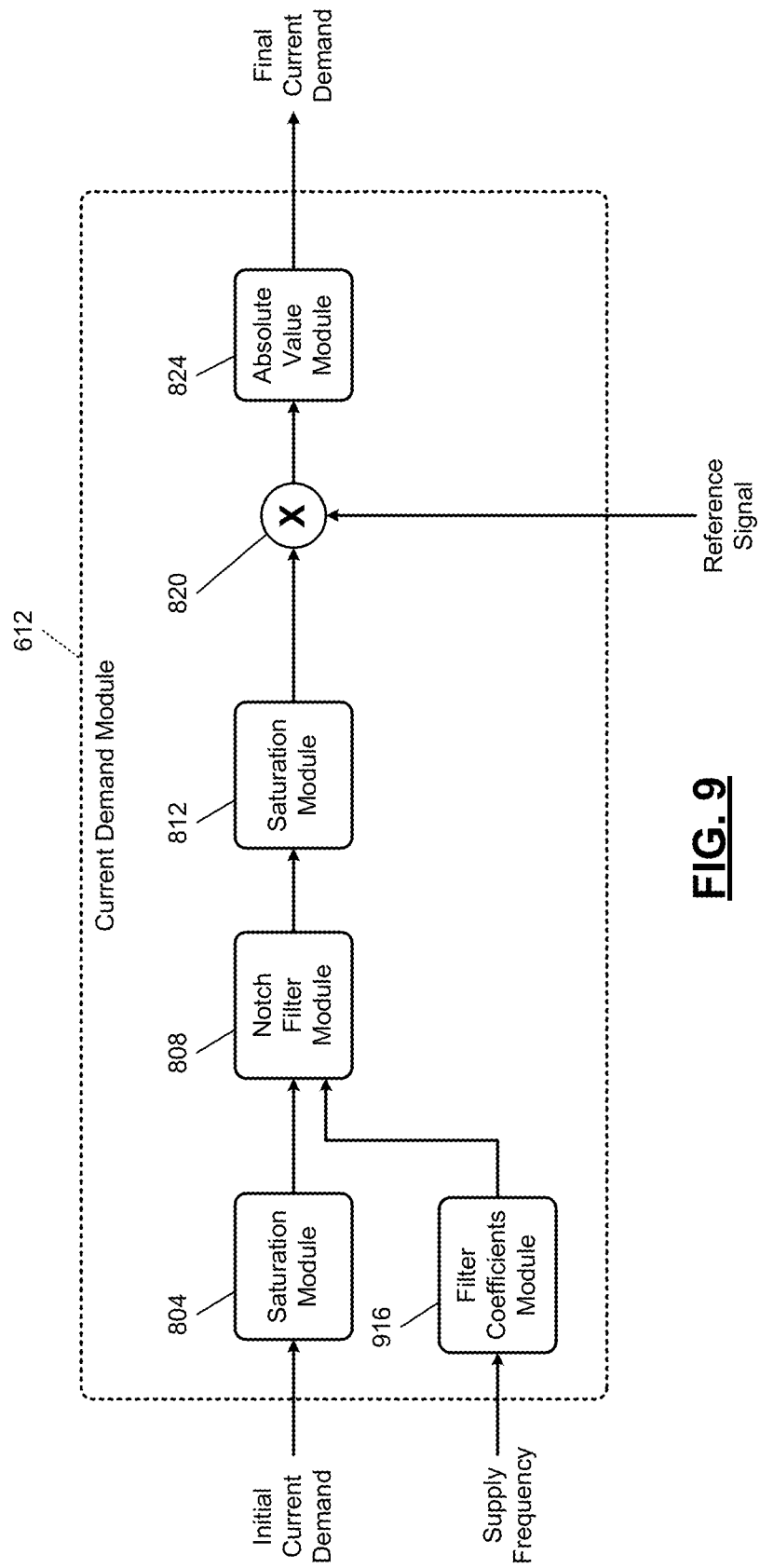
FIG. 9 is a functional block diagram of an example implementation of a current demand module.

FIG. 9 includes a functional block diagram of an example implementation of the current demand module 612. A saturation module 804 may apply one or more limits to the initial current demand before the initial current demand is input to a notch filter module 808. The notch filter module 808 applies a notch filter to the initial current demand, and a saturation module 812 may apply one or more limits to the initial current demand output by the notch filter module 808. While the example of the use of the saturation modules 804 and 812 is shown and discussed, one or both of the saturation modules 804 and 812 may be omitted and/or replaced with other suitable types of signal processing. The application of the notch filter reduces harmonics while allowing for a fast response to load changes.

The notch filter may be, for example, a first or second order polynomial notch filter. For example only, the notch filter may be represented by the following second order transfer function.

$$\frac{b0 + b1*z^{-1} + b2*z^{-2}}{a0 + a1*z^{-1} + a2*z^{-2}},$$

where the $b0$, $b1$, $b2$, $a0$, $a1$, and $a2$ are filter coefficients, and $z$ is the initial current demand input to the notch filter module 808. One or more of the filter coefficients may be fixed, predetermined values. For example, the filter coefficients $b0$, $b2$, $a0$, and $a2$ may be fixed predetermined values. The filter coefficient $a0$ may be 1 (one) in various implementations. In various implementations, the filter coefficients $b0$, $b2$, $a0$, and/or $a2$ may be variable values.

A filter coefficients module 816 determines one or more filter coefficients (e.g., $a1$ and $b1$) for the notch filter based on a frequency of the AC input voltage. Since the reference signal is generated to be synchronous with the AC input voltage, the frequency of the AC input voltage may be represented by the frequency of the reference signal. The frequency of the reference signal may be used as a supply frequency. Alternatively, a frequency of the AC input voltage may be measured and used as the supply frequency. The notch may be, for example, approximately twice the supply frequency.

The filter coefficients module 816 may determine the filter coefficient(s) using one or more look-up tables and/or functions that relate the supply frequency to the filter coefficient(s). For values between entries of the look-up table, the filter coefficients module 816 may determine the filter coefficient(s) using interpolation. In various implementations, the filter coefficients $a1$ and $b1$ may be the same value or may be determined using the same look-up table or function. Examples of such a function include a second order polynomial equation using predetermined coefficients for determining the filter coefficients (e.g., $a1$ and $b1$) as a function of the supply frequency.

As stated above, the saturation module 812 may apply one or more limits to the initial current demand output by the notch filter module 808. A multiplier module 820 multiplies the output of the saturation module 812 with the reference signal. An absolute value module 824 determines and outputs an absolute value (i.e., magnitude) of the output of the multiplier module 820 to produce a final current demand.

Alternatively, the absolute value module 824 may be omitted, and an absolute value of the reference signal may be input to the multiplier module 820. The absolute value usage places the final current demand into correspondence with the post-rectification current. As discussed further below, the final current demand is used to control switching of the switch 320 based on a comparison with the measured current.

Figure 10:
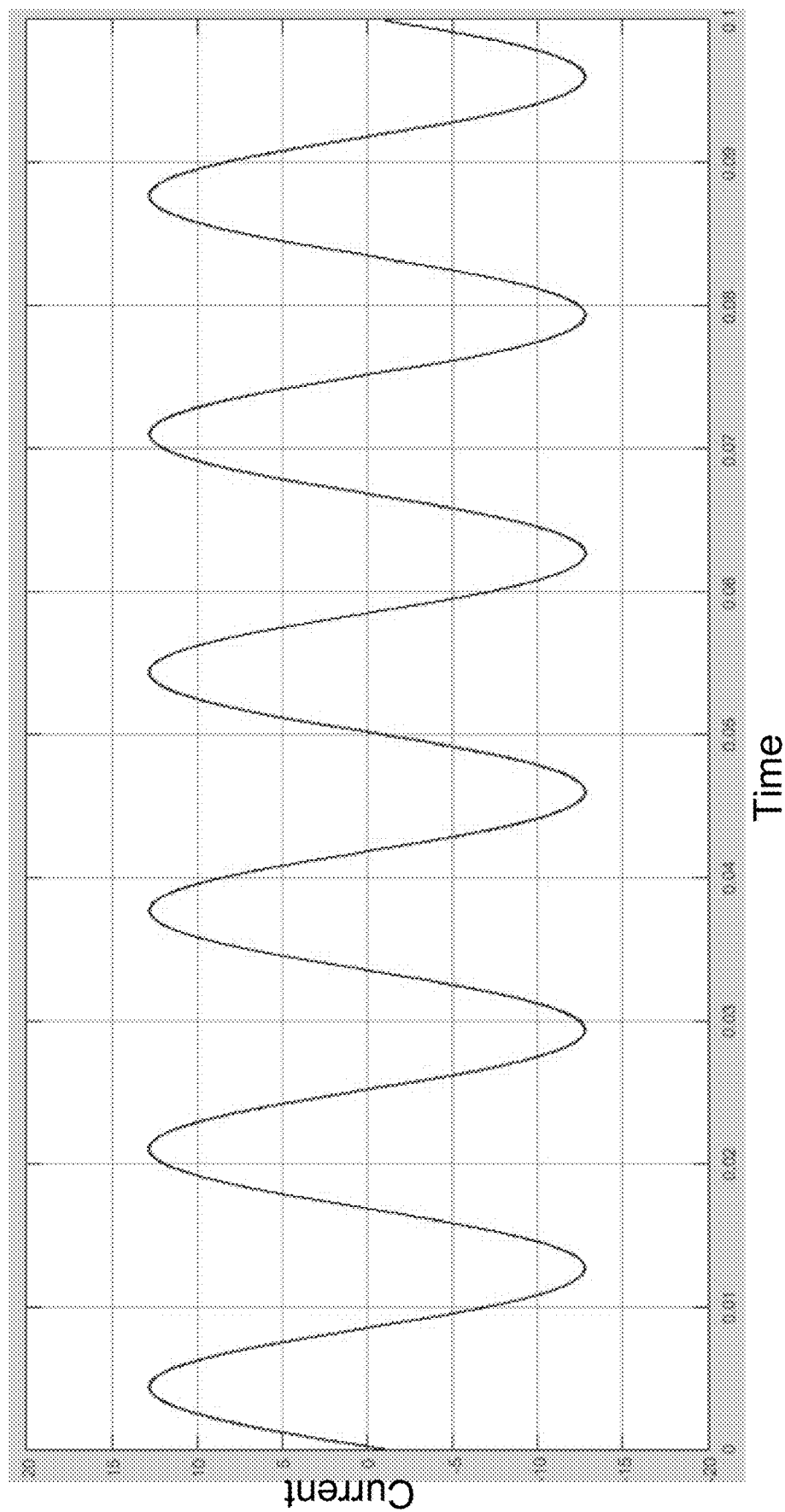
FIG. 10 is an example graph of the current versus time.
Figure 11:
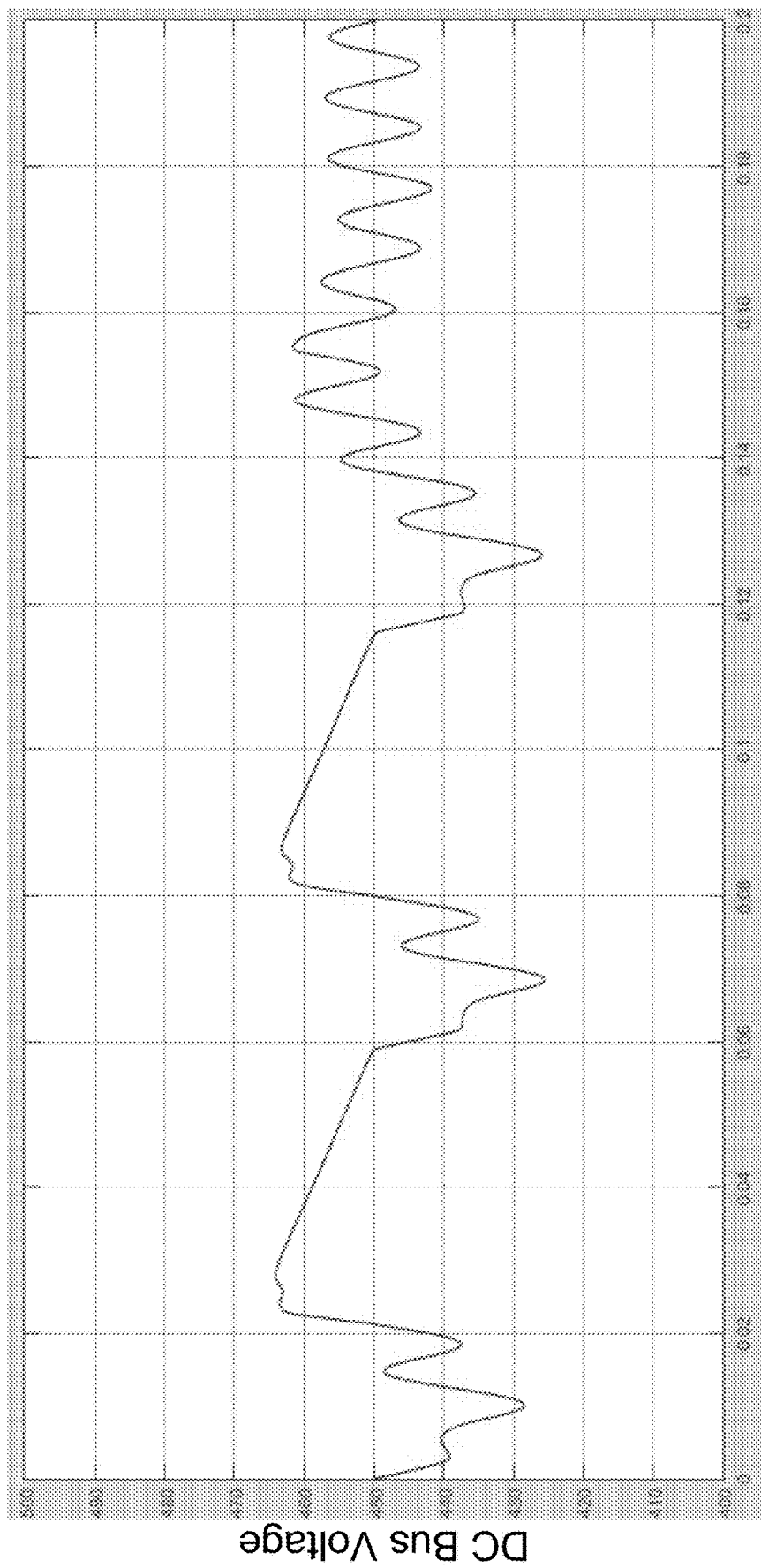
FIG. 11 is an example graph of measured DC bus voltage versus time.

FIG. 10 is an example graph of the current produced by controlling switching based on the final current demand generated based on FIGS. 6 and 9. The current has a relatively sinusoidal shape, as illustrated in FIG. 10. FIG. 11 is an example graph of the measured DC bus voltage produced by controlling switching based on the final current demand generated based on FIGS. 6 and 9 in response to step changes between heavy load and light load conditions.

Figure 12:
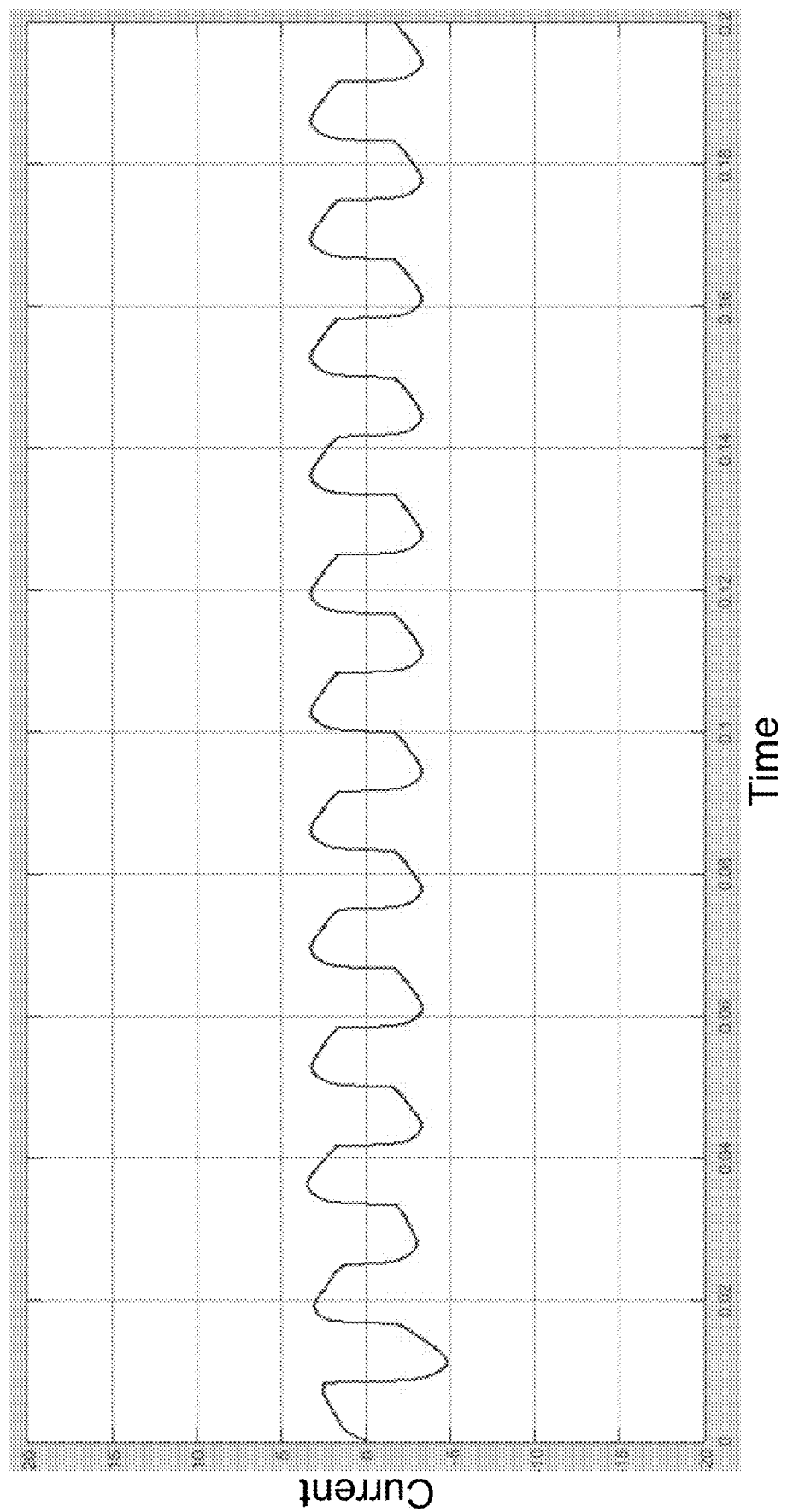
FIGS. 12 and 13 are example graphs for light load conditions and heavy load conditions, respectively, of currents versus time.
Figure 13:
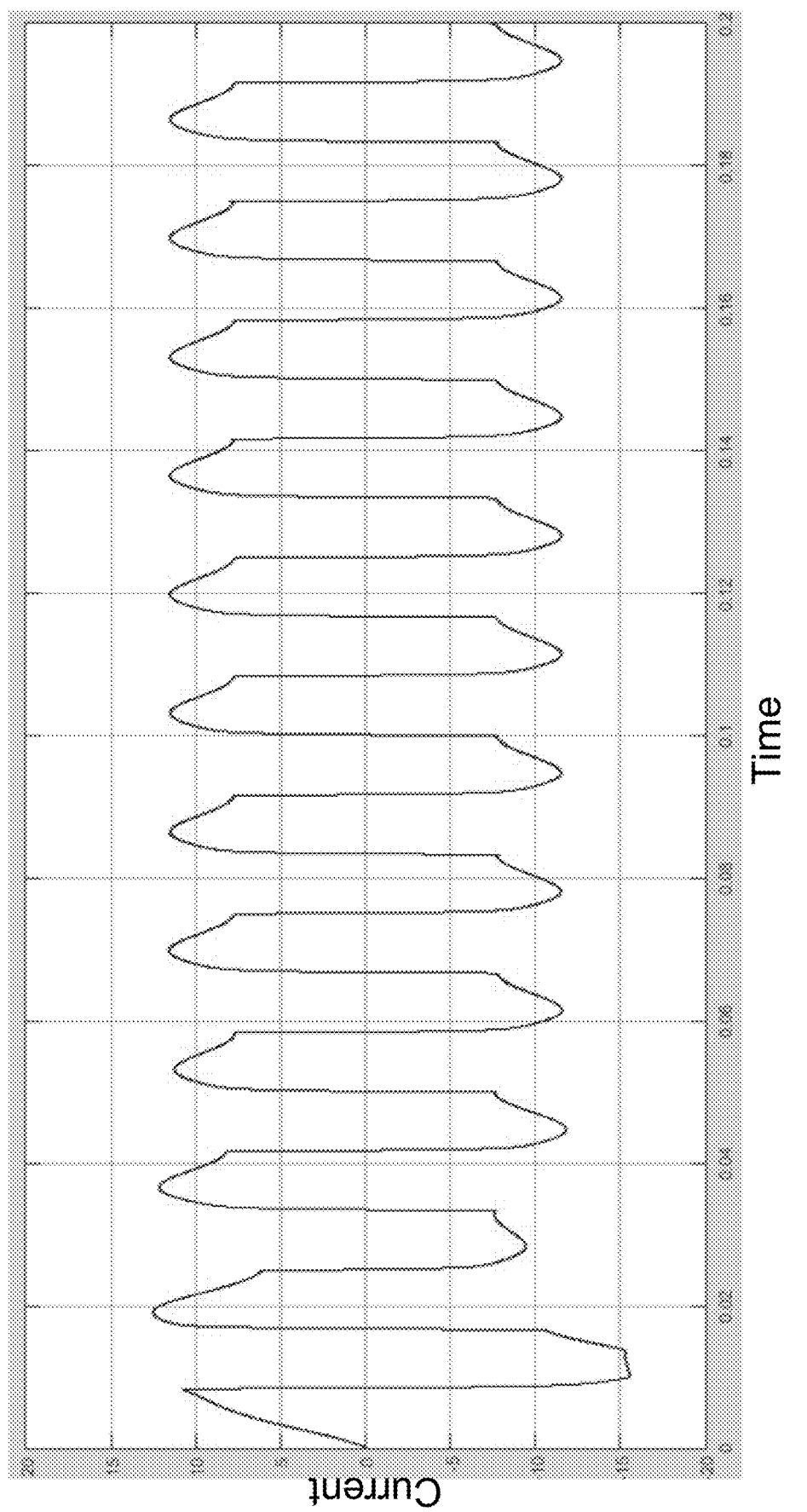

In contrast with FIG. 10, FIGS. 12 and 13 are example graphs for light load conditions and heavy load conditions, respectively, of the currents produced by controlling switching based on the second current demand output by the error control module 704. As illustrated in FIGS. 12 and 13, the currents have a less sinusoidal (and possibly more square) shape than the current of FIG. 10.

Figure 14:
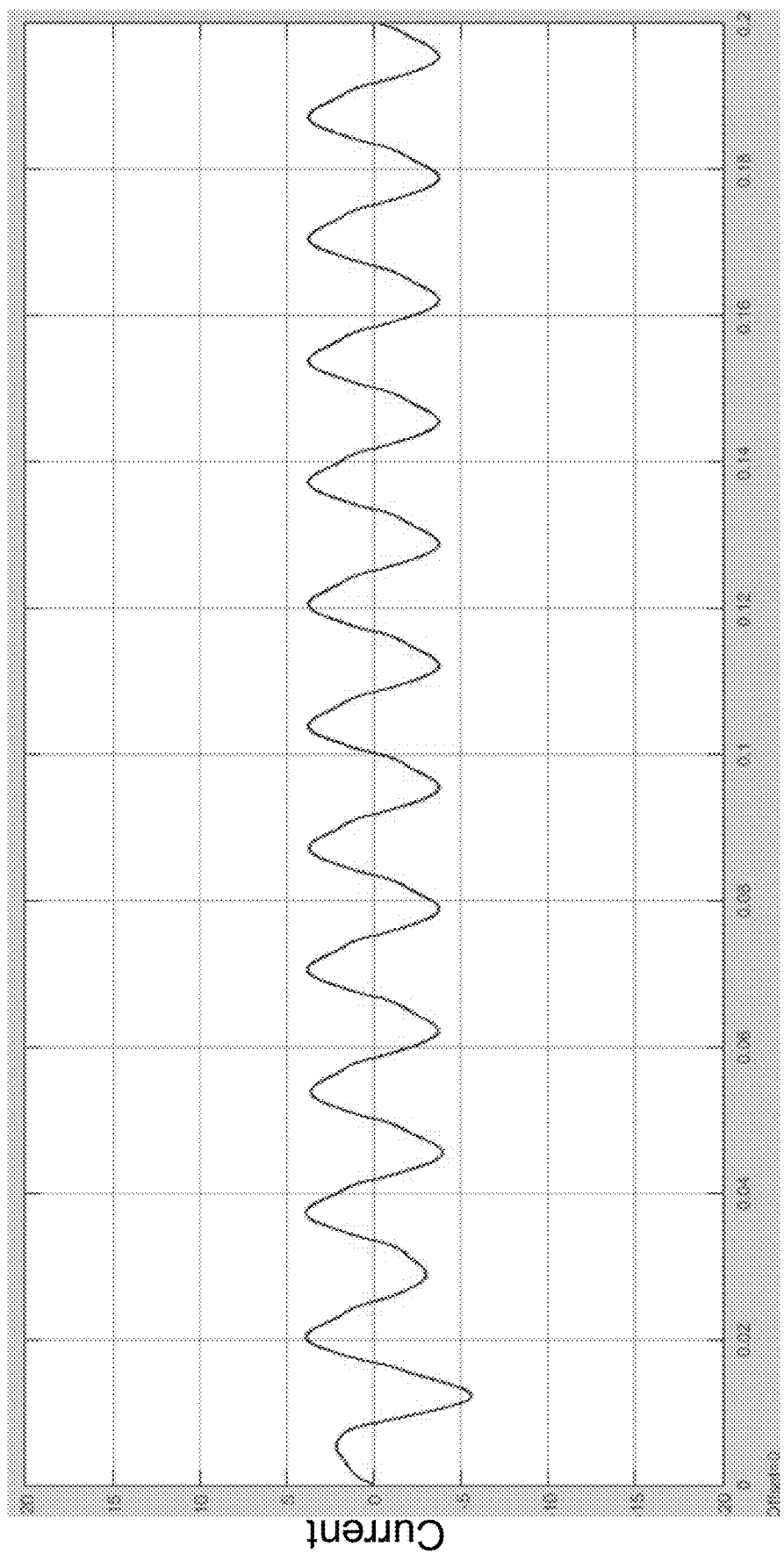
FIGS. 14 and 15 are example graphs for light load conditions and heavy load conditions, respectively, of currents versus time.
Figure 15:
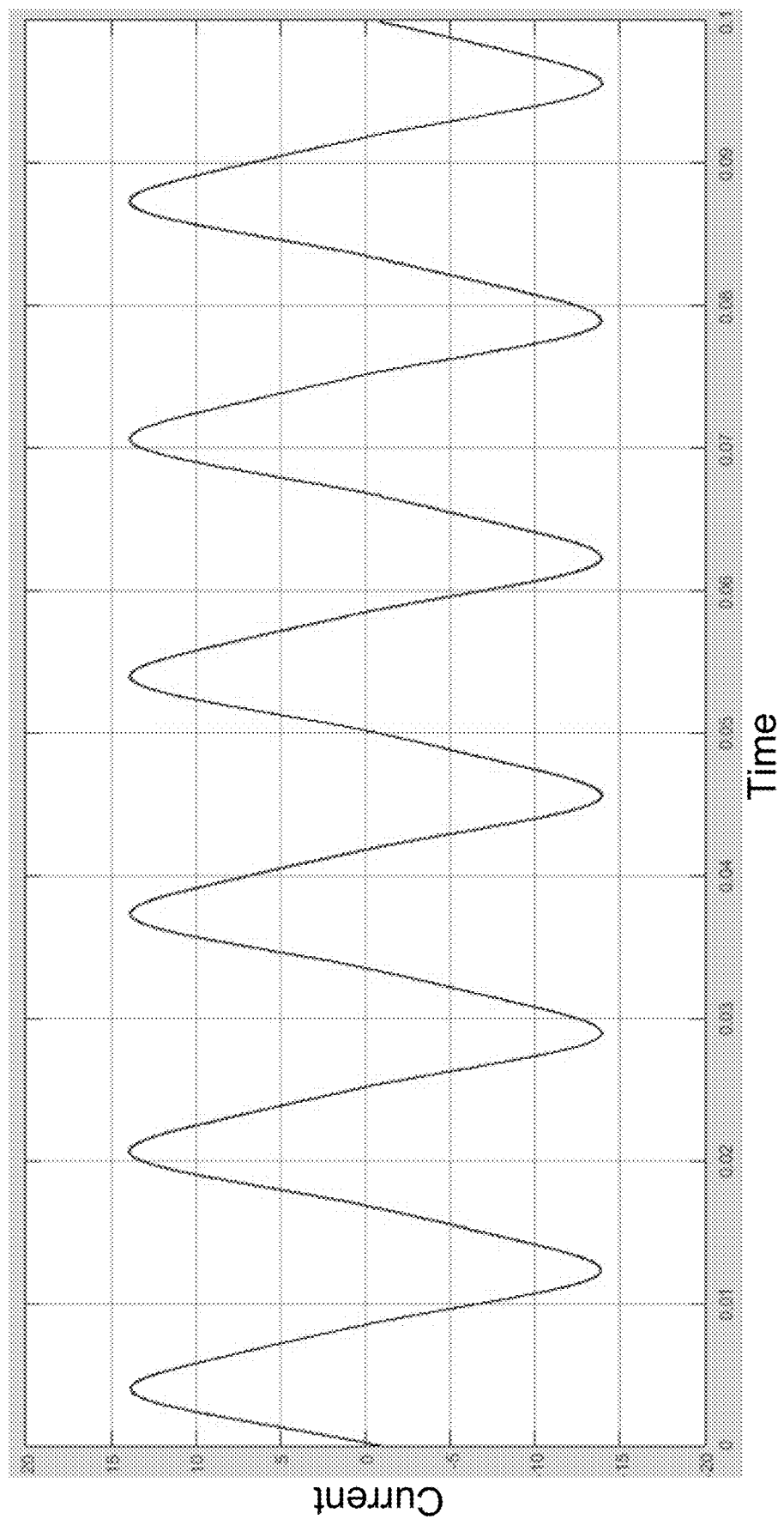

Multiplying the second current demand output by the error control module 704 with the reference signal may produce more sinusoidal currents. For example, FIGS. 14 and 15 are example graphs for light load conditions and heavy load conditions, respectively, of the currents produced by controlling switching based on the reference signal multiplied with the second current demand output by the filter module 724. As illustrated in FIGS. 14 and 15, the currents have a less sinusoidal (and possibly more triangular) shape than the current of FIG. 10.

Figure 16:
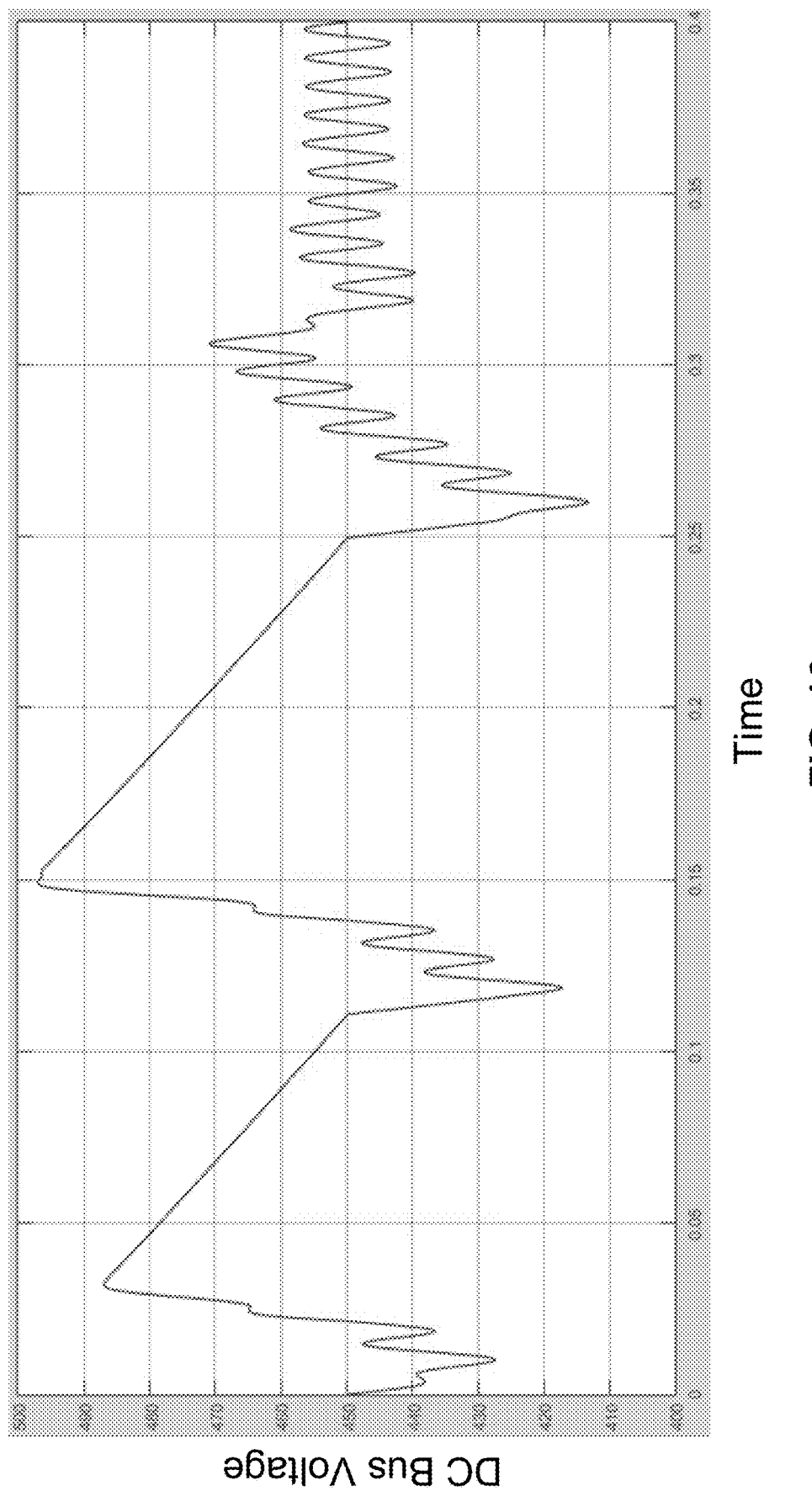
FIG. 16 is an example graph of measured DC bus voltage versus time in response to step changes between heavy load and light load conditions.

FIG. 16 is an example graph of the measured DC bus voltage produced by controlling switching based on the reference signal multiplied with the second current demand output by the error control module 704 in response to step changes between heavy load and light load conditions. Such control may tend to produce a slower response time, more overshoot, and/or more undershoot than that of the example of FIG. 11.

Figure 17:
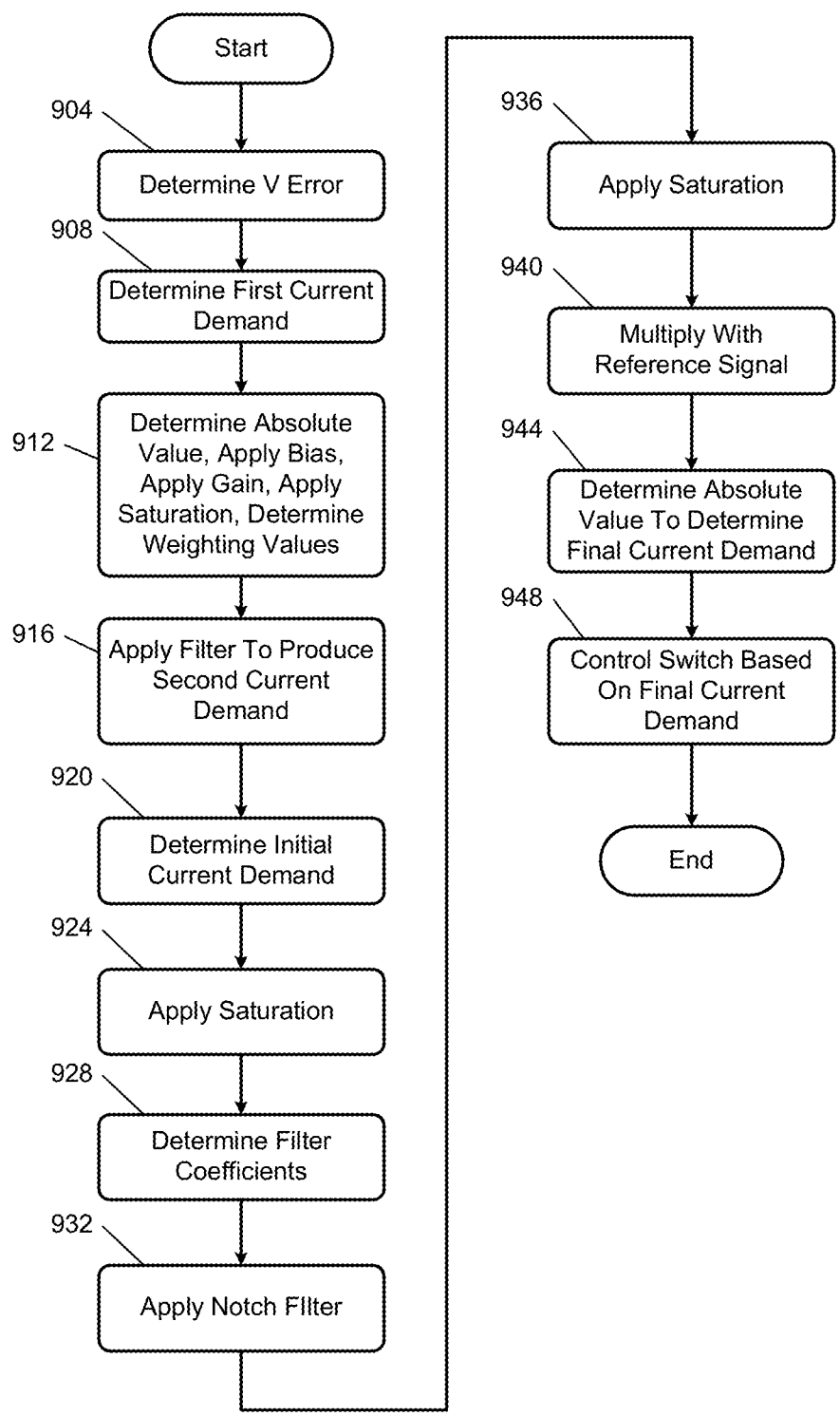
FIG. 17 is a flowchart depicting an example method of determining a final current demand.

FIG. 17 is a flowchart depicting an example method of determining the final current demand. Control begins with 904 where the error control module 704 determines the DC voltage error based on the difference between the desired DC bus voltage and the measured DC bus voltage. At 908, the error control module 704 determines the first current demand based on the voltage bus error, for example, using PI control, as discussed above.

At 912, the absolute value module 728 determines an absolute value of the DC voltage error, and the biasing module 732 applies the bias to the absolute value of the DC voltage error. For example, the biasing module 732 may set its output based on or equal to the predetermined biasing value (e.g., 10 V) subtracted from the absolute value of the DC voltage error. The gain module 736 applies the predetermined gain value to the output of the biasing module 732, and the saturation module 740 may apply limits to the output of the gain module 736. The output of the saturation module 740 corresponds to the first weighting value for weighting the contribution of the first current demand.

Also at 912, the subtraction module 744 determines the second weighting value for weighting the contribution of the second current demand. For example, the subtraction module 744 may set the second weighting value based on or equal to 1 minus the first weighting value. Generally, due to the biasing, the first weighting value may be zero or approximately zero (such that the second weighting value may be one or approximately one) when the DC voltage error is less than the predetermined biasing value. The second weighting value may decrease toward zero and the first weighting value may increase toward one as the DC voltage error increases above the predetermined biasing value. While the example of use of the first and second weighting values and the first and second current demands, one or more additional filters could be applied to determine the second current demand from the first current demand. In such examples, more weighting values could be used, or the first and second weighting values could be applied to a different combination of current demands.

At 916, the filter module 724 applies the filter to the first current demand to produce the second current demand. At 920, the multiplier module 752 multiplies the first current demand by the first weighting value to produce the third current demand, and the multiplication module 748 multiplies the second current demand by the second weighting value to produce the fourth current demand. Also at 920, the summation module 756 sets the initial current demand equal to or based on the sum of the third current demand and the fourth current demand.

At 924, the saturation module 804 may apply upper and/or lower limits to the initial current demand. In various implementations, the application of upper and/or lower limits may be omitted or replaced with one or more other types of signal processing. At 928, the filter coefficients module 816 determines the filter coefficients for the notch filter. The filter coefficients module 816 determines the filter coefficients based on the supply frequency.

At 932, the notch filter module 808 applies the notch filter, using the filter coefficients, to the initial current demand. At 936, the saturation module 812 may apply upper and/or lower limits to the initial current demand output by the notch filter module 808. In various implementations, the application of upper and/or lower limits may be omitted or replaced with one or more other types of signal processing.

At 940, the multiplier module 820 sets the final current demand based on or equal to the initial current demand (e.g., output by the saturation module 812) multiplied by the reference signal. The absolute value module 824 may determine an absolute value of the final current demand at 944. At 948, the current control module 620 controls switching of the switch 320 based on the final current demand and the measured current. As discussed further below, the current control module 620 transitions the switch 320 from ON to OFF when the measured current becomes greater than the final current demand. The current control module 620 maintains the switch 320 OFF for a (variable) desired OFF period, and transitions the switch 320 from OFF to ON when the desired OFF period has passed. While this example is discussed further below, the current control module 620 may alternatively transition the switch 320 from OFF to ON when the measured current becomes less than the final current demand, maintain the switch 320 ON for a (variable) desired ON period, and transition the switch 320 from ON to OFF once the desired ON period has passed. The desired ON period may be determined similarly to the desired OFF period discussed below.

Figure 18:
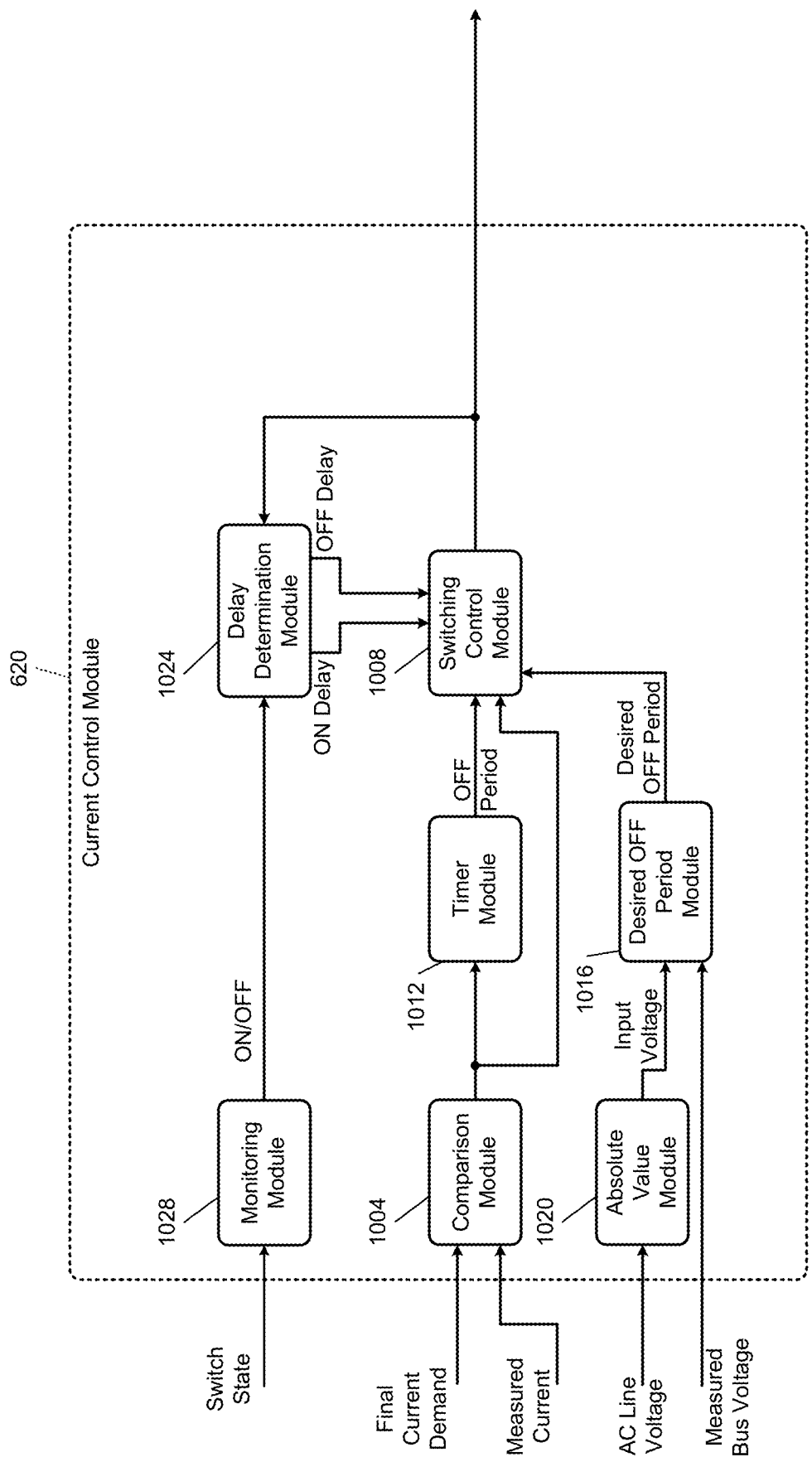
FIGS. 18-19 are functional block diagrams of example implementations of a current control module.

FIG. 18 is a functional block diagram of an example implementation of the current control module 620. The current control module 620 controls switching of the switch 320 based on a comparison of the final current demand with the measured current. The measured current may be measured using the current sensor 312.

A comparison module 1004 sets a comparison signal to a first state when the measured current is less than the final current demand. The comparison module 1004 sets the comparison signal to a second state when the measured current is greater than the final current demand.

A switching control module 1008 controls switching of the switch 320 based on the comparison of the measured current with the final current demand. For example, the switching control module 1008 transitions the switch 320 to OFF (not conducting) when the comparison signal transitions from the first state to the second state. The switching control module 1008 then maintains the switch 320 OFF for a desired OFF period. More specifically, the switching control module 1008 maintains the switch 320 OFF until an OFF period is greater than the desired OFF period. The OFF period corresponds to the period since the measured current last became greater than the final current demand.

A timer module 1012 increments the OFF period when the comparison signal is in the second state. More specifically, the timer module 1012 increments the OFF period when the switch 320 is OFF. In this manner, the OFF period tracks the period elapsed since the switching control module 1008 last transitioned the switch 320 from ON to OFF (i.e., the measured current became greater than the final current demand). The timer module 1012 resets the OFF period when the switching control module 1008 transitions the switch 320 from OFF to ON.

When the OFF period is greater than (or equal to) the desired OFF period, the switching control module 1008 may transition the switch 320 ON (conducting) and maintain the switch 320 ON until the comparison signal next is in the second state. In various implementations, the switching control module 1008 may wait for, or ensure that, the measured current is less than the final current demand before generating the output signal to turn the switch 320 ON. Under relatively steady state load conditions, the turning ON of the switch 320 may occur at approximately a beginning of a next predetermined switching period.

The predetermined switching periods ($t_p$) correspond to a predetermined switching frequency. The predetermined switching frequency may be, for example, approximately 200 kilohertz (kHz) or another suitable switching frequency. The predetermined switching periods correspond to 1 divided by the predetermined switching frequency. The switching control module 1008 may control the switch 320 to be ON (conducting) and OFF (not conducting) for different portions of each predetermined switching period. In various implementations, a frequency module (not shown) may randomly vary the predetermined switching frequency or the predetermined switching period, for example, according to an output of a random number generator.

A desired OFF period module 1016 determines the desired OFF period. Written generally, for a boost converter, the desired OFF period module 1016 may determine the desired OFF period based on input voltage, output voltage, and the predetermined switching period. The input voltage may correspond to the voltage input to the PFC circuit 300. For example, an absolute value module 1020 determines and outputs an absolute value (i.e., magnitude) of the AC input voltage measured by an AC input voltage sensor. The output of the absolute value module 1020 may be used as the input voltage. The output voltage may be the measured DC bus voltage. While the example of a sinusoidal AC input has been described, the present application is also applicable to other types of inputs including rectified inputs resulting from rectification of AC inputs.

The desired OFF period module 1016 may determine the desired OFF period using one of a function and a look-up table that relates input voltages and output voltages to desired OFF times given the predetermined switching period. For values between entries of the look-up table, the desired OFF period module 1016 may determine the desired OFF period using interpolation. As an example, for a boost converter (e.g., the boost converter of FIG. 4A) the desired OFF period module 1016 may set the desired OFF period based on or equal to $$t_p * \frac{V_I}{V_O},$$

where $t_p$ is the predetermined switching period, $V_I$ is the input voltage, and $V_O$ is the output voltage.

The switching control module 1008 also compensates for a turn ON delay period of the switch 320 and a turn OFF delay period of the switch 320. When the turn ON and turn OFF delay periods are negligible, this compensation may be omitted. The turn ON delay period corresponds to the period between a first time when the switching control module 1008 generates an output signal to turn the switch 320 ON and a second time when the switch 320 actually reaches ON (conductance) in response. The turn OFF delay period corresponds to the period between a first time when the switching control module 1008 generates the output signal to turn the switch 320 OFF and a second time when the switch 320 actually reaches OFF (non-conductance) in response.

To account for the turn ON delay period, the switching control module 1008 should hypothetically generate the output signal to turn the switch 320 ON before the OFF period reaches the desired OFF period. The switching control module 1008 should hypothetically also generate the output signal to turn the switch 320 ON before the current becomes greater than the final current demand due to the turn OFF delay period.

The switching control module 1008 could adjust the desired OFF period based on the turn ON delay period and the turn OFF delay period. For example, the switching control module 1008 could add the turn OFF delay period and subtract the turn ON delay period from the desired OFF period. This (adjusted) desired OFF period will be compared with the OFF period from the timer module 1012 to determine when to turn the switch 320 ON.

Other alternatives for this compensation are also possible. For example, the switching control module 1008 could generate the output signal to turn the switch 320 OFF when the measured current is greater than a current threshold that is less than the final current demand. The switching control module 1008 could generate the output signal to turn the switch 320 ON the turn ON delay period before the OFF period reaches the desired OFF period.

A delay determination module 1024 determines the turn ON delay period and the turn OFF delay period. A monitoring module 1028 monitors the switch state signal from the switch monitor circuit 328 and generates an ON/OFF signal based on the voltage. For example, the monitoring module 1028 may set the ON/OFF signal to indicate that the switch 320 is ON or OFF based on the switch state signal. Alternatively, the switch state signal may be used directly. In various implementations, the turn ON delay period and the turn OFF delay period may be set, for example, based on datasheet information regarding the turn ON and turn Off delay periods of the switch 320. Further example discussion regarding the voltage across the switch 320 is provided in the U.S. Prov. App. titled "Switch Actuation Measurement Circuit for Voltage Converter," U.S. Prov. App. No. 62/323,563, filed on Apr. 15, 2016, which is incorporated herein in its entirety. While the monitoring module 1028 is shown as being implemented within the current control module 620, the monitoring module 1028 may be implemented externally to the current control module 620 and may be implemented externally to the control module 220.

The delay determination module 1024 may set the turn ON delay period based on or equal to the period between a first time when the switching control module 1008 generates the output signal to turn the switch 320 ON and a second time when the ON/OFF signal transitions to ON in response to the output signal. The delay determination module 1024 may set the turn OFF delay period based on or equal to the period between a first time when the switching control module 1008 generates the output signal to turn the switch 320 OFF and a second time when the ON/OFF signal transitions to OFF in response to the output signal.

While the example of turning the switch 320 OFF when the measured current becomes greater than the final current demand and maintaining the switch 320 OFF for the desired OFF period thereafter, the switching control module 1008 may alternatively turn the switch 320 ON for a desired ON period. More specifically, the switching control module 1008 may turn the switch 320 ON when the measured current falls below the final current demand, maintain the switch 320 ON for a desired ON period, and turn the switch 320 OFF when the desired ON period has passed after the turning of the switch 320 ON. A desired ON period module (not shown) determines the desired ON period. Written generally, for a boost converter, the desired ON period module may determine the desired ON period based on the input voltage, the output voltage, and the predetermined switching period. The desired ON period module may determine the desired ON period using one of a function and a look-up table that relates input voltages and output voltages to desired ON times given the predetermined switching period. For values between entries of the look-up table, the desired ON period module may determine the desired ON period using interpolation.

Figure 19:
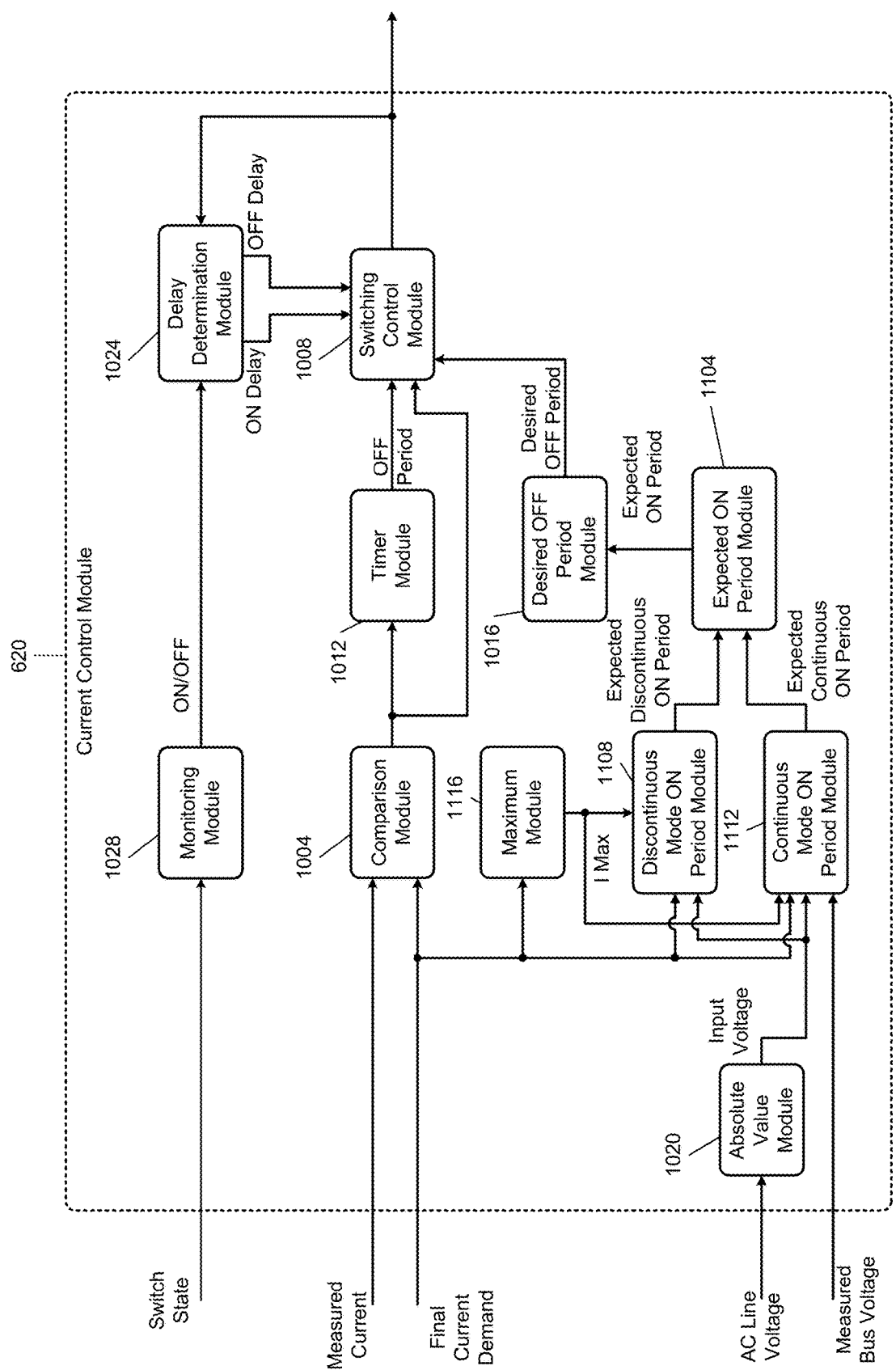

FIG. 19 includes a functional block diagram of another example implementation of the current control module 620. FIG. 19 may be used to accommodate possible operation in discontinuous mode. Possible operation in discontinuous mode may be considered because discontinuous mode operation may cause an increase in switching frequency since the ON period of the switch may be shorter than expected. Discontinuous mode operation may refer to the measured current reaching zero during predetermined switching periods. During continuous mode operation, the measured current does not reach zero. Operation may change between continuous and discontinuous mode operation, for example, as the input and/or output voltage changes. For example only, discontinuous mode operation may occur near zero crossings.

Instead of determining the desired OFF period based on the input voltage, the output voltage, and the predetermined switching period (as in the example of FIG. 18), the desired OFF period module 1016 may determine the desired OFF period based on the predetermined switching period and an expected ON period. The desired OFF period module 1016 may determine the desired OFF period using a function or a look-up table that relates predetermined switching periods and expected ON periods to desired OFF periods. For values between entries of the look-up table, the desired OFF period module 1016 may determine the desired OFF period using interpolation. For example, the desired OFF period module 1016 may set the desired OFF period based on or equal to:

$$t_p - t_{ON\_EXP},$$

where $t_p$ is the predetermined switching period and $t_{ON\_EXP}$ is the expected ON period.

An expected ON period module 1104 may set the expected ON period based on or equal to a lesser one of: an expected discontinuous mode ON period; and an expected continuous mode ON period. Stated another way, the expected ON period module 1104 may set the expected ON period based on or equal to the expected discontinuous mode ON period when the expected discontinuous mode ON period is less than the expected continuous mode ON period. The expected ON period module 1104 may set the expected ON period based on or equal to the expected continuous mode ON period when the expected continuous mode ON period is less than or equal to the expected discontinuous mode ON period.

A discontinuous mode ON period module 1108 determines the expected discontinuous mode ON period based on the final current demand, the inductance (L) of the inductor 308, and the input voltage. The discontinuous mode ON period module 1108 determines the expected discontinuous mode ON period using a function or a look-up table that relates final current demands, inductances, and input voltages to expected discontinuous mode ON periods. For values between entries of the look-up table, discontinuous mode ON period module 1108 may determine the expected discontinuous mode ON period using interpolation. For example, the discontinuous mode ON period module 1108 may set the expected discontinuous mode ON period based on or equal to:

$$\frac{IDem * L}{V_I},$$

where $v_I$ is the input voltage, IDem is the final current demand, and L is the inductance of the inductor 308.

A continuous mode ON period module 1102 determines the expected continuous mode ON period based on the predetermined switching period, the output voltage, and the input voltage. The continuous mode ON period module 1102 determines the expected continuous mode ON period using a function or a look-up table that relates predetermined switching periods, output voltages, and input voltages to expected continuous mode ON periods. For values between entries of the look-up table, the continuous mode ON period module 1102 may determine the expected continuous mode ON period using interpolation. For example, the continuous mode ON period module 1112 may set the expected continuous mode ON period based on or equal to:

$$t_p * \frac{V_O - V_I}{V_O},$$

where $t_p$ is the predetermined switching period, $v_O$ is the output voltage, and $v_I$ is the input voltage.

Another alternative for determining the expected ON period will now be described. A maximum module 1116 determines a maximum current (I Max). The maximum current corresponds to a maximum measured current that is expected given the final current demand using the expected continuous mode ON period and starting from zero current. The maximum module 1116 determines the maximum current based on the expected continuous mode ON period, the input voltage, and the inductance of the inductor 308. The maximum module 1116 determines the maximum current using a function or a look-up table that relates expected continuous mode ON periods, input voltages, and inductances to maximum currents. For values between entries of the look-up table, the maximum module 1116 may determine the maximum current using interpolation. For example, the maximum module 1116 may set the maximum current period based on or equal to:

$$\frac{t_{ON\_Cont} * V_I}{L},$$

where $t_{ON\_Cont}$ is the expected continuous mode ON period, $v_I$ is the input voltage, and L is the inductance of the inductor 308.

When the final current demand is less than the maximum current, discontinuous mode operation is occurring, and the expected ON period module 1104 may set the expected ON period based on or equal to:

$$t_{ON\_Cont} * \frac{IDem}{IMax},$$

where $t_{ON\_Cont}$ is the expected continuous mode ON period, IDem is the final current demand, and IMax is the maximum current. Alternatively, when discontinuous mode operation is occurring (i.e., when the final current demand is less than the maximum current), the expected ON period module 1104 may set the expected ON period based on or equal to:

$$\frac{IDem * L}{V_I},$$

where IDem is the final current demand, L is the inductance of the inductor 308, $v_O$ is the output voltage, and $v_I$ is the input voltage. When the final current demand is greater than or equal to the maximum current, the expected ON period module 1104 may set the expected ON period based on or equal to the expected continuous mode ON period ($t_{ON\_Cont}$).

While FIGS. 18 and 19 have been described for the example of a boost converter, the variable OFF period concepts are also applicable to buck converters. For example, for a buck converter (e.g., the buck converter of FIGS. 3B and 4B) the desired OFF period module 1016 may set the desired OFF period based on or equal to:

$$t_p * \frac{V_I - V_O}{V_O},$$

where $t_p$ is the predetermined switching period, $v_i$ is the input voltage, and $v_o$ is the output voltage. For discontinuous currents, similar corrections to those described with respect to FIG. 19 can be applied for the example of a buck converter.

Figure 20:
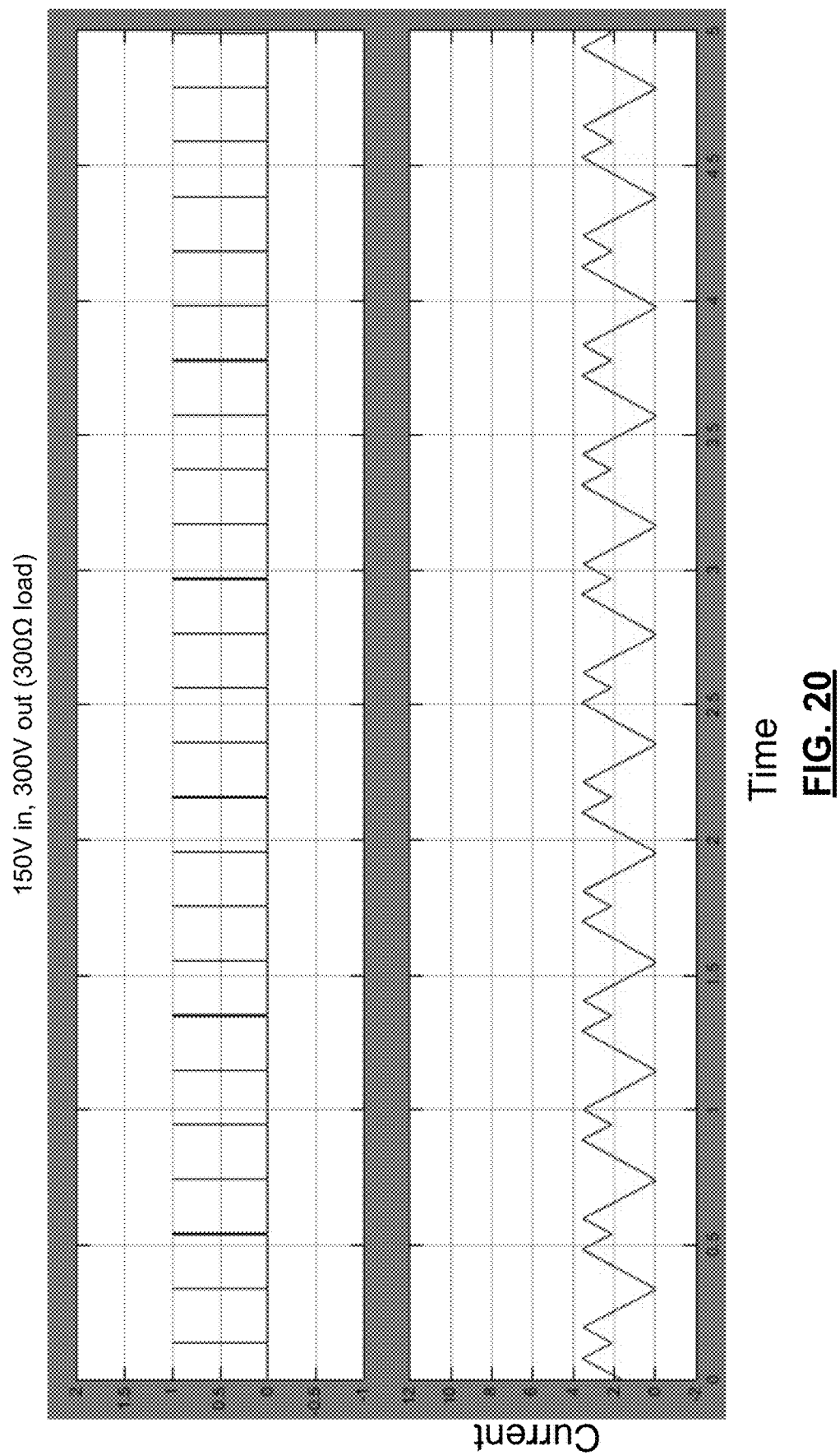
FIGS. 20-21 are example graphs of current versus time for non-periodic current ripples.
Figure 21:
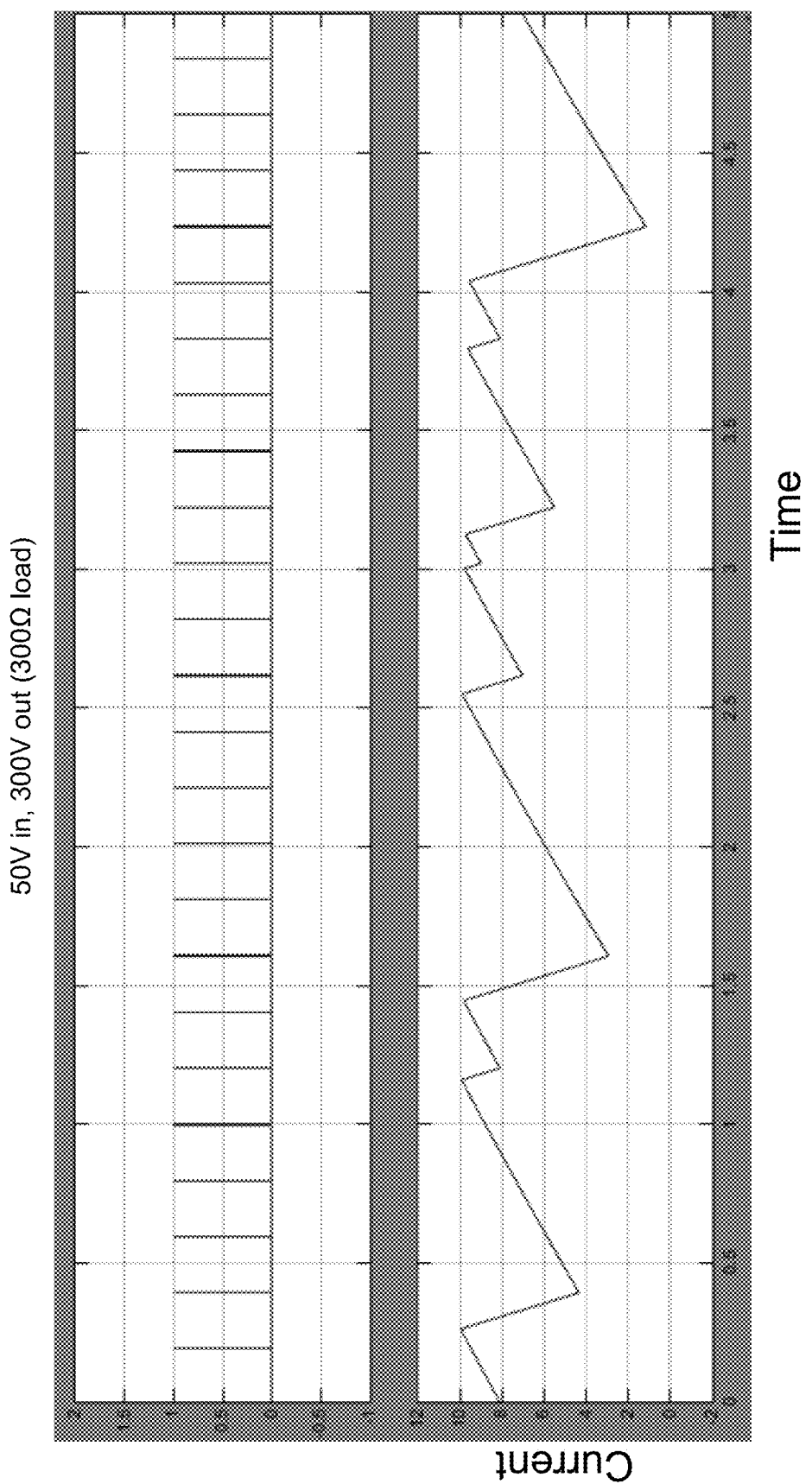

Turning the switch 320 ON for a predetermined fixed ON period during each predetermined switching period or turning the switch 320 OFF for a predetermined fixed OFF period during each predetermined switching period may cause less than desirable current ripple, such as when a ratio of the input voltage to the output voltage is low. For example, the magnitude of the current ripple may increase and/or a cause a frequency of the current ripple to be different than the predetermined switching frequency. Also, switching based on the comparison of the measured current with the final current demand and using a fixed predetermined switching period may produce non-periodic current ripple. FIGS. 20 and 21 include example graphs of current versus time and illustrate example non-periodic current ripples.

Figure 22:
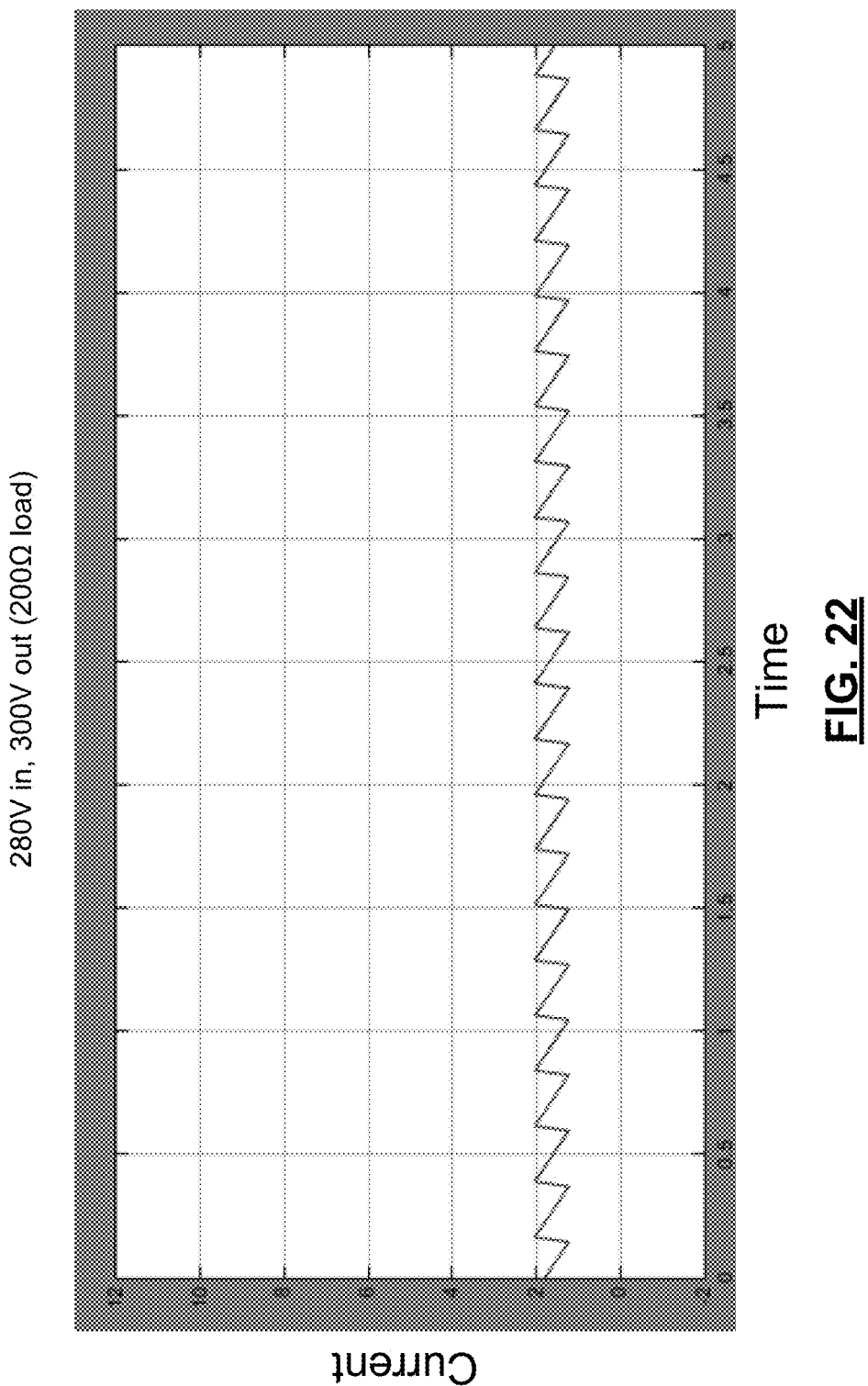
FIGS. 22-25 include example graphs of current versus time under varying input voltage, output voltage, and load conditions produced using a variable desired OFF period.
Figure 23:
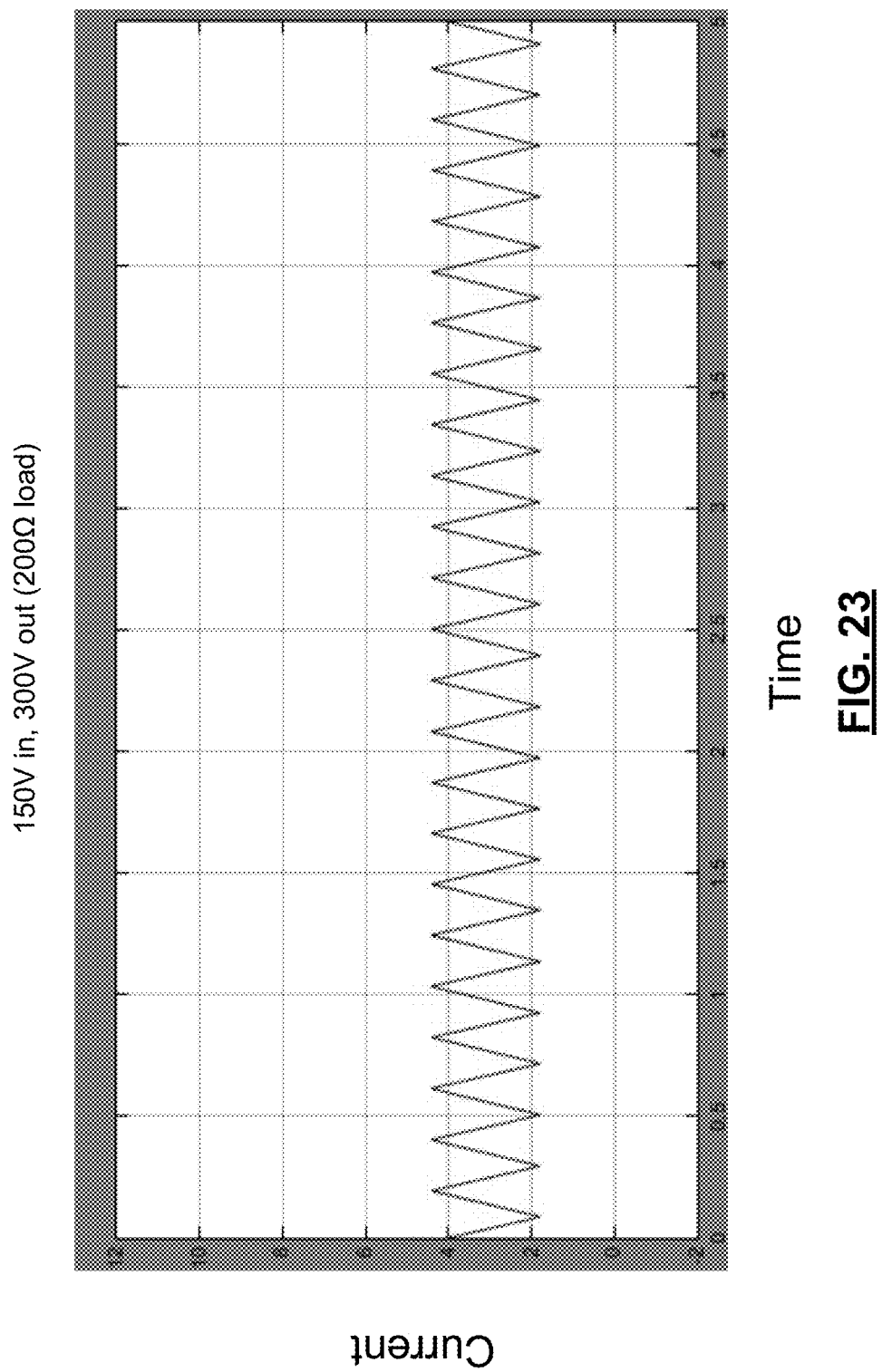
Figure 24:
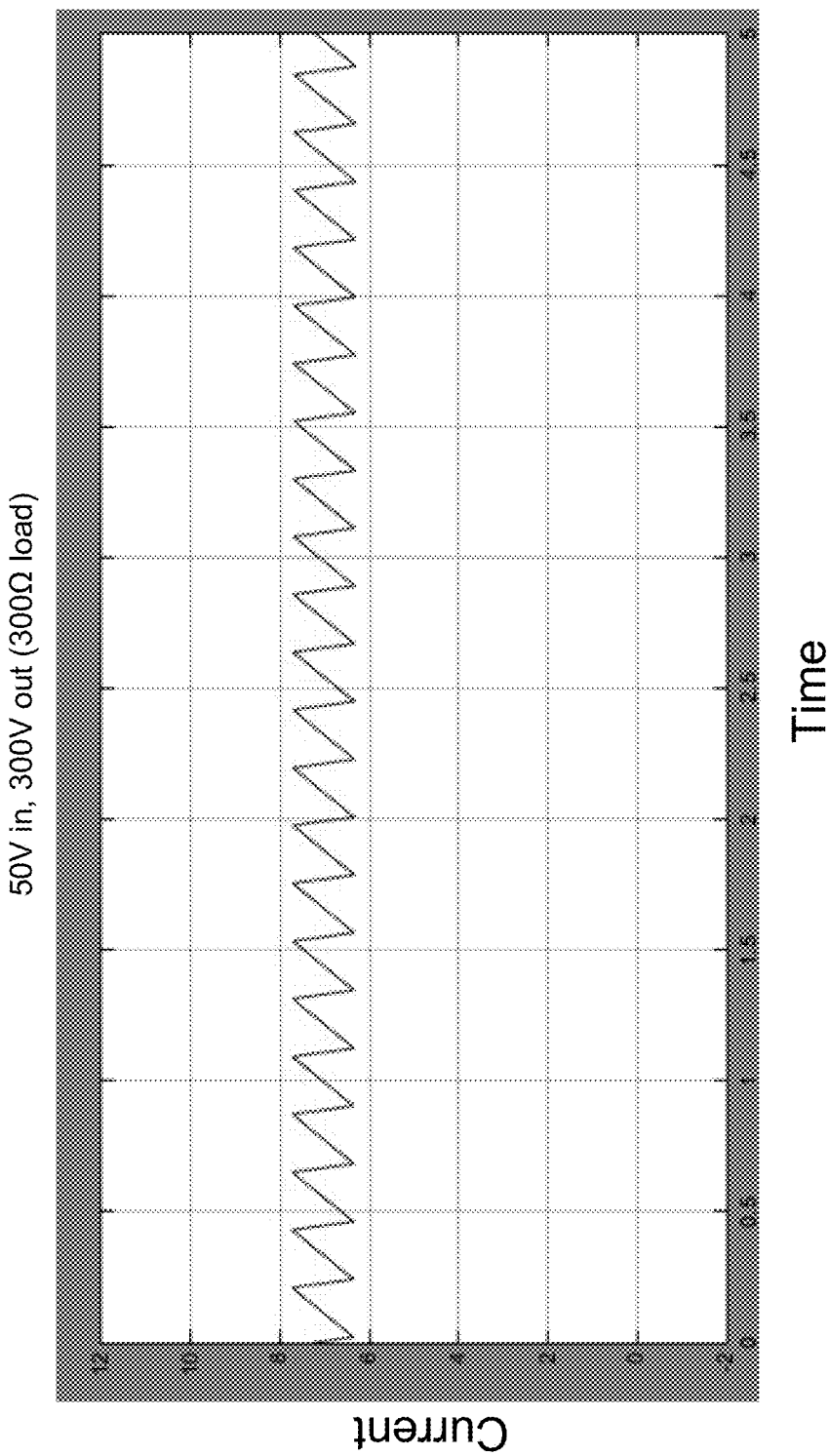
Figure 25:
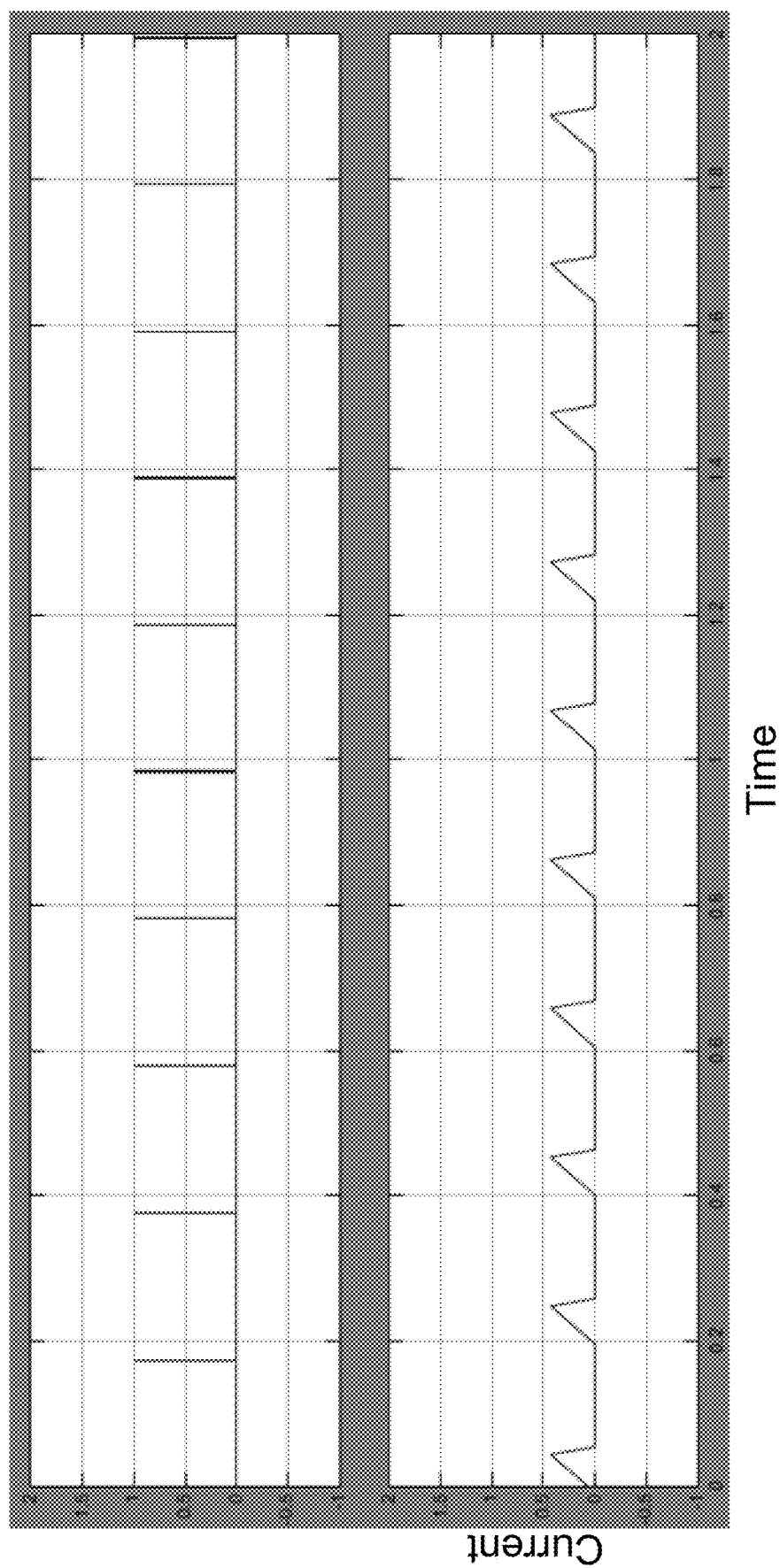

Determining the desired OFF period and maintaining the switch 320 OFF for the desired OFF period provides more periodic current ripple having approximately the predetermined switching frequency. FIGS. 22, 23, and 24 include example graphs of current versus time under varying input voltage, output voltage, and load conditions produced by determining the desired OFF period based on the example of FIG. 18. FIG. 25 includes an example graph of current versus time produced by determining the desired OFF period based on the example of FIG. 19. This may provide for more stable operation than the use of a predetermined fixed ON or OFF period and more stable operation than the use of a predetermined switching period.

Figure 26:
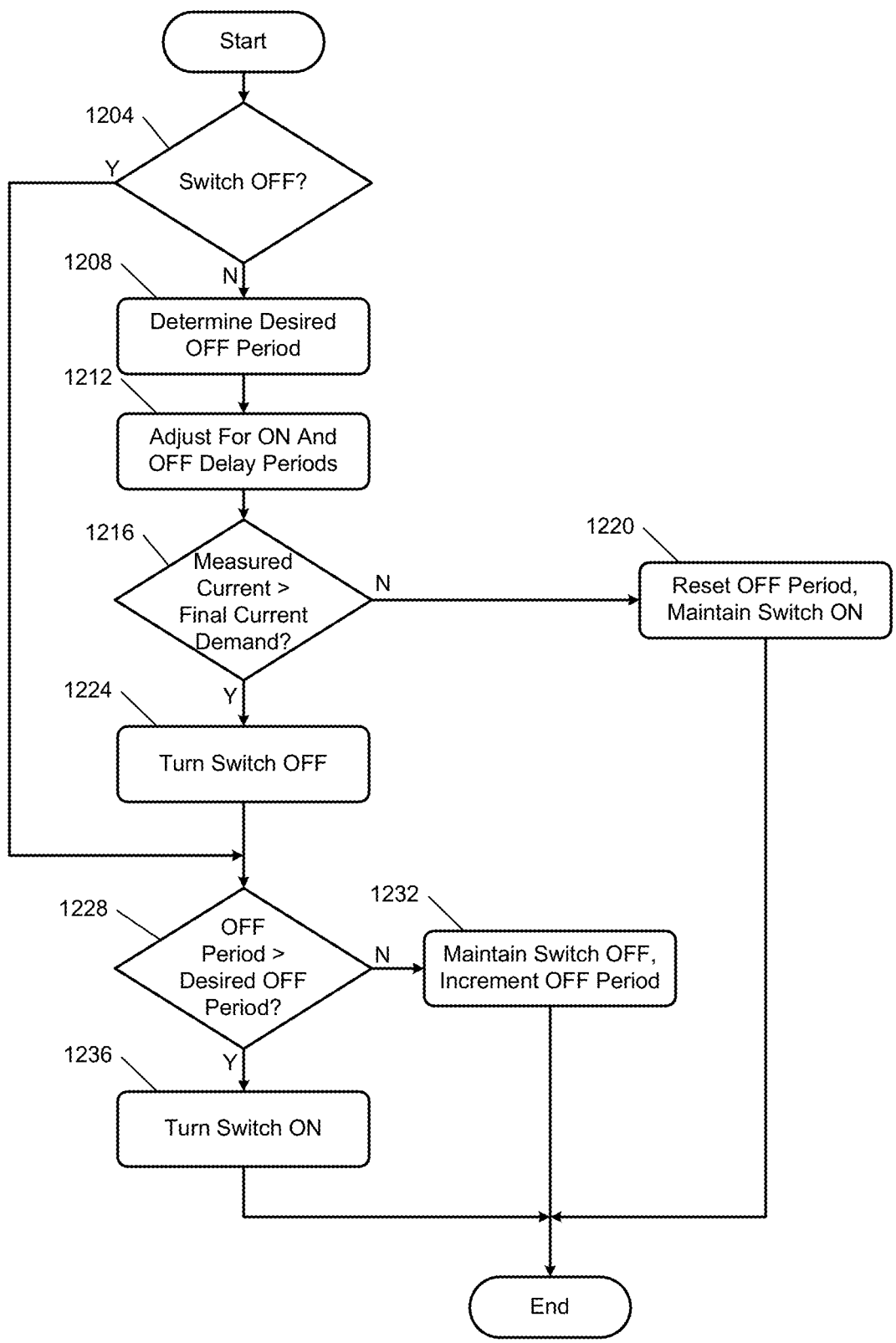
FIG. 26 is a flowchart including an example method of determining the desired OFF period of a switch and controlling the switch based on the desired OFF period.

FIG. 26 includes a flowchart depicting an example method of determining the desired OFF period of the switch 320 and controlling the switch 320 based on the desired OFF period. Control begins with 1204 where the switching control module 1008 determines whether the switch 320 is OFF (non-conducting). If 1204 is true, control transfers to 1228, which is discussed further below. If 1204 is false, control continues with 1208.

At 1208, the desired OFF period module 1016 determines the desired OFF period. The desired OFF period module 1016 may determine the desired OFF period as described above with respect to the examples of FIGS. 20 and 21. At 1212, the switching control module 1008 may adjust the desired OFF period based on the turn ON delay period and the turn OFF delay period. For example, the switching control module 1008 may sum the desired OFF period with the turn ON delay period and subtract the turn OFF delay period.

The comparison module 1004 may determine whether the measured current is greater than the final current demand at 1216. The determination of the final current demand is discussed above. If 1216 is false, the timer module 1012 resets the OFF period and the switching control module 1008 maintains the switch 320 OFF at 1220, and control ends. If 1216 is true, control continues with 1224.

The switching control module 1008 generates the output signal to turn the switch 320 OFF at 1224 when the measured current is greater than the final current demand. At 1228, the switching control module 1008 may determine whether the OFF period of the switch 320 is greater than the desired OFF period. If 1228 is false, the switching control module 1008 maintains the switch 320 OFF at 1232, and control ends. If 1228 is true, the switching control module 1008 may generate the output signal to turn the switch 320 ON at 1236, and control ends. In various implementations, the switching control module 1008 may wait for, or ensure that, the measured current is less than the final current demand before generating the output signal to turn the switch 320 ON at 1236. While control is shown as ending, the example of FIG. 26 is illustrative of one control loop and control may return to 1204 for a next control loop.

Figure 27A:
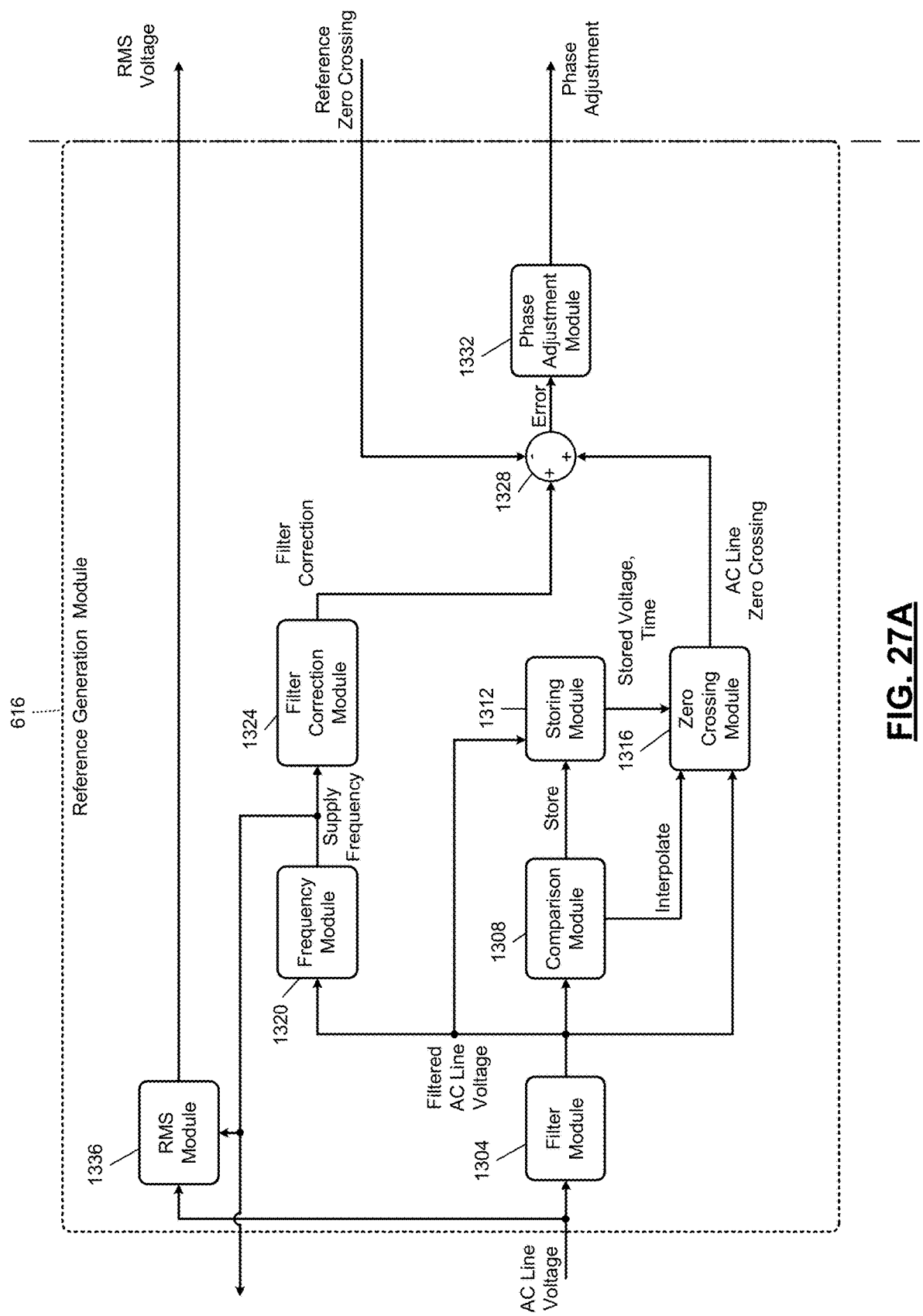
FIGS. 27A and 27B include a functional block diagram of an example implementation of a reference signal generation module.
Figure 27B:
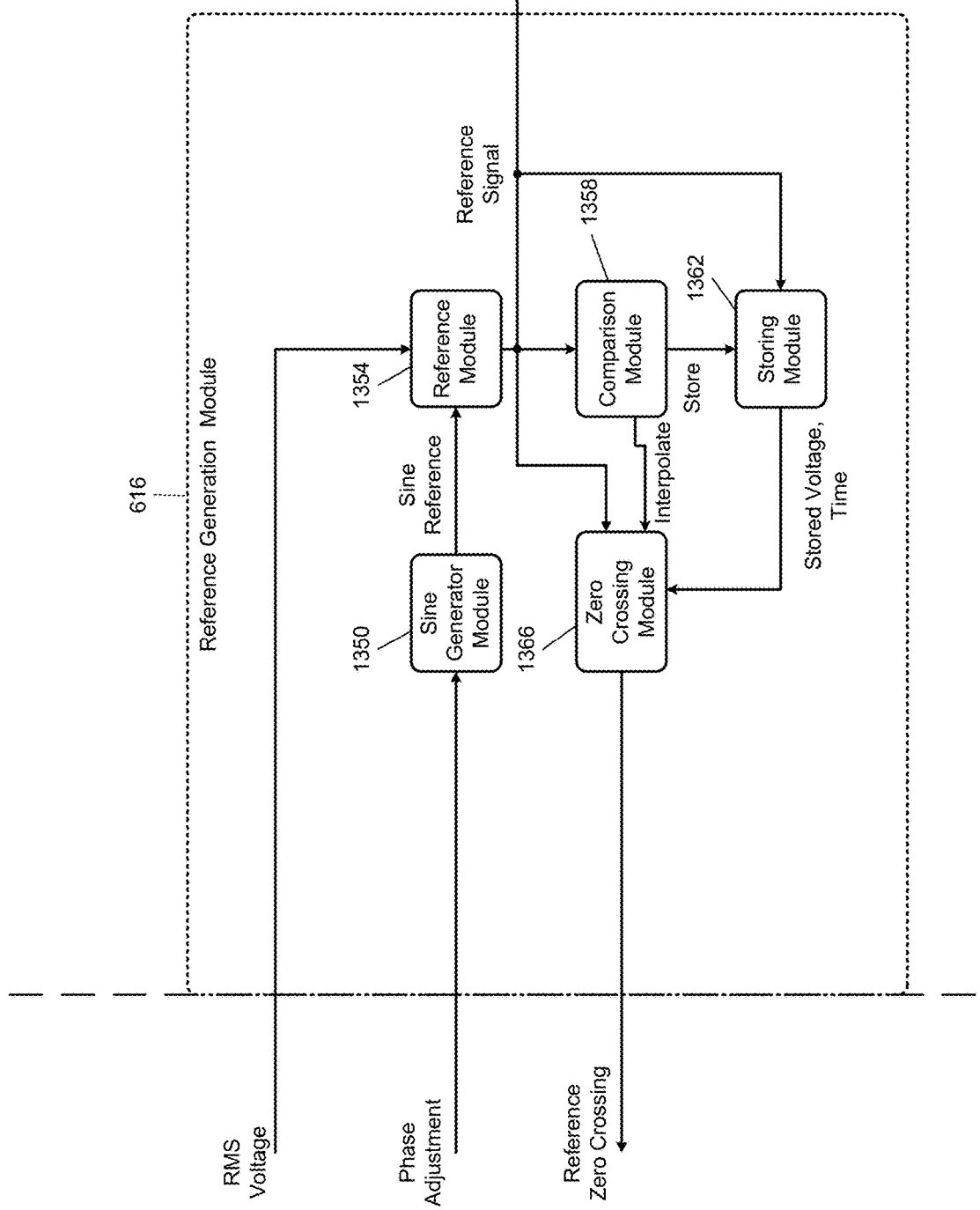

FIGS. 27A and 27B together include a functional block diagram of an example reference signal generation module 616. Referring now to FIG. 27A, a filter module 1304 applies a filter to the AC input voltage measured using the AC line voltage sensor to produce a filtered AC input voltage. For example only, the filter module 1304 may apply a first or second order low pass filter or another suitable type of filter.

A comparison module 1308 compares the filtered AC input voltage with a first predetermined voltage that is less than 0 (zero) V. The comparison module 1308 transitions a store signal from a second state to a first state when the filtered AC input voltage transitions from less than the first predetermined voltage to greater than the first predetermined voltage. For example only, the first predetermined voltage may be approximately −50 V or another suitable voltage that is less than 0 V.

When the store signal transitions from the second state to the first state, a storing module 1312 stores the filtered AC input voltage and a present time. The stored filtered AC input voltage and the stored time are used to determine a zero crossing of the AC input voltage. Present time may be tracked, for example, by a clock.

The comparison module 1308 also compares the filtered AC input voltage with a second predetermined voltage that is greater than 0 V. The comparison module 1308 transitions an interpolate signal from a second state to a first state when the filtered AC input voltage transitions from less than the second predetermined voltage to greater than the second predetermined voltage. For example only, the second predetermined voltage may be approximately +50 V or another suitable voltage that is greater than 0 V. While the example of first and second predetermined voltages that are symmetric about 0 V (e.g., +/−50 V), non-symmetric first and second predetermined voltages may be used or the first and second predetermined voltages may be symmetric about a voltage other than 0 V.

When the interpolate signal transitions from the second state to the first state, a zero crossing module 1316 determines an AC line zero crossing (e.g., time) based on the filtered AC input voltage at that (present) time, the present time, the stored time, and the stored filtered AC input voltage. The stored time and the stored filtered AC input voltage are provided by the storing module 1312. The zero crossing module 1316 may determine the AC line zero crossing, for example, using linear interpolation based on the filtered AC input voltage, the present time, the stored time, and the stored filtered AC input voltage. The AC line zero crossing corresponds to the time when the filtered AC input voltage crossed zero as it increased from the first predetermined voltage to the second predetermined voltage. An AC line zero crossing may be determined for each rising of the AC voltage across zero.

Figure 28:
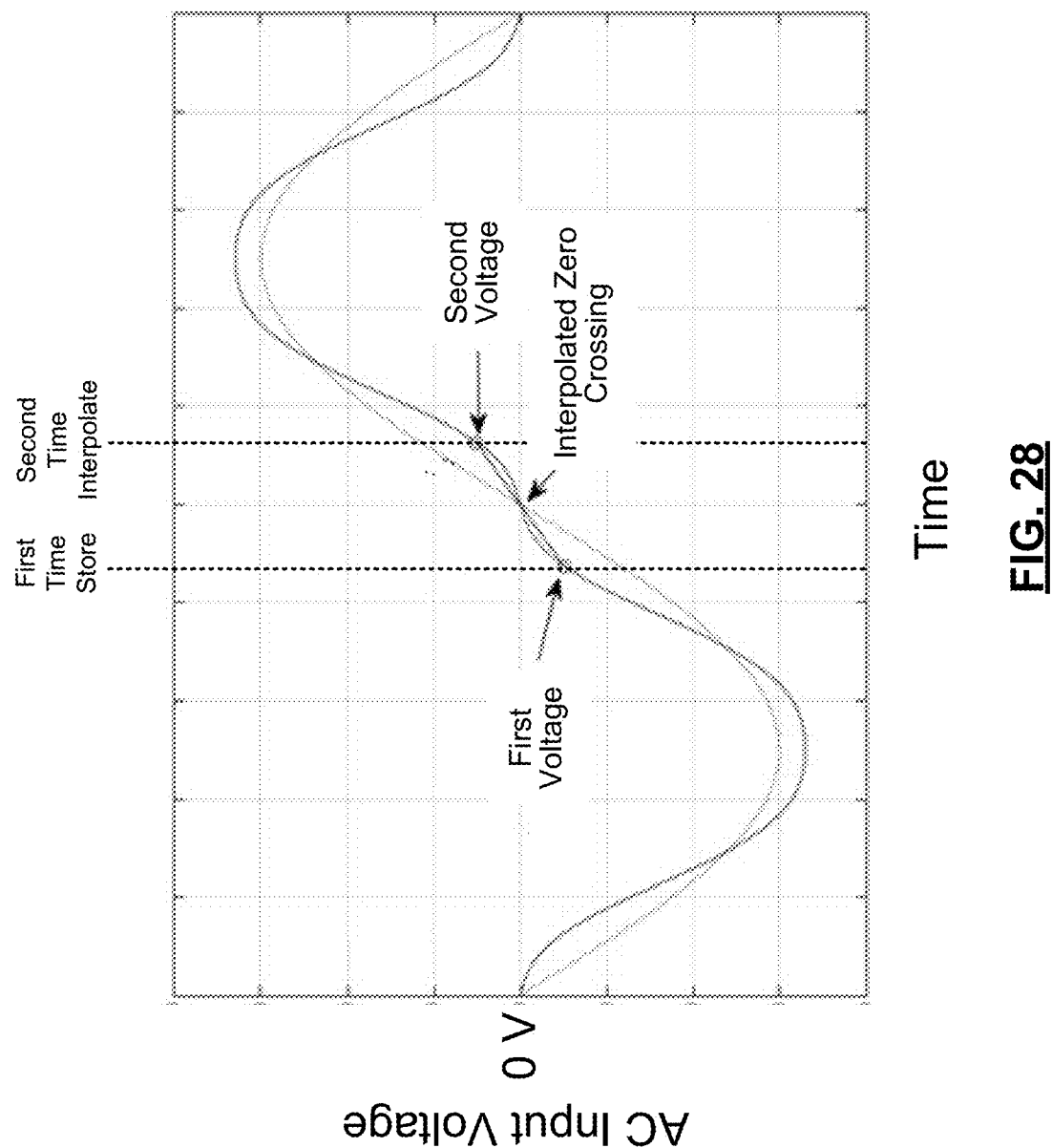
FIG. 28 includes an example graph of filtered AC input voltage versus time.

FIG. 28 includes an example graph of the filtered AC input voltage versus time. In this example, the input AC voltage (and therefore the filtered AC input voltage) are not purely sinusoidal for illustration purposes. The first voltage, the time of the first voltage (first time), the second voltage, and the time of the second voltage (second time) can be used to determine the zero crossing via linear interpolation.

Referring back to FIG. 27A, a frequency module 1320 determines the supply frequency. As discussed above, the supply frequency is used by the filter coefficients module 816 to determine the filter confidents of the notch filter. The supply frequency corresponds to the frequency of the AC input voltage. The frequency module 1320 may determine the supply frequency, for example, based on two or more values of the filtered AC input voltage. For example, the frequency module 1320 may determine the supply frequency based on the period between the filtered AC input voltages of two consecutive peaks or two consecutive zero crossings. Alternatively, the frequency module 1320 may determine the supply frequency based on the reference signal.

Figure 29:
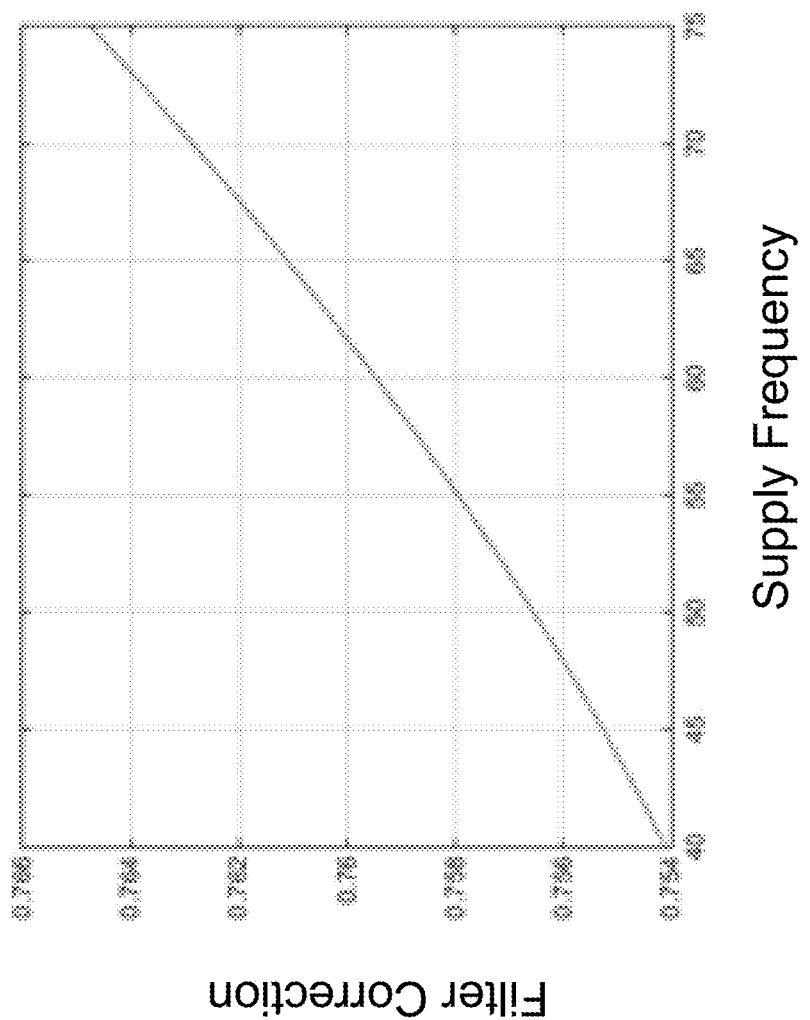
FIG. 29 includes an example graph of filter correction versus supply frequency.

The filtering performed by the filter module 1304 causes the filtered AC input voltage to be delayed relative to the AC input voltage. A filter correction module 1324 determines a filter correction for this delay based on the supply frequency. For example, the filter correction module 1324 may determine the filter correction using a function or a look-up table that relates supply frequencies to filter corrections. For values between entries of the look-up table, the filter correction module 1324 may determine the filter corrections using interpolation. FIG. 29 includes an example graph of filter correction versus supply frequency.

An error module 1328 determines an error based on a difference between the AC line zero crossing and a reference signal zero crossing. The error module 1328 may also adjust the error for the filter correction. For example, the error module 1328 may set the error based on or equal to the AC line zero crossing plus the filter correction minus the reference signal zero crossing. In various implementations, the AC line zero crossing may be adjusted based on the filter correction (e.g., summed with the filter correction), and the error module 1328 may set the error equal to or based on the (adjusted) AC line zero crossing minus the reference signal zero crossing.

A phase adjustment module 1332 determines a phase adjustment for a sine wave used to generate the reference signal based on the error. For example, the phase adjustment module 1332 may determine the phase adjustment using one of a function and a look-up table that relates errors to phase adjustments. For values between entries of the look-up table, the phase adjustment module 1332 may determine the phase adjustment using interpolation. When the error is greater than a predetermined period, such as approximately 1 period of the supply frequency, the phase adjustment module 1332 may treat the error as zero and leave the phase adjustment unchanged.

An RMS module 1336 determines an RMS (root mean squared) voltage of the AC input voltage based on the supply frequency and the AC input voltage. For example, the RMS module 1336 may determine the RMS voltage using one of a function that relates AC input voltages and supply frequencies to RMS voltages. As an example, the RMS module 1336 may determine the RMS voltage by determining an average of squares the AC input voltages obtained over one period (as indicated by the supply frequency) and set the RMS voltage based on a square root of the average. The RMS module 1336 may also multiply the RMS voltage by the square root of 2 to obtain a peak voltage. While the example of determining the RMS voltage based on the AC input voltage is provided, the filtered AC voltage may be used in place of the AC input voltage. As discussed further below, the RMS voltage (or the peak voltage) may be used to scale the reference signal such that the voltage of the reference signal corresponds to the AC input voltage.

Referring now to FIG. 27B, a sine generator module 1350 generates a sine reference signal. The sine generator module 1350 may generate the sine reference signal to form a sine wave that varies over time between +1 and −1 and that has a frequency equal to the frequency of the AC input voltage. The sine generator module 1350, however, adjusts the sine reference signal based on the phase adjustment such that zero crossings of the reference signal align with zero crossings of the AC input voltage. The sine generator module 1350 may generate the sine reference signal, for example, as described below in conjunction with 1368, 1370, and 1372 of FIG. 27D.

A reference module 1354 generates the reference signal based on the sine reference signal and the RMS voltage. For example, the reference module 1354 may set the reference signal based on or equal to the (value of the) sine reference signal multiplied by the peak voltage of the RMS voltage. The reference signal therefore varies over time with voltages corresponding to the AC input voltages and has a frequency equal to the AC input voltage.

A comparison module 1358 compares the reference signal with a third predetermined voltage that is greater than 0 (zero) V. The comparison module 1358 transitions a store signal from a second state to a first state when the reference signal transitions from greater than the third predetermined voltage to less than the third predetermined voltage. For example only, the third predetermined voltage may be approximately +50 V or another suitable voltage that is greater than 0 V. The third predetermined voltage may be the same as the second predetermined voltage.

When the store signal transitions from the second state to the first state, a storing module 1362 stores the (voltage of) the reference signal and a present time. The stored voltage of the reference signal and the stored time are used to determine a zero crossing of the reference signal.

The comparison module 1358 also compares the reference signal with a fourth predetermined voltage that is less than 0 V. The comparison module 1358 transitions an interpolate signal from a second state to a first state when the reference signal transitions from greater than the fourth predetermined voltage to less than the fourth predetermined voltage. For example only, the fourth predetermined voltage may be approximately −50 V or another suitable voltage that is less than 0 V. While the example of third and fourth predetermined voltages that are symmetric about 0 V (e.g., +/−50 V), non-symmetric third and fourth predetermined voltages may be used. The fourth predetermined voltage may be the same as the first predetermined voltage.

When the interpolate signal transitions from the second state to the first state, a zero crossing module 1366 determines a reference signal zero crossing (e.g., time) based on the (voltage of) the reference signal at that (present) time, the present time, the stored time, and the stored voltage of the reference signal. The stored time and the stored voltage of the reference signal are provided by the storing module 1362. The zero crossing module 1366 may determine the reference signal zero crossing, for example, using linear interpolation based on the voltage of the reference signal, the present time, the stored time, and the stored voltage of the reference signal. The reference signal zero crossing corresponds to the time when the reference signal crossed zero V as it decreases from the third predetermined voltage to the fourth predetermined voltage. A reference signal zero crossing may be determined for each falling of the reference signal across zero.

Figure 30:
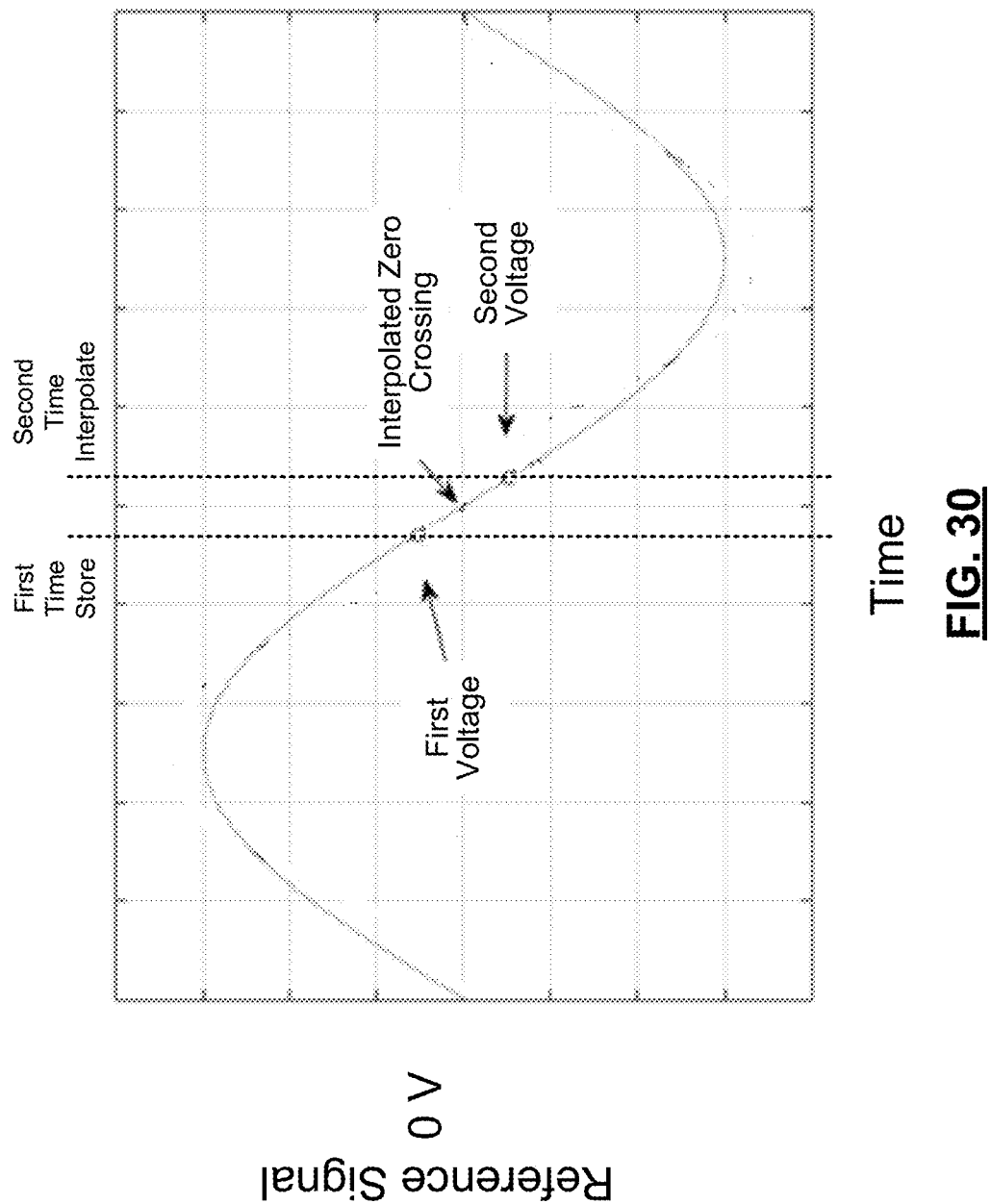
FIG. 30 includes an example graph of voltage of a reference signal versus time.

FIG. 30 includes an example graph of the voltage of the reference signal versus time. The first voltage of the reference signal, the time of the first voltage (first time), the second voltage of the reference signal, and the time of the second voltage (second time) can be used to determine the zero crossing of the reference signal via linear interpolation. While the example of determining the reference signal zero crossing using the reference signal is discussed, the sine reference signal could equally be used.

As discussed above, the reference signal zero crossing is used with the AC line zero crossing to determine the phase correction. Due to AC line zero crossings being determined based on the rising portion of the AC input voltage and reference signal zero crossings being determined based on the falling portions of the reference signal, each reference signal zero crossing should be approximately 180 degrees (½ of a period) out of phase from the AC line zero crossings that occur before and after that reference signal zero crossing.

The phase adjustment module 1332 may account for this phase difference in generating the phase adjustment. For example only, each AC line zero crossing may be adjusted based on the period corresponding to ½ of a period of the supply frequency before being used by the error module 1328. For example, the period corresponding to ½ of the period of the supply frequency may be summed with each AC line zero crossing before use by the error module 1328.

Another way to generate the reference signal is described in commonly assigned, U.S. Pat. No. 8,264,860, issued on Sep. 11, 2012, which is incorporated herein in its entirety. Generating the reference signal as described herein, however, can be performed more slowly and consume less computational resources. Generating the reference signal as described herein may also render a better reference signal when the AC input voltage is distorted. The filtering provided by the filter module 1304 provides additional robustness. The filtering imparts delay, but this delay is compensated for by the filter correction module 1324, as described above.

Figure 27C:
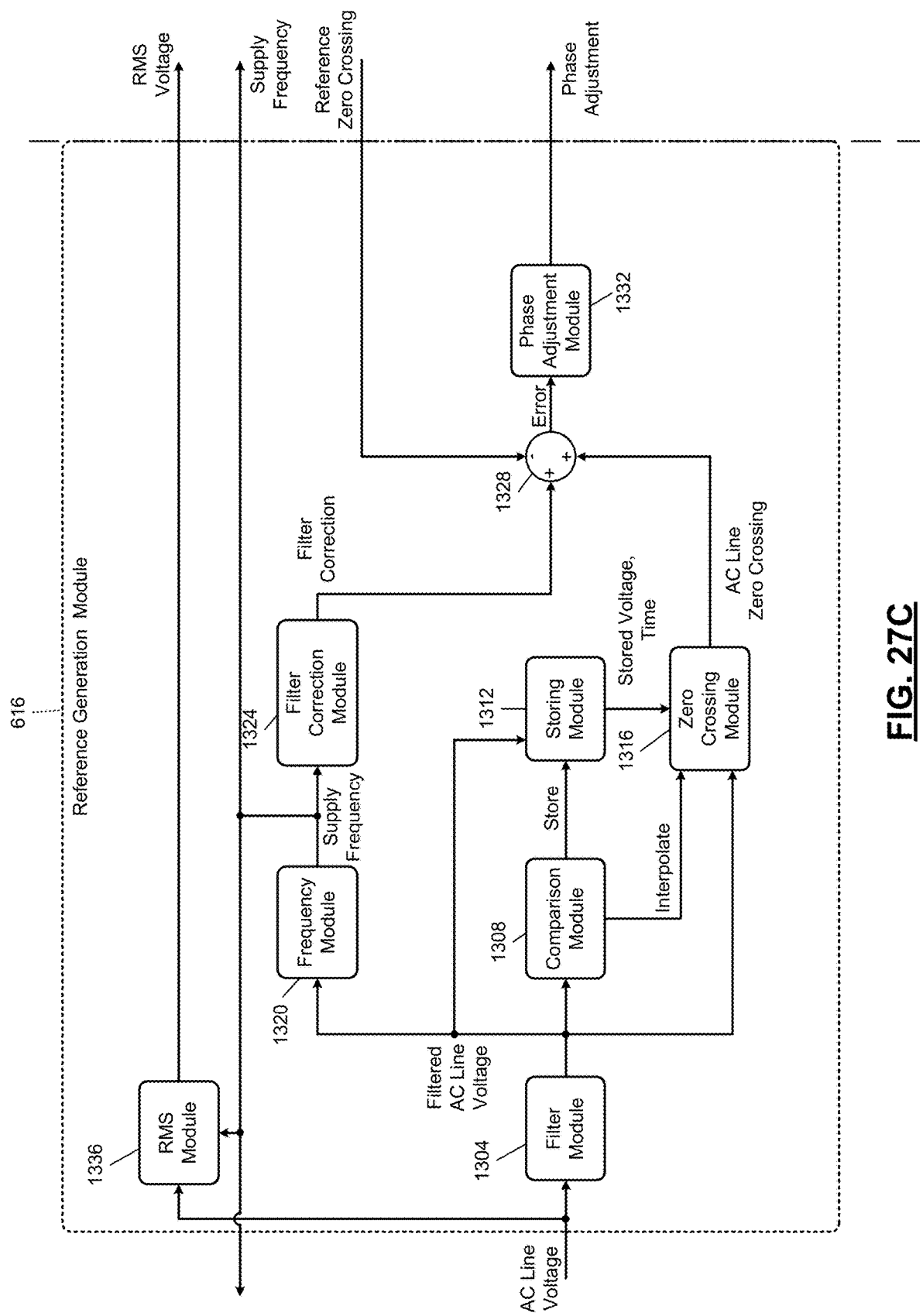
FIGS. 27C and 27D include a functional block diagram of an example implementation of a reference signal generation module.
Figure 27D:
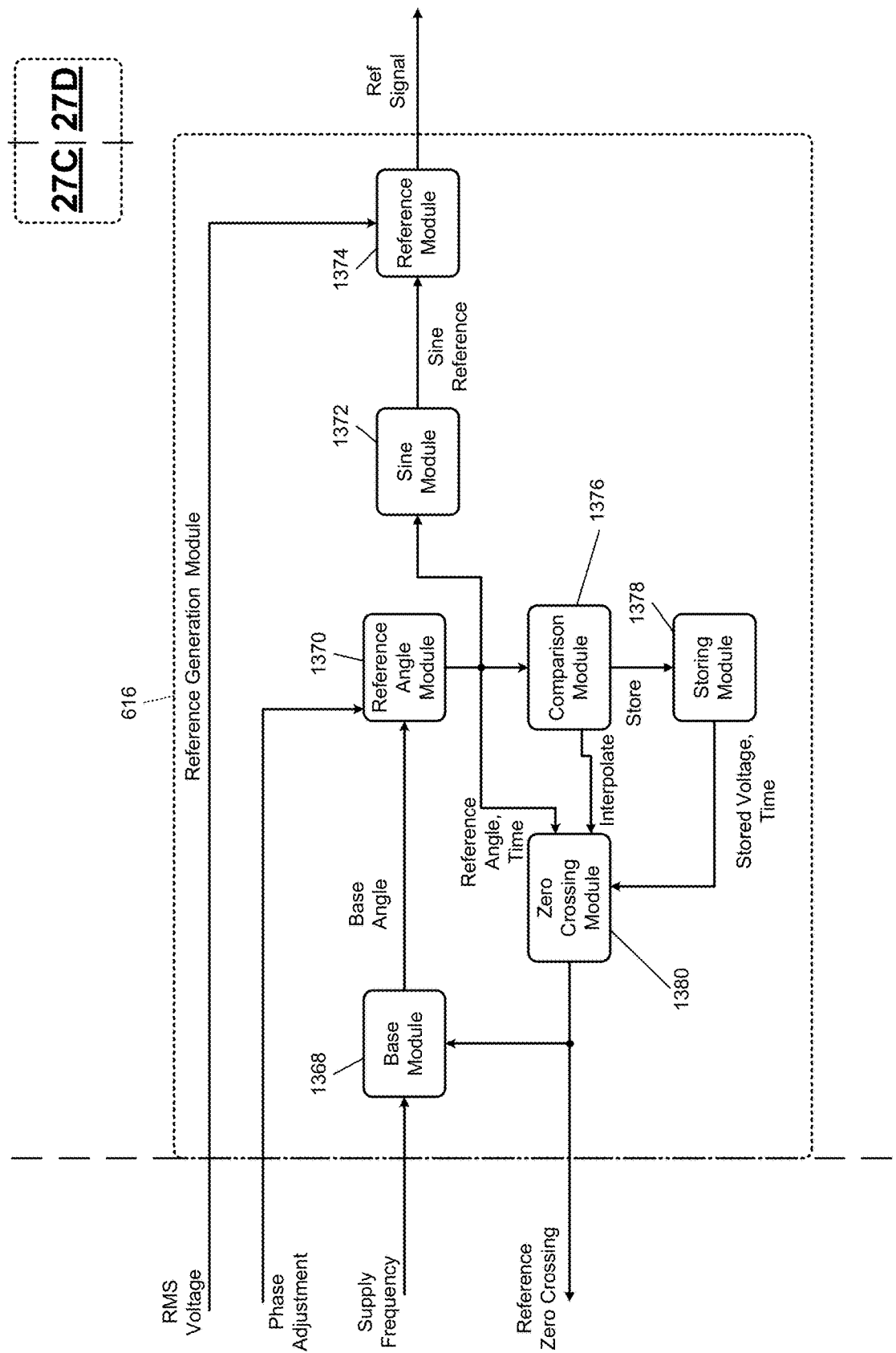

FIGS. 27C and 27D together include a functional block diagram of an example reference signal generation module 616. FIG. 27C includes elements that are similar to those of FIG. 27A. The reference signal zero crossing input to the error module 1328, however, is determined differently.

Referring now to FIG. 27D, a base module 1368 determines a base reference (signal) angle based on the supply frequency. The base reference angle corresponds to an angle of the reference signal (e.g., between 0 and 360 degrees, which corresponds to 1 period of the reference signal). The base module 1368 may, for example, mathematically integrate the supply frequency each control loop. The mathematical integration produces a change in the base reference angle. The base module 1368 may update the base reference angle each control loop by summing the change determined for that control loop with the base reference angle from the last control loop. In various implementations, the base module 1368 may limit the base reference angle to between 0 and a predetermined maximum value, such as 360 degrees, wrapping back to 0 when the base reference angle becomes greater than the predetermined maximum value. This may be performed, for example, using the modulo function.

A reference angle module 1370 determines a reference signal angle based on the phase adjustment and the base reference angle. For example, the reference angle module 1370 may set the reference signal angle based on or equal to the phase adjustment plus the base reference angle.

A sine module 1372 determines a sine reference signal angle as the sine (function) of the reference signal angle. As such, the sine reference signal angle varies between +1 and −1 based on the reference signal angle. A reference module 1374 generates the reference signal based on the sine reference signal angle and the RMS voltage. For example, the reference module 1374 may set the reference signal based on or equal to the (value of the) sine reference signal angle multiplied by the peak voltage of the RMS voltage. The reference signal therefore varies over time with voltages corresponding to the AC input voltages and has a frequency equal to the AC input voltage.

A comparison module 1376 compares the reference signal angle with a first predetermined angle. The comparison module 1376 transitions a store signal from a second state to a first state when the reference signal angle transitions from less than the first predetermined angle to greater than the first predetermined angle. For example only, the first predetermined angle may be approximately 150 degrees or another suitable angle before an expected zero crossing of the reference signal (e.g., 180 degrees).

When the store signal transitions from the second state to the first state, a storing module 1378 stores the reference signal angle and a present time. The stored reference angle and the stored time are used to determine a zero crossing of the reference signal.

The comparison module 1376 also compares the reference angle with a second predetermined angle. The comparison module 1376 transitions an interpolate signal from a second state to a first state when the reference angle transitions from less than the second predetermined angle to greater than the second predetermined angle. For example only, the second predetermined angle may be approximately 210 degrees or another suitable angle after an expected zero crossing of the reference signal (e.g., 180 degrees). While the example of first and second predetermined angles that are symmetric about 180 degrees is provided, other non-symmetric predetermined angles and other predetermined angles may be used.

When the interpolate signal transitions from the second state to the first state, a zero crossing module 1380 determines a reference signal zero crossing (e.g., time) based on the reference signal angle at the present time, the present time, the stored time, and the stored reference signal angle. The stored time and the stored reference signal angle are provided by the storing module 1378. The zero crossing module 1380 may determine the reference signal zero crossing, for example, using linear interpolation based on the reference signal angle, the present time, the stored time, and the stored reference signal angle. The reference signal zero crossing corresponds to the time when the reference signal crossed zero V as the reference signal decreased. A reference signal zero crossing may be determined for each falling of the reference signal across zero.

Figure 27E:
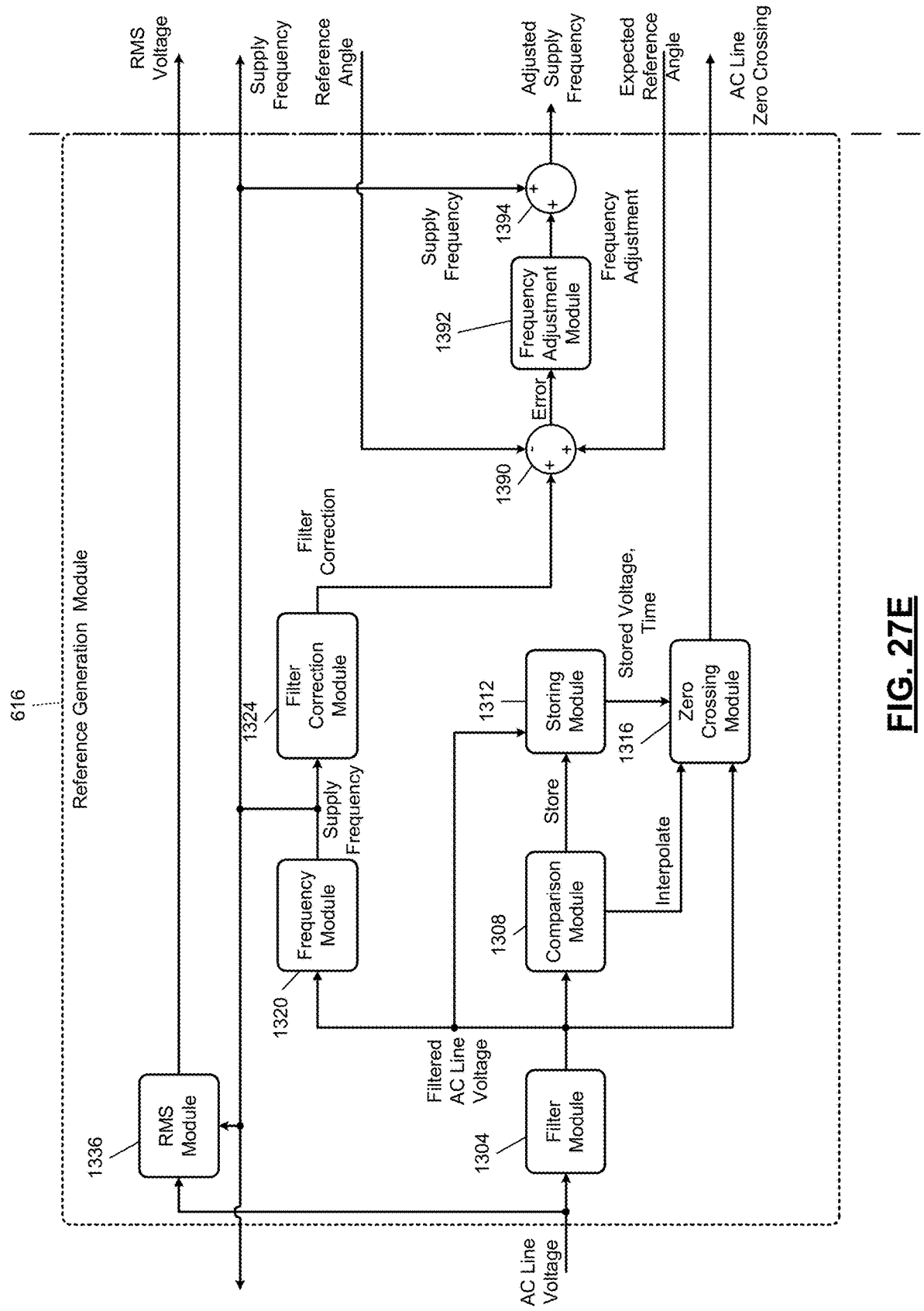
FIGS. 27E and 27F include a functional block diagram of an example implementation of a reference signal generation module.
Figure 27F:
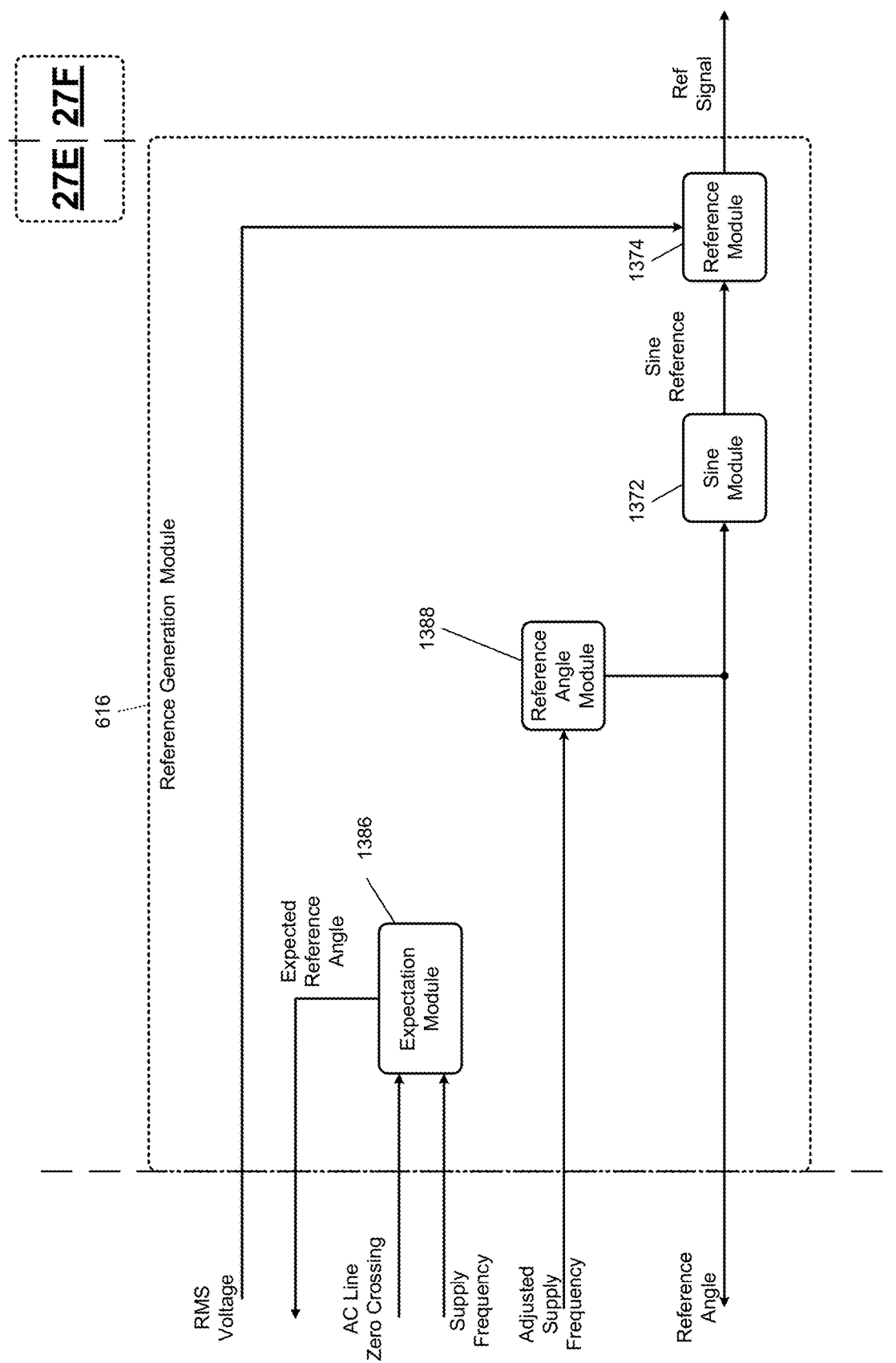

FIGS. 27E and 27F together include a functional block diagram of an example reference signal generation module 616. In the example of FIGS. 27E and 27F, the AC line zero crossing is used to determine an expected reference angle. In the example of FIGS. 27E and 27F, the reference signal zero crossing is not determined.

Referring to FIG. 27F, an expectation module 1386 determines an expected reference signal angle. The expected reference signal angle at a given time corresponds to an expected value of the reference signal angle at that time. The expectation module 1386 determines the expected reference signal angle based on the AC line zero crossing and the supply frequency. For example, the expectation module 1386 may set the expected reference signal angle to zero at each AC line zero crossing. The expectation module 1386 may mathematically integrate the supply frequency each control loop. The mathematical integration produces a change in the expected reference signal angle. The expectation module 1386 may update the expected reference signal angle each control loop by summing the change determined for that control loop with the expected reference signal angle from the last control loop. In various implementations, the expectation module 1386 may limit the expected reference signal angle to between 0 and a predetermined maximum value, such as 360 degrees, wrapping back to 0 when the expected reference signal angle becomes greater than the predetermined maximum value. This may be performed, for example, using the modulo function. The expected reference signal angle is discussed further below.

A reference angle module 1388 determines a base reference (signal) angle based on an adjusted supply frequency. Generation of the adjusted supply frequency is discussed further below with respect to FIG. 27E. The reference angle module 1388 may, for example, determine a change in the reference signal angle based on a period between consecutive determinations of the base reference signal angle and the adjusted supply frequency. The reference angle module 1388 may, for example, mathematically integrate the adjusted supply frequency each control loop. The mathematical integration produces a change in the base reference angle. The reference angle module 1388 may update the base reference angle each control loop by summing the change determined for that control loop with the base reference angle from the last control loop. In various implementations, the reference angle module 1388 may limit the base reference angle to between 0 and a predetermined maximum value, such as 360 degrees, wrapping back to 0 when the base reference angle becomes greater than the predetermined maximum value. This may be performed, for example, using the modulo function. The sine module 1372 and the reference module 1374 are discussed above and are used to generate the reference signal.

Referring to FIG. 27E, an error module 1390 determines an angle error based on the filter correction (from the filter correction module 1324), the expected reference signal angle (determined by the expectation module 1386), and the reference angle (determined by the reference angle module 1388). For example only, the error module 1390 may set the angle error based on or equal to the expected reference angle minus the reference signal angle plus the filter correction.

A frequency adjustment module 1392 determines a frequency adjustment based on the error. For example, the frequency adjustment module 1392 may increase the frequency adjustment as the error increases and decrease the frequency adjustment as the error decreases. An adjusting module 1394 adjusts the supply frequency based on the frequency adjustment to determine the adjusted supply frequency. For example, the adjusting module 1394 may set the adjusted supply frequency based on or equal to the supply frequency plus the frequency adjustment. Based on the above, the reference signal will be adjusted to correspond to the AC line voltage in frequency and phase.

Figure 31:
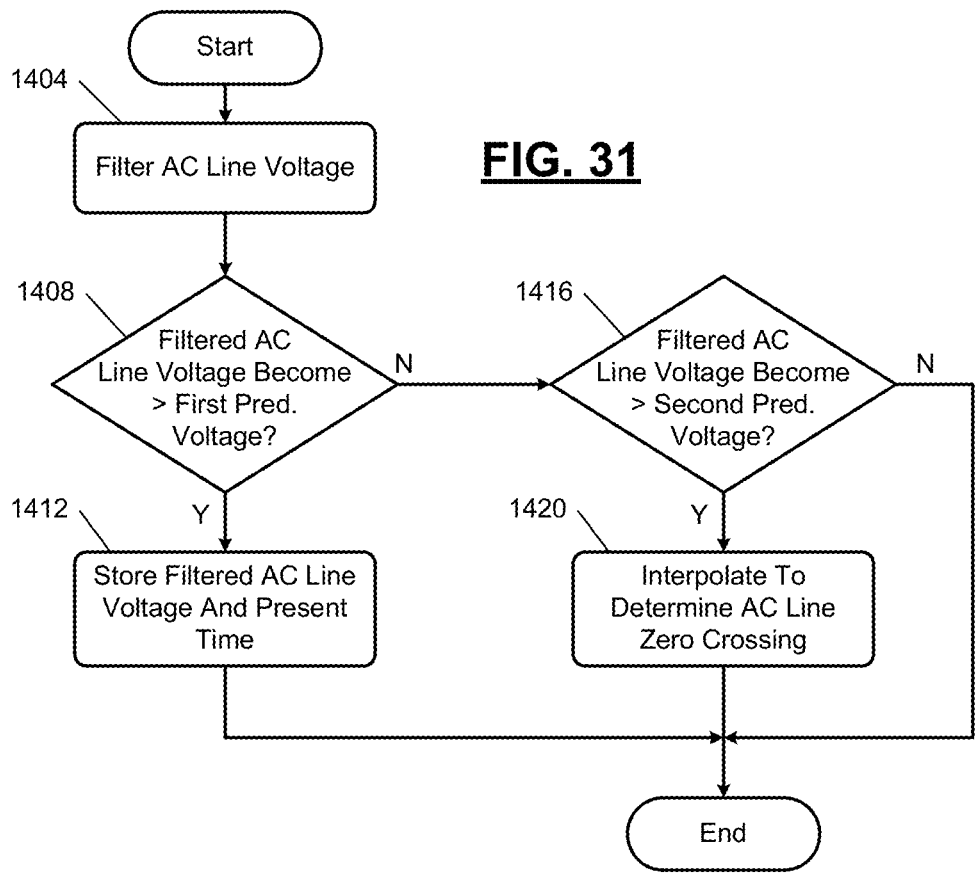
FIG. 31 is a flowchart depicting an example method of determining an AC line zero crossing.

FIG. 31 is a flowchart depicting an example method of determining an AC line zero crossing, for example based on the example of FIG. 27A-27B. Control begins with 1404 where the filter module 1304 filters the AC input voltage to produce a filtered AC input voltage. For example only, the filter module 1304 may apply a low pass filter. At 1408, the comparison module 1308 determines whether the filtered AC input voltage has transitioned from less than the first predetermined voltage (e.g., −50 V) to greater than the first predetermined voltage. If 1408 is true, the storing module 1312 stores the filtered AC input voltage and the present time at 1412, and control ends. If 1408 is false, control transfers to 1416.

At 1416, the comparison module 1308 determines whether the filtered AC input voltage has transitioned from less than the second predetermined voltage (e.g., +50 V) to greater than the second predetermined voltage. If 1416 is true, the zero crossing module 1316 determines the AC line zero crossing (as the filtered AC input voltage increased from the first predetermined voltage toward the second predetermined voltage) at 1420 based on the stored filtered AC input voltage, the present filtered AC input voltage, the stored time, and the present time using linear interpolation. Control then ends. If 1416 is false, control ends. While control is shown as ending, the example of FIG. 31 is illustrative of one control loop and control may return to 1404 for a next control loop. Also, while the example of interpolating once when the filtered AC voltage transitions to greater than the second predetermined voltage has been described, the zero crossing module 1316 may perform the interpolation based on the present filtered AC voltage for each control loop and determine the AC line zero crossing based on the interpolation at the time when the filtered AC input voltage has transitioned to greater than the second predetermined voltage.

Figure 32:
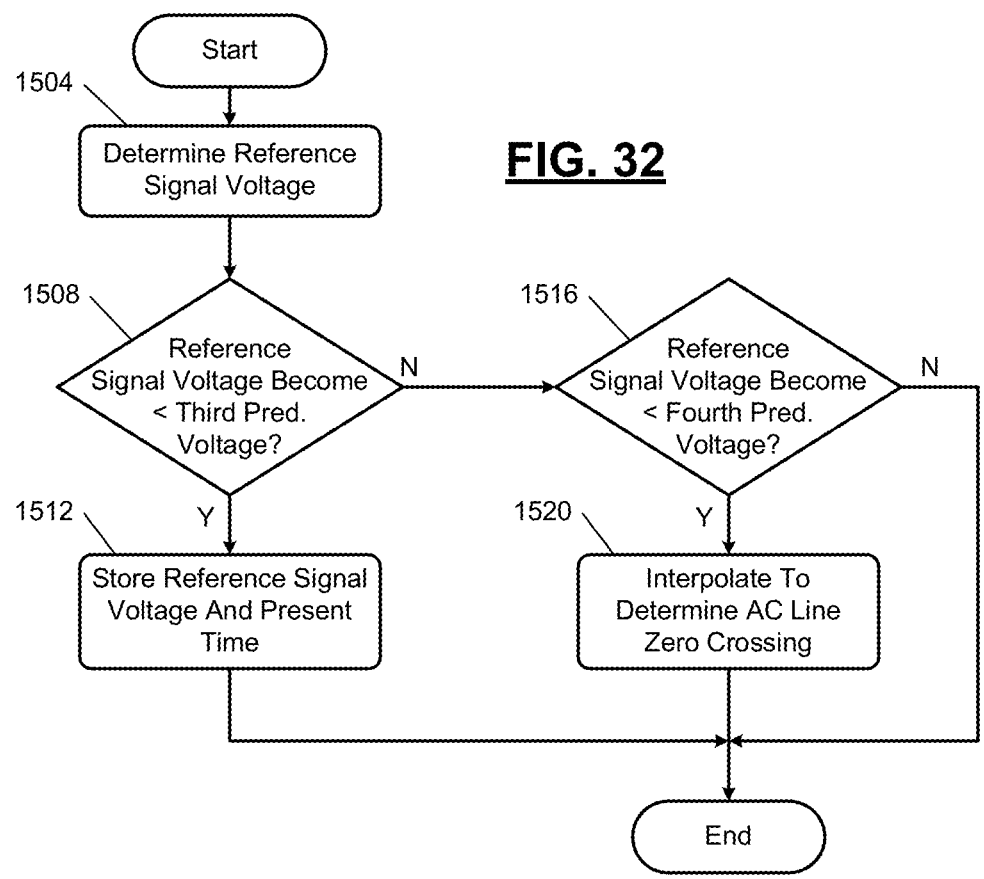
FIG. 32 is a flowchart depicting an example method of determining a reference signal zero crossing.

FIG. 32 is a flowchart depicting an example method of determining a reference signal zero crossing, for example based on the example of FIG. 27A-27B. Control begins with 1504 where the reference module 1354 generates the reference signal (voltage) based on the RMS voltage multiplied with the sine reference signal (value). At 1508, the comparison module 1358 determines whether the voltage of the reference signal has transitioned from greater than the third predetermined voltage (e.g., +50 V) to less than the third predetermined voltage. If 1508 is true, the storing module 1362 stores the reference signal voltage and the present time at 1512, and control ends. If 1508 is false, control transfers to 1516.

At 1516, the comparison module 1358 determines whether the voltage of the reference signal has transitioned from greater than the fourth predetermined voltage (e.g., −50 V) to less than the fourth predetermined voltage. If 1516 is true, the zero crossing module 1366 determines the reference signal zero crossing (as the reference signal decreased from the third predetermined voltage toward the fourth predetermined voltage) at 1520 based on the stored reference signal voltage, the present voltage of the reference signal, the stored time, and the present time using linear interpolation. Control then ends. If 1516 is false, control ends. While control is shown as ending, the example of FIG. 32 is illustrative of one control loop and control may return to 1504 for a next control loop. The example of FIG. 32 may be performed concurrently with the example of FIG. 31. Also, while the example of interpolating once when the voltage of the reference signal transitions to less than the fourth predetermined voltage has been described, the zero crossing module 1366 may perform the interpolation based on the present voltage of the reference signal for each control loop and determine the reference signal zero crossing based on the interpolation at the time when the present voltage has transitioned to less than the fourth predetermined voltage.

Figure 33:
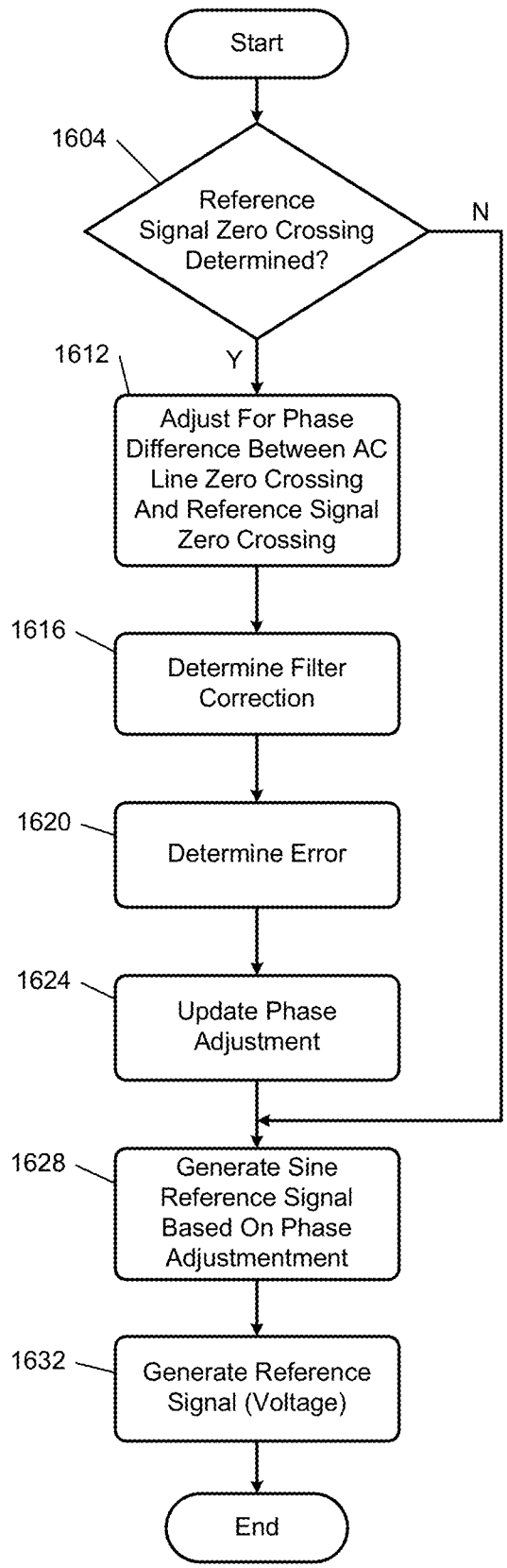
FIG. 33 is a flowchart depicting an example method of generating the reference signal.

FIG. 33 is a flowchart depicting an example method of generating the reference signal, for example based on the example of FIG. 27A-27B. Control may begin with 1604 where the sine generator module 1350 may determine whether the zero crossing module 1366 has just determined the reference signal zero crossing. For example, the zero crossing module 1366 may signal such a determination to the sine generator module 1350 or the sine generator module 1350 may determine that the zero crossing module 1366 determined the reference signal zero crossing when the reference signal zero crossing changes. If 1604 is false, control may transfer to 1628, which is discussed further below. If 1604 is true, control may continue with 1612.

At 1612, control makes one or more adjustments to account for the approximately ½ of one period (e.g., 1/supply frequency) difference between the AC line zero crossing and the reference signal zero crossing. For example, the zero crossing module 1316 may add ½ of one period of the AC input voltage to the AC line zero crossing, or the zero crossing module 1366 may subtract ½ of one period of the AC input voltage from the reference signal zero crossing. At 1616, the filter correction module 1324 determines the filter correction based on the supply frequency. The filter correction corresponds to the delay period imposed by the filter module 1304.

At 1620, the error module 1328 determines an error between the (last determined) AC line zero crossing and the (just determined) reference signal zero crossing. For example, the error module 1328 may set the error based on or equal to the AC line zero crossing plus the filter correction minus the reference signal zero crossing. The phase adjustment module 1332 updates the phase adjustment at 1624 based on the error. For example, the phase adjustment module 1332 may determine the phase adjustment using a function or a look-up table that relates errors to phase adjustments.

At 1628, the sine generator module 1350 generates a next value of the sine reference signal for generating a sine wave over the next period based on the phase adjustment. The reference module 1354 generates the next voltage of the reference signal based on the value of the sine reference signal and the RMS voltage (of the AC line) at 1632. For example, the reference module 1354 may set the voltage of the reference signal based on or equal to the value of the sine reference signal multiplied with the peak voltage of the RMS voltage. The RMS module 1336 determines the RMS voltage based on the AC input voltage, such as at 1628. The RMS module 1336 may set the peak voltage based on or equal to the RMS voltage multiplied by the square root of 2.

While control is shown as ending, the example of FIG. 33 is illustrative of one control loop and control may return to 1604 for a next control loop. The example of FIG. 33 may be performed concurrently with the examples of FIGS. 31 and 32. Also, while the example of updating the phase adjustment when the reference signal zero crossing is determined, the phase adjustment could be additionally or alternatively updated when the AC line zero crossing is determined using that AC line zero crossing and the last reference signal zero crossing (from approximately ½ of one period earlier). While FIGS. 31-33 are discussed in conjunction with the examples of FIGS. 27A-27B, similar concepts are applicable to the examples of FIGS. 27C-D and FIGS. 27E-F.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A power factor correction (PFC) system comprising:
a desired OFF period module that determines a desired OFF period for a switch of a PFC circuit based on an input voltage to the PFC circuit and an output voltage of the PFC circuit,
wherein the desired OFF period module sets the desired OFF period using one of:
   (i) an equation that relates input voltages and output voltages to desired OFF periods; and
   (ii) a look-up table that relates input voltages and output voltages to desired OFF periods; and
a switching control module:
   that transitions the switch from an ON state to an OFF state in response to a determination that a measured current through an inductor of the PFC circuit is greater than a demanded current through the inductor; and
   that maintains the switch in the OFF state for the desired OFF period after the transition from the ON state to the OFF state.

2. The PFC system of claim 1 wherein the desired OFF period module sets the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage.

3. The PFC system of claim 1 wherein the switching control module:
   in response to a determination that a period between (i) a time of the transition from the ON state to the OFF state and (ii) a present time is greater than the desired OFF period, transitions the switch from the OFF state to the ON state; and
   maintains the switch in the ON state until the measured current through the inductor of the PFC circuit is greater than the demanded current through the inductor.

4. The PFC system of claim 3 further comprising a current demand module that determines the demanded current through the inductor based on a difference between the output voltage and a desired value of the output voltage.

5. The PFC system of claim 1 wherein the desired OFF period module determines the desired OFF period further based on a switching period of the switch.

6. A power factor correction (PFC) system comprising:
a desired ON period module that determines a desired ON period for a switch of a PFC circuit, wherein the desired ON period is variable,
a desired OFF period module that sets a desired OFF period for the switch equal to a switching period of the switch minus the desired ON period; and
a switching control module:
   that transitions the switch from an ON state to an OFF state in response to a determination that a measured current through an inductor of the PFC circuit is greater than a demanded current through the inductor; and
   that maintains the switch in the OFF state for the desired OFF period after the transition from the ON state to the OFF state.

7. The PFC system of claim 6 wherein the desired ON period module sets the desired ON period for the switch based on a maximum current through the inductor, the demanded current through the inductor, and an input voltage of the PFC circuit.

8. The PFC system of claim 6 wherein the desired ON period module sets the desired ON period for the switch based on a maximum current through the inductor, the demanded current through the inductor, an input voltage of the PFC circuit, and an output voltage of the PFC circuit.

9. A power factor correction (PFC) method comprising:
determining a desired OFF period for a switch of a PFC circuit based on an input voltage to the PFC circuit and an output voltage of the PFC circuit,
wherein determining the desired OFF period includes setting the desired OFF period using one of:
   (i) an equation that relates input voltages and output voltages to desired OFF periods; and
   (ii) a look-up table that relates input voltages and output voltages to desired OFF periods;
transitioning the switch from an ON state to an OFF state in response to a determination that a measured current through an inductor of the PFC circuit is greater than a demanded current through the inductor; and
maintaining the switch in the OFF state for the desired OFF period after the transition from the ON state to the OFF state.

10. The PFC method of claim 9 wherein determining the desired OFF period includes setting the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage.

11. The PFC method of claim 9 further comprising:
   in response to a determination that a period between (i) a time of the transition from the ON state to the OFF state and (ii) a present time is greater than the desired OFF period, transitioning the switch from the OFF state to the ON state; and
   maintaining the switch in the ON state until the measured current through the inductor of the PFC circuit is greater than the demanded current through the inductor.

12. The PFC method of claim 11 further comprising determining the demanded current through the inductor based on a difference between the output voltage and a desired value of the output voltage.

13. The PFC method of claim 9 wherein determining the desired OFF period includes determining the desired OFF period further based on a switching period of the switch.

14. A power factor correction (PFC) method comprising:
determining a desired ON period for a switch of a PFC circuit, wherein the desired ON period is variable;

setting a desired OFF period for the switch equal to a switching period of the switch minus the desired ON period;

transitioning the switch from an ON state to an OFF state in response to a determination that a measured current through an inductor of the PFC circuit is greater than a demanded current through the inductor; and maintaining the switch in the OFF state for the desired OFF period after the transition from the ON state to the OFF state.

15. The PFC method of claim 14 wherein determining the desired ON period includes setting the desired ON period for the switch based on a maximum current through the inductor, the demanded current through the inductor, and an input voltage of the PFC circuit.

16. The PFC method of claim 14 wherein determining the desired ON period includes setting the desired ON period for the switch based on a maximum current through the inductor, the demanded current through the inductor, an input voltage of the PFC circuit, and an output voltage of the PFC circuit.

17. A power factor correction (PFC) system comprising:
a discontinuous mode ON period module that determines a first expected ON period for discontinuous mode operation based on a maximum current through an inductor of a PFC circuit, a demanded current through the inductor, and an input voltage of the PFC circuit;
a continuous mode ON period module that determines a second expected ON period for continuous mode operation based on the maximum current through the inductor, the demanded current through the inductor, the input voltage, and an output voltage of the PFC circuit;
an expected ON period module that sets a third expected ON period for a switch of the PFC circuit to one of the first expected ON period and the second expected ON period;
a desired OFF period module that sets a desired OFF period for the switch based on a switching period of the switch minus the third expected ON period; and
a switching control module:
that transitions the switch from an ON state to an OFF state in response to a determination that a measured current through the inductor of the PFC circuit is greater than the demanded current through the inductor; and
that maintains the switch in the OFF state for the desired OFF period after the transition from the ON state to the OFF state.

18. A power factor correction (PFC) method comprising:
determining a first expected ON period for discontinuous mode operation based on a maximum current through an inductor of a PFC circuit, a demanded current through the inductor, and an input voltage of the PFC circuit;
determining a second expected ON period for continuous mode operation based on the maximum current through the inductor, the demanded current through the inductor, the input voltage, and an output voltage;

setting a third expected ON period for a switch of the PFC circuit to one of the first expected ON period and the second expected ON period, setting a desired OFF period for the switch based on a switching period of the switch minus the third expected ON period;

transitioning the switch from an ON state to an OFF state in response to a determination that a measured current through the inductor of the PFC circuit is greater than the demanded current through the inductor; and maintaining the switch in the OFF state for the desired OFF period after the transition from the ON state to the OFF state.

19. A power factor correction (PFC) system comprising:
a desired OFF period module that determines a desired OFF period for a switch of a PFC circuit based on an input voltage to the PFC circuit and an output voltage of the PFC circuit,
wherein the desired OFF period module sets the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage; and
a switching control module:
that transitions the switch from an ON state to an OFF state in response to a determination that a measured current through an inductor of the PFC circuit is greater than a demanded current through the inductor; and
that maintains the switch in the OFF state for the desired OFF period after the transition from the ON state to the OFF state.

20. A power factor correction (PFC) method comprising:
determining a desired OFF period for a switch of a PFC circuit based on an input voltage to the PFC circuit and an output voltage of the PFC circuit,
wherein determining the desired OFF period includes setting the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage;
transitioning the switch from an ON state to an OFF state in response to a determination that a measured current through an inductor of the PFC circuit is greater than a demanded current through the inductor; and
maintaining the switch in the OFF state for the desired OFF period after the transition from the ON state to the OFF state.

* * * * *